US012305621B2

(12) United States Patent
Cook et al.

(10) Patent No.: US 12,305,621 B2
(45) Date of Patent: May 20, 2025

(54) SYSTEMS FOR GENERATING ENERGY FROM GEOTHERMAL SOURCES AND METHODS OF OPERATING AND CONSTRUCTING SAME

(71) Applicant: Roda Energy Corporation, Calgary (CA)

(72) Inventors: Curtis Cook, Calgary (CA); Neal Gartner, Calgary (CA); Shane Engelking, Cochrane (CA); Jeff Peterson, Calgary (CA)

(73) Assignee: Roda Energy Corporation, Calgary (CA)

( * ) Notice: Subject to any disclaimer, the term of this patent is extended or adjusted under 35 U.S.C. 154(b) by 18 days.

(21) Appl. No.: 18/332,902

(22) Filed: Jun. 12, 2023

(65) Prior Publication Data

US 2024/0410292 A1    Dec. 12, 2024

(51) Int. Cl.
*F03G 4/02* (2006.01)
*E21B 36/00* (2006.01)
(Continued)

(52) U.S. Cl.
CPC ............ *F03G 4/029* (2021.08); *E21B 36/003* (2013.01); *E21B 41/0035* (2013.01);
(Continued)

(58) Field of Classification Search
CPC .... E21B 36/003; E21B 41/0035; F03G 4/029; F24T 10/13
See application file for complete search history.

(56) References Cited

U.S. PATENT DOCUMENTS 6,247,313 B1    6/2001 Moe
11,125,472 B2   9/2021 Toews
(Continued)

FOREIGN PATENT DOCUMENTS

CA    2271301 A1    5/1998
CA    2998782 A1    10/2018
(Continued)

OTHER PUBLICATIONS

PCT International Search Report and Written Opinion. PCT/CA2023/051130. Dated Oct. 30, 2023.
(Continued)

*Primary Examiner* — Jonathan R Matthias
(74) *Attorney, Agent, or Firm* — Forsgren Fisher McCalmont DeMarea Tysver LLP; James M. Urzedowski; Daniel A. Tysver

(57) ABSTRACT

The present disclosure describes a system and a method for generating energy from geothermal sources. The system includes an insulated injection pipe and a common well segment, an injection well and a production well, a first lateral section connected to the injection well and a second lateral section connected to the production well, a multilateral connector joining the first and second lateral sections, the insulated injection pipe coinciding with the common well segment, defining a pressure-tested loop within the rock formation and in a heat transfer arrangement therewith. The loop cased in steel and cemented in place. The loop to receive working fluid capable of undergoing phase change within the downhole well loop as a result of heat transferred from the rock formation. The system also includes a pump to circulate working fluid, a turbine system to convert the flow of working fluid into electricity, and a cooler.

63 Claims, 20 Drawing Sheets

(51) Int. Cl.
  *E21B 41/00* (2006.01)
  *F03G 4/00* (2006.01)
  *F24T 10/13* (2018.01)
  *E21B 33/14* (2006.01)
  *E21B 47/06* (2012.01)
  *F01D 15/10* (2006.01)
  *F24T 50/00* (2018.01)

(52) U.S. Cl.
  CPC .............. *F24T 10/13* (2018.05); *E21B 33/14* (2013.01); *E21B 47/06* (2013.01); *F01D 15/10* (2013.01); *F03G 4/00* (2021.08); *F05D 2220/76* (2013.01); *F24T 50/00* (2018.05)

(56) References Cited

U.S. PATENT DOCUMENTS

| | | |
|---|---|---|
| 11,156,386 B2 | 10/2021 | Cairns |
| 11,242,726 B2 | 2/2022 | Toews |
| 11,448,425 B2 | 9/2022 | Yang |
| 2007/0245729 A1 | 10/2007 | Mickleson |
| 2011/0048005 A1 | 3/2011 | Mchargue |
| 2012/0117967 A1* | 5/2012 | Loveday ................... F03G 7/04 60/641.2 |
| 2012/0174581 A1 | 7/2012 | Vaughan |
| 2013/0333872 A1 | 12/2013 | Mcmillon |
| 2017/0051580 A1 | 2/2017 | Pierce |
| 2017/0211849 A1 | 7/2017 | Muir |
| 2018/0283735 A1 | 10/2018 | Song |
| 2018/0291880 A1 | 10/2018 | Cairns |
| 2019/0128567 A1 | 5/2019 | Redfern |
| 2019/0154010 A1 | 5/2019 | Toews |
| 2019/0346181 A1 | 11/2019 | Toews |
| 2020/0011151 A1* | 1/2020 | Toews .................. E21B 43/305 |
| 2020/0190937 A1* | 6/2020 | Nevison ............... E21B 43/267 |
| 2020/0408041 A1 | 12/2020 | Riddell |
| 2021/0003320 A1 | 1/2021 | Toews |
| 2021/0164327 A1 | 6/2021 | Toews |
| 2021/0231109 A1 | 7/2021 | Toews |
| 2021/0325089 A1 | 10/2021 | Toews |
| 2021/0356174 A1 | 11/2021 | Alharbi |
| 2022/0003459 A1 | 1/2022 | Toews |
| 2022/0026112 A1 | 1/2022 | Cairns |
| 2022/0082091 A1 | 3/2022 | Lu |
| 2022/0307341 A1 | 9/2022 | Harms |
| 2024/0167461 A1* | 5/2024 | Hogg ..................... F03G 4/02 |
| 2024/0310080 A1* | 9/2024 | Johnson ................ F24T 10/15 |

FOREIGN PATENT DOCUMENTS

| | | | |
|---|---|---|---|
| CA | 3013374 A1 | 4/2019 | |
| CA | 3041002 A1 | 5/2019 | |
| CA | 3038294 A1 | 6/2019 | |
| CA | 3044153 A1 | 1/2020 | |
| CA | 3050274 A1 | 2/2020 | |
| CA | 3083568 A1 | 12/2020 | |
| CA | 3083575 A1 | 12/2020 | |
| CA | 3144627 A1 | 12/2020 | |
| CA | 3085901 A1 | 2/2021 | |
| CA | 3098406 A1 | 2/2021 | |
| CA | 3138740 A1 | 2/2021 | |
| CA | 3097436 A1 | 5/2021 | |
| CA | 3100013 A1 | 8/2021 | |
| CN | 107461951 A * | 12/2017 | |
| EP | 3039354 B1 * | 10/2018 | ............... E21B 7/00 |
| WO | WO2022011444 A1 | 1/2022 | |
| WO | WO2022018674 A1 | 1/2022 | |
| WO | WO2022029699 A1 | 2/2022 | |
| WO | WO2022043947 A1 | 3/2022 | |

OTHER PUBLICATIONS

"EavorTM", Web page (https://www.eavor.com/), Retrieved on Nov. 13, 2022.
"EavorTM Technology", Web page (https://www.eavor.com/technology/), Retrieved on Nov. 13, 2022.
"EavorTM Eavor-LiteTM", Web page (https://www.eavor.com/eavor-lite/), Retrieved on Nov. 13, 2022.
J. Finger and D. Blankenship, Handbook of Best Practices for Geothermal Drilling, Sandia National Laboratories, SAND2010-6048.
Aug. 22, 2024 USPTO Office Action (U.S. Appl. No. 18/437,408).
PCT International Search Report and Written Opinion. PCT/CA2024/050720. Dated Sep. 4, 2024.

* cited by examiner

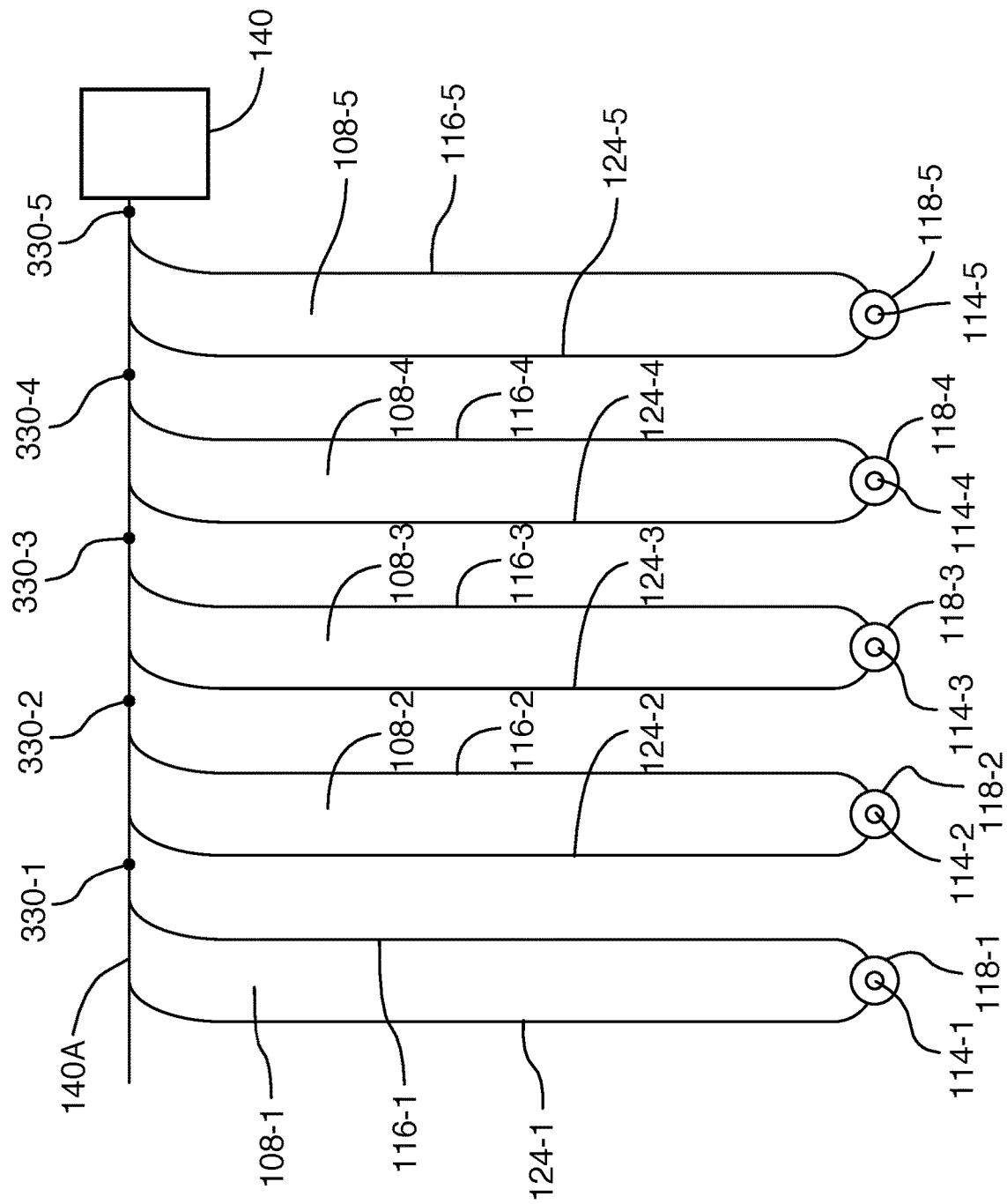

SYSTEMS FOR GENERATING ENERGY FROM GEOTHERMAL SOURCES AND METHODS OF OPERATING AND CONSTRUCTING SAME

FIELD OF INVENTION

The present disclosure relates generally to generating energy from geothermal sources and more specifically to systems for generating energy from geothermal sources and methods of operating and constructing same.

BACKGROUND OF THE INVENTION

Systems for energy generation from geothermal sources (also referred to herein as geothermal energy generation systems) are designed such that working fluids or water are circulated underground to be heated, and then the heat energy is brought back up to the surface to be converted into electricity. The working fluid or water is then cooled and returned underground to the heat source.

In some known geothermal energy generation systems, the working fluid that flows underground is exposed to the rock formations underground, allowing the first working fluid to pick up debris, rocks, and other solids as it flows underground. The picking up of debris, rocks, and other solids may cause issues with any equipment with moving parts, such as pumps that are required to help circulate the working fluid, or turbines which are used to generate electricity from the heat energy from the working fluid when returning to the surface.

One method of solving this is to provide filters along the flow path of the working fluid, or prior to the working fluid entering any machinery. The filters may help mitigate the working fluid from carrying debris or solids into any machinery. However, filters need to be changed, and hence increase maintenance cost. Furthermore, filters are an added component, and as such, lead to another potential point of failure in the system.

Another method of solving the issue of debris in the working fluid is to use a binary cycle power station, where two working fluids are used, where a first working fluid is heated underground, and then is passed by an isolated secondary working fluid in a second loop, where the second working fluid is heated and is used to power turbines. While this may save the turbines from encountering debris, the pumps required to circulate the first working fluid underground still need to contend with the debris. In addition, binary cycle power stations are not efficient, as they have a high parasitic load, and a significant amount of heat may be loss when transferring heat from the first working fluid to the second working fluid.

Furthermore, the working fluid that loops underground may also begin eroding away at the rock surfaces along the path of the flow of the working fluid. The erosion of the rock surfaces may lead to unstable pathways underground, and may also lead to the damage of the environment. As such, to prevent erosion, the flow rates of the working fluid must be minimized to protect the integrity of the rock formations. This will lead to addition residence time underground for the working fluid.

As the working fluid flows underground, it may also leak into the surrounding environment through gaps in the rock formations underground, causing underground pollution. As such, in order to be environmentally friendly, the working fluid needs to be an environmentally friendly fluid such as water. Even so, if the first working fluid picks up any non-environmentally friendly substances along it's path flow, such as picking up oil while flowing through a pump, this may still be leaked into the external environment.

In other known geothermal energy systems, to prevent erosion, environmental leakage and to prevent the inclusion of debris in the working fluid along the loop underground, a chemical layer, a chemically treated layer, or a polymer coating layer is provided, where the polymer coating is applied to and seals the rock formation from the circulating fluid. However, some inherent shortcomings with a polymer coating layer include the polymer coated loop underground not being able to be pressure tested. Without pressure testing the underground loop, there is no assurance as to whether the polymer coating layer will hold at depths where the working fluid is subjected to high pressures and whether the polymer coating layer will react with different working fluids, and as such, there may be leaks including underground pollution.

Furthermore, a polymer coating itself is subject to erosion, and once eroded may allow for erosion of the rock formation. This leads to contamination of the first working fluid. To prevent this, the polymer coating may need to be applied in several layers, and may also need to be continually replaced, leading to high maintenance costs, additional downtime, and loss of production time. Even after applying the polymer coating, it is difficult to verify that the entire rock formation and pathway/loop of the first working fluid has been coated, much less ensuring the thickness or integrity of the polymer coating.

In other prior art, such as U.S. Patent Application Publication No. 2018/0291880 and International Patent Application Publication No. WO 2022029699 a casing is provided, however, this casing is not cemented, which may lead to instability. In addition, this casing is not pressure tested, which may lead to instabilities at depths with high pressures or with working fluids with either high or varied flowrates underground. The instabilities may result in poor operating performance as well as potentially underground pollution, should a working fluid that is not water leak, such as is provided in both of the aforementioned patent application publications, where two working fluids are used. Underground pollution may occur through leakage of the working fluids into gaps in the rock formation. The gaps in the rock formation may be unknown fractures that were previously present, or may be fractures that were induced through drilling during the construction of the geothermal energy generation system. If there is any leakage of working fluid, the fluid may be transported through the fractures, and into sensitive resources, such as the ground water.

In other prior art, such as U.S. Patent Application Publication No. 2011/0048005, a continuous string of pipe is cemented within and throughout the length of two connected wellbores, specifically from an injection wellhead of one borehole, underground to a subterranean nearly horizontal pipeline, and back up an ascending well to a production wellhead. This allows for a working fluid to be transported underground, undergo a phase change due to the heat from the surrounding subterranean rock, and then transported back to the surface to be used in the power plant. There is only a single subterranean horizontal pipeline linking between the injection wellhead and production wellhead. In this type of system, the single subterranean horizontal pipeline and the distance between the injection wellhead and production wellhead tends to be quite long in order to effect sufficient heat transfer between the rock formation and the production fluid. This large distance between the injection wellhead and production wellhead tends to create a large footprint both above ground and below ground. This increases the cost of the system overall, as there is additional length of piping required above ground between the injection wellhead and the production wellhead, additional volumes of working fluid for the additional lengths of piping above ground, and also heat may be lost due to the additional time that the production fluid is spent above ground, potentially increasing parasitic load. Furthermore, the construction technique provided in U.S. Patent Application Publication No. 2011/0048005 does not allow for a pressurized connection between two sections.

As such, it would be advantageous to have a solution where the geothermal energy generation system may have an underground loop that includes a barrier that may be pressure tested, and one where the risk of erosion, inclusion of debris and leakage into the surrounding rock formations and environment are at a minimal. In addition, it would also be beneficial to have a solution where maintenance is minimal, saving costs and minimizing downtime, and where there are fewer points of failure within the system.

SUMMARY OF INVENTION

According to a broad aspect of the present invention, there is provided a system for generating energy from geothermal sources. The system includes a common well segment extending underground into a rock formation. The common well segment has an upper end and a lower end. The system further includes an insulated injection pipe extending underground into the rock formation. A portion of the insulated injection pipe is co-located with the common well segment. The insulated injection pipe is also fluidly isolated from the common well segment. The system also includes an injection well extending further underground from the lower end of the common well segment. The injection well also has an upper end and a lower end, where the upper end of the injection well is fluidly connected to the insulated injection pipe. Additionally, the system includes a production well extending further underground from the lower end of the common well segment. The production well also has an upper end and a lower end, where the upper end of the production well is fluidly connected to the common well segment. The system also includes a first lateral section connected to and extending away from a location along the injection well. The system further includes a second lateral section connected to and extending away from a location along the production well. The system also includes a multilateral connector joining the first lateral section and the second lateral section. The common well segment, injection well, production well, first and second lateral sections are cased in steel and cemented in place within the rock formation. Additionally, the insulated injection pipe, injection well, first lateral section, multilateral connector, second lateral section, production well and the common well segment cooperate with each other to define a pressure-tested downhole well loop within the rock formation and are in a heat transfer arrangement therewith. The pressure-tested downhole well loop receives a working fluid capable of undergoing phase change between liquid and gas within the pressure-tested downhole well loop as a result of the heat transferred from the rock formation. The system also includes a pump that is fluidly connected to the insulated injection pipe, where the pump circulates the working fluid through the pressure-tested downhole well loop. The system further includes a turbine system that is fluidly connected to the common well segment, where the turbine system is operatable to covert mechanical energy generated from the flow of the working fluid into electricity. Additionally, the system includes a cooler that is fluidly connected between the pump and the turbine system for cooling the working fluid.

In one feature, the system may include a surface casing surrounding an opening of the common well segment. The surface casing may be partially above the surface and may prevent the escape of the working fluid into the rock formation.

In another feature, the system may have an above ground surface area of 30,100 m$^2$.

In a further feature, the working fluid may be a homogenous working fluid.

In yet another feature, the working fluid may be a heterogenous working fluid.

In another feature, the common well segment may have a depth of approximately 650 m.

Preferably, the first lateral section extends away from the injection well at a depth of between 1000 m to 3500 m.

Preferably, the second lateral section extends away from the production well at a depth of between 1000 m to 3500 m.

Preferably, the first lateral section has a length of between 2000 m to 4000 m.

Preferably, the second lateral has a length of between 2000 m to 4000 m.

Optionally, the first lateral section is at a lower depth than that of the second lateral section.

Optionally, the second lateral section is at a lower depth than that of the first lateral section.

Alternatively, the first lateral section may be at the same depth as the second lateral section, the first lateral section spaced apart from the second lateral section.

In one feature, in operation, the pressure-tested downhole well loop may receive fluids pressurized between 7 MPa and 31 MPa.

In another feature, the pressure-tested downhole well loop may be capable to withstand pressures of at least 7 MPa.

In one feature, the pump may be a positive displacement type pump with a variable speed drive controller.

In a further feature, the positive displacement type pump may be selected from the group consisting of plunger type pumps, gear type pumps and rotary vane type pumps.

In another feature, the turbine system may include a turbine expander.

In yet another feature, the turbine system may be capable of generating between 0.5 to 2 MW of output power.

In one feature, the cooler may be using ambient air as a coolant.

Optionally, the system may include a storage tank. The storage tank may be connected between the cooler and the pump and may hold the excess working fluid.

In one feature, the working fluid may be a refrigerant, a hydrocarbon-based fluid, ammonia, carbon dioxide, or water.

Optionally, where the working fluid is a hydrocarbon-based working fluid, the working fluid may be propane, ethane, pentane, butane or a hydrocarbon blend.

Preferably, the working fluid is propane.

In one feature, the system may include a recuperator with a first flow through connected between the turbine system and the cooler, and a second flow through connected between the pump and the insulated injection pipe. The recuperator may transfer heat from the first flow through to the second flow through.

In another feature, the insulated injection pipe may be a steel pipe with a thermally insulated compound coating the steel pipe.

In yet another feature, the portion of the insulated injection pipe may run along the central axis of the common well segment.

In still yet another feature, the upper end of the injection well may include a downward angled section and the lower end of the injection well may include a vertical section.

Preferably, a majority portion of the injection well is spaced apart from the production well.

More preferably, the majority portion of the injection well is spaced apart from the production well at a lateral distance of at least 80 m.

In one feature, the system may also include a geothermal isolation junction located along the lower portion of the common well segment. The insulated injection pipe may be connected to the injection well through the geothermal isolation junction. The system may also include an isolation packer located along the upper portion of the production well. Furthermore, the system may include an insulated production pipe fluidly connecting the production well and the common well segment. A portion of the insulated production pipe may be run between the isolation packer and the geothermal isolation junction. The geothermal isolation junction isolates the working fluid in the insulated injection pipe from the working fluid in the insulated production pipe.

In one feature, the portion of the insulated injection pipe is concentrically co-located with the common well segment.

Alternatively, the portion of the insulated injection pipe c eccentrically co-located with the common well segment.

In one feature, the system may include an access well having a lateral segment. The multilateral connector may be positioned within the lateral segment of the access well.

In yet another feature, where the common well segment is a first common well segment, the insulated injection pipe is a first insulated injection pipe, the injection well is a first injection well, the production well is a first production well, the multilateral connector is a first multilateral connector, the pressure-tested downhole well loop is a first pressure-tested downhole well loop and the pump is a first pump, the system may include a second common well segment extending underground into the rock formation. The second common well segment may have an upper end and a lower end. The system may further include a second insulated injection pipe extending underground into the rock formation. A portion of the second insulated injection pipe is co-located with the second common well segment. The second insulated injection pipe is fluidly isolated from the second common well segment. The system also includes a second injection well extending further underground from the lower end of the second common well segment. The second injection well has an upper end and a lower end. The upper end of the second injection well is fluidly connected to the second insulated injection pipe. The system further includes a second production well extending further underground from the lower end of the second common well segment. The second production well has an upper end and a lower end. The upper end of the second production well is fluidly connected to the common well segment. The system also includes a third lateral section connected to and extending away from a location along the second injection well. The system further includes a fourth lateral section connected to and extending away from a location along the second production well. Additionally, the system includes a second multilateral connector joining the third lateral section and the fourth lateral section. Each of the second common well segment, the second injection well, the second production well, the third and fourth lateral sections are cased in steel and cemented in place within the rock formation. The system includes a second injection pipe, the second injection well, the third lateral section, the second multilateral connector, the fourth lateral section, the second production well and the second common well segment cooperating with each other to define a second pressure-tested downhole well loop within the rock formation and in a heat transfer arrangement therewith. In addition, the second pressure-tested downhole well loop may receive the working fluid capable of undergoing phase change between liquid and gas within the second pressure-tested downhole well loop as a result of heat transferred from the rock formation. The system also includes a second pump fluidly connected to the second insulated injection pipe. The second pump to circulate the working fluid through the pressure-tested downhole well loop. Furthermore, the second common well segment is fluidly connected to the turbine system. The turbine system receives the working fluid from the first production well of the first pressure-tested downhole well loop and the second production well of the second pressure-tested downhole well loop. In addition, the cooler is fluidly connected to both the first pump connected to the first insulated injection pipe, and the second pump is connected to the second insulated injection pipe.

In one feature, the second multilateral connector of the second pressure-tested downhole well loop is positioned within the lateral segment of the access well at a location spaced apart from the first multilateral connector.

Alternatively, the lateral segment of the access well is a first lateral segment, and the second multi-lateral connector of the second pressure-tested downhole well loop is positioned within a second lateral segment of the access well. The second lateral segment of the access well may be spaced apart from the first lateral segment of the access well.

In another feature, the first lateral segment is at a different depth than the second lateral segment.

In yet another feature, the system has an above ground surface area of 30,100 m$^2$.

According to another aspect of the present invention, there is provided a system for generating energy from geothermal sources. The system includes a common well segment extending underground into a rock formation. The common well segment has an upper and a lower end. The system also includes an insulated production pipe extending underground into the rock formation. A portion of the insulated production pipe is co-located with the common well segment. The insulated production pipe is fluidly isolated from the common well segment. The system further includes an injection well extending further underground from the lower end of the common well segment. The injection well has an upper end and a lower end. The upper end of the injection well is fluidly connected to the common well segment. The system also includes a production well extending further underground from the lower end of the common well segment. The production well has an upper end and a lower end. The upper end of the production well is fluidly connected to the insulated production pipe. In addition, the system includes a first lateral section connected to and extending away from a location along the injection well. The system also includes a second lateral section connected to and extending away from a location along the production well. The system further includes a multilateral connector joining the first lateral section and the second lateral section. Each of the common well segment, the injection well, the production well, and the first and second lateral sections are cased in steel and cemented in place within the rock formation. The common well segment, the injection well, the first lateral section, the multilateral connector, the second lateral section, the production well and the insulated production pipe cooperate with each other to define a pressure-tested downhole well loop within the rock formation and are in a heat transfer arrangement therewith. The pressure-tested downhole well loop receives a working fluid capable of undergoing phase changes between liquid and gas within the pressure-tested downhole well loop as a result of the heat transferred from the rock formation. The system includes a pump that is fluidly connected to the common well segment. The pump circulates the working fluid through the pressure-tested downhole well loop. The system also includes a turbine system that is fluidly connected to the insulated production pipe. The turbine system operating to convert mechanical energy generated from the flow of working fluid into electricity. The system further includes a cooler that is fluidly connected between the pump and the turbine system for cooling the working fluid.

According to another aspect of the present invention, there is provided a method of generating energy from geothermal sources. The method includes providing a pressure-tested downhole well loop extending underground into a rock formation. The pressure-tested well loop includes an insulated injection pipe, an injection well, a production well, a first lateral section connected to the injection well, a second lateral section connected to the production well, a multilateral connector connecting the first lateral section and the second lateral section, and a common well segment. A portion of the insulated injection pipe is co-located with the common well segment. Each of the injection well, the production well, the first and second lateral sections and the common well segment is cased in steel and cemented in place within the rock formation. The method further includes conveying a working fluid through the pressure-tested downhole well loop. The working fluid is received by the insulated injection pipe in a liquid state. While conveying the working fluid through the pressure-tested downhole well loop, the method further includes transferring heat from the surrounding rock formations to the liquid working fluid and exerting pressure on the liquid working fluid. In addition, while conveying the working fluid through the pressure-tested downhole well loop, the method further including inducing a phase change in the working fluid from a liquid state to a gaseous state. The working fluid exits the common well segment in a gaseous state. The method includes converting the mechanical energy generated from the flow of the gaseous working fluid into electricity. The method also includes cooling the working fluid and inducing a phase change in the working fluid into a liquid state. The method further includes returning the working fluid to the insulated injection pipe.

In one feature, conveying the working fluid through the pressure-tested downhole well loop includes pumping the working fluid.

In another feature, exerting the pressure on the liquid working fluid includes exerting between 7 MPa and 31 MPa on the liquid working fluid.

In yet another feature, the step of converting the mechanical energy generated from the flow of the gaseous working fluid into electricity generates between 0.5 to 2 MW of output power.

In another feature, the step of cooling the working fluid and inducing a phase change in the working fluid is cooled using a cooler.

Optionally, the method may include storing excess working fluid in a storage tank.

In one feature, the working fluid is a homogenous working fluid.

Alternatively, the working fluid is a heterogenous working fluid.

In one feature, the working fluid may be a refrigerant, a hydrocarbon-based fluid, ammonia, carbon dioxide, or water.

Where the working fluid is a hydrocarbon-based working fluid, the working fluid may be propane, ethane, pentane, butane, or hydrocarbon blend.

Alternatively, the working fluid is propane.

In one feature, the propane received by the insulated injection pipe may have a temperature of between 10° C. and 40° C. and a pressure of between 1000 kPag and 2000 kPag.

Alternatively, the propane being received by the insulated injection pipe may have a temperature of 20° C. and a pressure of 1300 kPag.

In one feature, inducing a phase change in the propane from a liquid state to a gaseous state occurs when the propane reaches a temperature of 140° C. and a pressure of 6250 kPag.

In another feature, inducing a phase change in the propane from a liquid state to a gaseous state occurs in either the second lateral section, the production well or the common well segment.

In one feature, the propane exiting the common well segment in a gaseous state may have a temperature of between 90° C. and 110° C. and a pressure of between 3000 kPag and 4000 kPag.

Alternatively, the propane exiting the common well segment in a gaseous state may have a temperature of 106° C. and a pressure of 3500 kPag.

In one feature, while conveying the working fluid through the pressure-tested downhole well loop, the temperature of the propane increases by 76° C. and the pressure of the propane increases by 2170 kPag.

In another feature, after converting the mechanical energy generated from the flow of the gaseous working fluid into electricity, the propane may have a temperature of between 16° C. and 63° C. and a pressure of between 700 kPag and 1500 kPag.

In yet another feature, cooling the working fluid cools the propane to a temperature of 30° C. and a pressure of 1080 kPag.

In one feature, the method includes transferring heat from the working fluid in a first region to the working fluid in a second region using a recuperator. The working fluid in the first region occurs between the steps of converting the mechanical energy generated from the flow of the gaseous working fluid and cooling the working fluid. The working fluid in the second region occurs between the steps of conveying the working fluid through the pressure-tested downhole well loop and the working fluid being received by the insulated injection pipe in the liquid state.

According to another aspect of the present invention, there is provided a method of constructing a pressure-tested downhole well loop for a system for generating energy from geothermal sources. The pressure-tested downhole well loop transfers heat from the surrounding rock formations to a working fluid flowing within the pressure-tested downhole well loop, and induces a phase change on the working fluid from a liquid state to a gaseous state. The method includes providing an access well extending underground into a rock formation. The method further includes drilling a common well segment into the underground rock formation. The common well segment has an upper end and a lower end. The method also includes installing a first steel casing for the common well segment. The method further includes cementing the first steel casing for the common well segment in place within the rock formation. The method also includes drilling a production well further underground from the lower end of the common well segment to a first proposed intersecting point. The method includes drilling a first lateral section from along access well to the first proposed intersecting point. The method also includes connecting the first lateral section and the production well at the first proposed intersecting point. The method further includes installing a second steel casing for the production well and the first lateral section. The method also includes cementing the second steel casing for the production well and the first lateral section in place within the rock formation. The method includes drilling the injection well further underground from the lower end of the common well segment to a second proposed intersecting point. The injection well has an upper end and a lower end. The method also includes drilling a second lateral section from along access well to the second proposed intersecting point. The drilling of the first lateral section along the access well and the drilling of the second lateral section along the access well to begin in proximity to each other along the access well. The method also includes connecting the second lateral section and the injection well at the second proposed intersecting point. The method further includes installing a third steel casing for the second lateral section and the injection well. The method also includes cementing the third steel casing for the second lateral section and the injection well in place within the rock formation. The method includes providing a multilateral connector through the access well and installing the multilateral connector at the connecting point between the first and second lateral sections. The method also includes providing an insulated injection pipe that is fluidly connected to the upper end of the injection well. A portion of the insulated injection pipe is co-located with the common well segment. The method also includes pressure testing the downhole well loop, where the downhole well loop includes the insulated injection pipe, the injection well, the first lateral section, the multilateral connector, the second lateral section, the production well, and the common well segment.

According to another aspect of the present invention, there is provided a system for generating energy from geothermal sources. The system includes a first common well segment and a second common well segment extending underground into a rock formation. Each of the first and second common well segments has an upper end and a lower end. The system also includes a first insulated injection pipe and a second insulated injection pipe extending underground into a rock formation. A portion of the first insulated injection pipe is co-located with the first common well segment. In addition, a portion of the second insulated injection pipe is co-located with the second common well segment. Each of the first and second insulated injection pipes has an upper end and a lower end. The system also includes a first injection well extending further underground from the lower end of the first common well segment. The system further includes a second injection well extending further underground from the lower end of the second common well segment. Each of the first and second injection well having an upper and a lower end. The upper end of the first injection well is fluidly connected to the first insulated injection pipe. In addition, the upper end of the second injection well is fluidly connected to the second insulated injection pipe. The system further includes a first production well extending further underground from the lower end of the first common well segment. The system also includes a second production well extending further underground from the lower end of the second common well segment. Each of the first and second production wells has an upper end and a lower end. The upper end of the first production well is fluidly connected to the first common well segment. The upper end of the second production well is fluidly connected to the second common well segment. The system further includes a first lateral section connected to and extending away from a location along the first injection well. The system also includes a second lateral section connected to and extending away from a location along the first production well. The system further includes a third lateral section connected to and extending away from a location along the second injection well. The system also includes a fourth lateral section connected to and extending away from a location along the second production well. The system includes a first multilateral connector joining the first lateral section and the second lateral section. The system further includes a second multilateral connector joining the third lateral section and the fourth lateral section. Each of the first and second common well segments, the first and second injection wells, the first and second production wells, the first, second, third and fourth lateral sections are cased in steel and cemented in place within the rock formation. In addition, the system includes the first insulated injection pipe, the first injection well, the first lateral section, the first multilateral connector, the second lateral section, the first production well and the first common well segment cooperating with each other to define a first pressure-tested downhole well loop within the rock formation. The system also includes the second insulated injection pipe, the second injection well, the third lateral section, the second multilateral connector, the fourth lateral section, the second production well, and the second common well segment cooperating with each other to define a second pressure-tested downhole well loop within the rock formation. The first and second pressure-tested downhole well loops are in a heat transfer arrangement with the rock formation. Each of the first and the second pressure-tested downhole well loops receive a working fluid capable of undergoing phase change between liquid and gas as a result of heat transferred from the rock formation. The system includes a first pump that is fluidly connected to the first insulated injection pipe. The first pump circulates the working fluid through the first pressure-tested downhole well loop. The system also includes a second pump that is fluidly connected to the second insulated injection pipe. The second pump circulates the working fluid through the second pressure-tested downhole well loop. The system including a turbine system that is fluidly connected to the first and second common well segments, the turbine system converts mechanical energy generated from the flow of working fluid, into electricity. The system also includes a cooler fluidly connected between the first and second pumps and the turbine system, the cooler being operable to cool the working fluid received from the turbine system and to provide the cooled working fluid to both the first and second pumps. In addition, the first and second pressure-tested downhole well loop are located in proximity to each other.

A system for generating energy from geothermal sources. The system includes a common well segment extending underground into a rock formation. The common well segment has an upper end and a lower end. The system also includes an insulated injection pipe extending underground into a rock formation. A portion of the insulated injection pipe is co-located with the common well segment. The insulated injection pipe is fluidly isolated from the common well segment. The system also includes an injection well extending further underground from the lower end of the common well segment. The injection well has an upper end and a lower end. The upper end of the injection well fluidly connected to the insulated injection pipe. The system also includes a production well extending further underground from the lower end of the common well segment. The production well has an upper end and lower end. The upper end of the production well is fluidly connected to the common well segment. The system also includes a first lateral section connected to and extending away from a location along the injection well. The system further includes a second lateral section connected to and extending away from a location along the production well. The system includes a multilateral connector joining the first lateral section and the second lateral section. Each of the common well segment, the injection well, the production well, the first and second lateral sections are cased in steel and cemented in place within the rock formation. The system further includes the insulated injection pipe, the injection well, the first lateral section, the multilateral connector, the second lateral section, the production well and the common well segment cooperating with each other to define a pressure-tested downhole well loop within the rock formation and in a heat transfer arrangement therewith. The pressure-tested downhole well loop withstanding a pressure of at least 7 MPa and receiving a working fluid capable of undergoing phase change between liquid and gas within the pressure-tested downhole well loop as a result of heat transferred from the rock formation. The system further includes a pump that is fluidly connected to the insulated injection pipe. The pump circulates the working fluid through the pressure-tested downhole well loop. In addition, the system includes a turbine system that is fluidly connected to the common well segment. The turbine system converts mechanical energy generated from the flow of working fluid, into electricity. The system also includes a cooler that is fluidly connected between the pump and the turbine system for cooling the working fluid.

BRIEF DESCRIPTION OF THE SEVERAL VIEWS OF THE DRAWINGS

The embodiments of the present invention shall be more clearly understood with reference to the following detailed description of the embodiments of the invention taken in conjunction with the accompanying drawings, in which:

FIG. 6C is a schematic top plan view of five fully cased downhole well loops and a single connecting well;

DESCRIPTION OF THE PREFERRED EMBODIMENTS OF THE INVENTION

Figure 1:
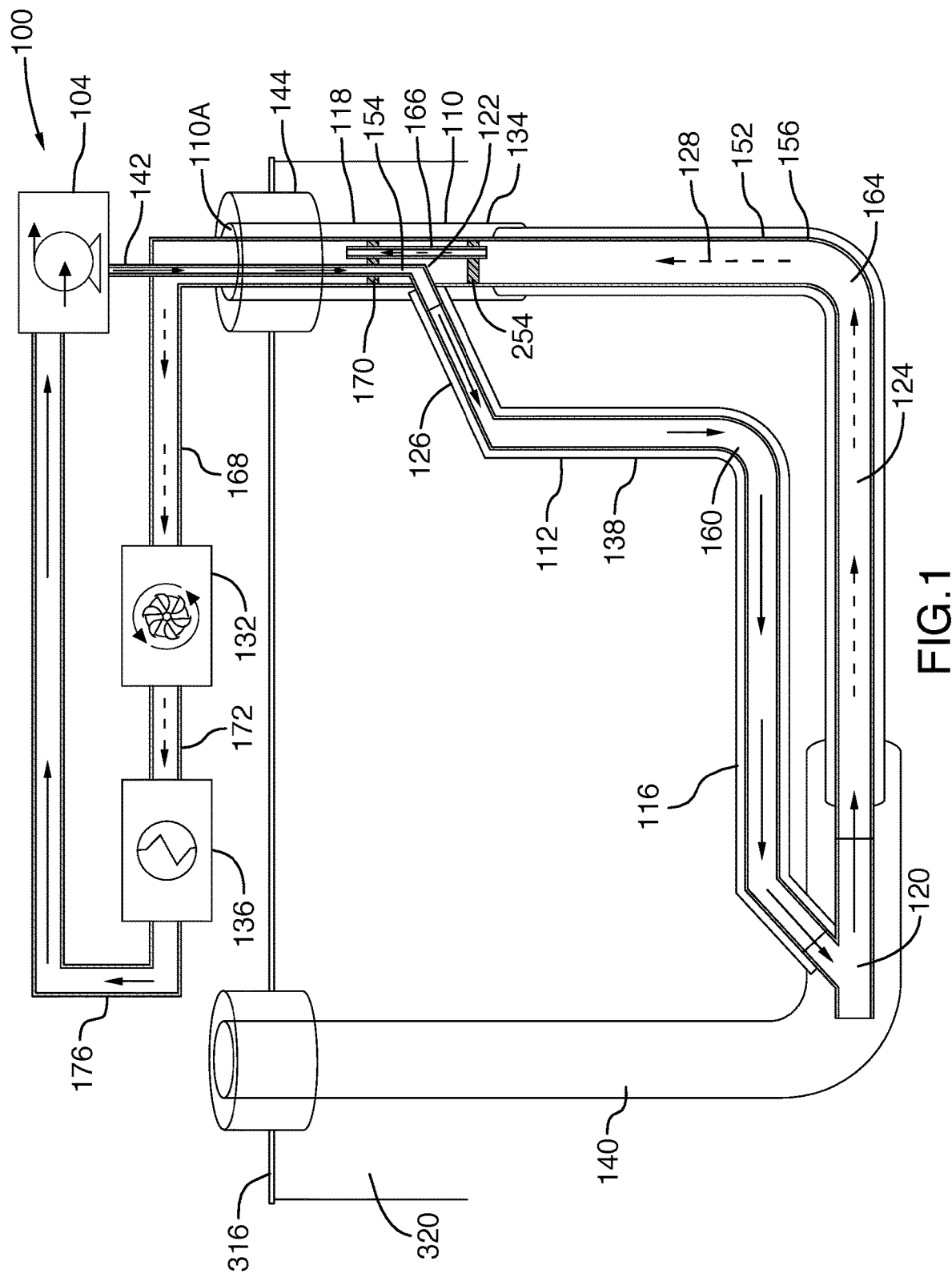
FIG. 1 is a schematic cross-sectional view showing a system for generating energy from geothermal sources in accordance with an embodiment.

The description, which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

By way of general overview, there is provided a system for generating energy from geothermal sources 100 (also referred to herein as a geothermal energy generation system 100) with single heat exchange loop, where the system 100 includes a fully cased, pressure tested and cemented downhole well loop 108 (also referred to herein as a fully cased downhole well loop 108) for isolating and circulating a single fluid 200 (also referred to as a working fluid 200) over an extended length underground to achieve heat exchange between the working fluid 200 and heat emanating/radiating from the earth (i.e. the underground heat source). The system 100 employs a closed loop direct turbine expansion cycle, which is similar to an organic Rankine cycle to convert the energy stored in the heated working fluid 200 into mechanical energy which is then used to generate electrical power.

A person skilled in the art will recognize that in a Rankine cycle, working fluid 200 may undergo phase changes. For clarity, in the description below, working fluid 200 will be generally referred to regardless of the state of matter. Working fluid 200 in a liquid state will be referred to as liquid working fluid 204, and working fluid 200 in a gaseous state will be referred to as gaseous working fluid 208.

The geothermal energy generating system 100 includes, below ground, the fully cased downhole well loop 108 which has a well assembly 110 extending into the ground. The well assembly 110 has a common well segment 118, a lower portion of an insulated injection conduit or pipe 154, an injection well 112 and a production well 128. The injection well 112 and the production well 128 branch off from the common well segment 118 at connecting point 122 to extend further into the ground. Also forming part of the downhole well loop 108 is a first upper lateral section 116 connected to, and extending away from, the injection well 112; and a second lower lateral section 124 connected to, and extending away from, the production well 128. The first and second lateral sections 116 and 124 meet at a juncture where a multilateral connector 120 is installed. Above ground, the geothermal energy generating system 100 includes a pump 104 fluidly connected to an upper portion of the insulated injection conduit or pipe 142 that is configured to carry the liquid working fluid 204 down the lower portion 154 of the insulated injection pipe 114 below the ground, through the common well segment 118 and into the injection well 112 away from the surface 316, through the first upper lateral section 116, the multilateral connector 120 and the second lower lateral section 124, and then up the production well 128, through an insulated production pipe 166 and through common well segment 118 back towards the surface 316. The liquid working fluid 204 undergoes a phase change while underground, and returns to the surface 316 through the production well 128 and the common well segment 118 as a gaseous working fluid 208 where it flows into a turbine system 132 for power generation. Within the turbine system 132 the gaseous working fluid 208 spins a turbine that then rotates a shaft and, creating mechanical energy. This mechanical energy is converted to electricity by a shaft driven power generator (not shown). Also provided, is a cooler 136 that is fluidly connected to the turbine system 132. The cooler 136 condenses the low pressure gaseous working fluid 208 after it leaves the turbine system 132, returning it to its original liquid state wherein it may be pumped down the common well segment 118, through the injection well 112 and circulated through the fully cased downhole well loop 108.

As will be appreciated by a person skilled in the art and apparent from the description that follows, the geothermal energy generation system 100 disclosed tends to address the challenges identified above. More specifically, use of the fully cased downhole well loop 108 removes any risk of cross contamination between the working fluid 200 flowing through the fully cased downhole well loop 108, and any rock formations 320 or formation fluids and any risk that the working fluid 200 will erode the rock formations 320, since the working fluid 200 never comes into contact with the rock formations 320. The velocity of the working fluid 200 may also be greater within fully cased downhole well loop 108, as there is no risk of erosion of rock formations 320 due to the lack of contact. In addition to preventing the erosion of the wellbore walls the addition of casing also eliminates the risk of wellbore instability and rock mass failure due to the in-situ and induced stresses around the wellbore. In prior art systems, in order to achieve minimal cross contamination, the velocity of the working fluid must be carefully managed and monitored to ensure that there is minimal erosion on any wellbores or underground sections. Ensuring that there is minimal to no erosion is important, not just from the perspective of preserving the environment, but also to avoid creating instabilities in rock formations 320 that could lead to earthquakes or other potential consequences. Furthermore, because working fluid 200 is isolated from rock formations 320, there is no risk of dissolving of minerals or other substances that may change the composition of working fluid 200. In other prior art where the working fluid 200 may be in contact with the surrounding rock formations 320, there is a risk of dissolving minerals or other substances that the working fluid 200 may come into contact with, especially while working fluid 200 erodes at the rock formation 320 surfaces, and undergoes heat changes. The dissolving of minerals may also lead to the depositing of said minerals in pipes or other components of the geothermal energy generating system 100 when working fluid 200 cools, creating blockages and adding maintenance to system 100.

Fully cased downhole well loop 108 is pressure tested and is cemented to the surrounding rock formation 320 underground. Due to its construction, any working fluid 200 finding its way out of fully cased downhole well loop 108 is greatly minimized. As such, the risk of any working fluid 200 leaking or finding its way out of the fully cased downhole well loop 108 and potentially causing pollution or other environmental concerns is greatly minimized, especially when working fluid 200 undergoes significant changes in temperature and pressure. In contrast, other prior art systems may suffer fluid losses due to leak off into formation and/or fluid contamination from influxes of formation fluids due to the working fluid not being fully isolated from the rock formations 320. This would be from not being cased including being unable to successfully obtain a valid pressure test. As a result, the fully cased downhole well loop 108 can use non-conventional working fluids 200 with different thermal capacities, and different phase transition points, hence allowing for potentially more energy efficient systems, greater power generation, and geothermal generation systems with smaller footprints, while reducing the concern of contaminating the environment. Furthermore, parasitic power loss is minimized. A person skilled in the art will recognize that parasitic losses may be described as the absorbed power being the energy required to operate pumps, cooler fans and other loads, reducing the net energy output of a system. A person skilled in the art will also recognize that net energy is power produced subtracted by power used to operate the system.

The casing material for fully cased downhole well loop 108 may be steel. Unlike in other prior art, where a chemical liner may be used, steel being a hardened and inert material, along with the support of the cement may withstand high pressures. Furthermore, there is a lesser risk of steel chemically interacting with working fluid 200, allowing for a greater selection of working fluid 200 for the geothermal energy generating system 100. In addition, the construction and application of a steel casing is substantially safer in comparison with a chemical liner when ensuring that there are no leaks within fully cased downhole well loop 108.

By using a single heat exchange loop with a single working fluid 200, as opposed to two loops with two working fluids, there is a significant reduction in parasitic loss of energy, as the heat is retained in the single working fluid 200 and is not lost to the environment in any transfers of heat when there are multiple working fluids.

Additionally, as working fluid 200 is fully contained within the geothermal energy generating system 100, the working fluid 200 may be easily changed if environmental conditions change. For example, if the temperature underground changes, the working fluid 200 can be easily replaced with another working fluid 200 with a lower boiling point. This allows the geothermal energy generating system 100 to continue to operate without the need for structural changes, such as adjusting the depth of the lateral sections to obtain the heat required.

Co-locating the flow of working fluid 200 downwards into fully cased downhole well loop 108 with the flow of working fluid 200 upwards out of fully cased downhole well loop 108 through a single opening 110A and along a single common well segment 118 allows geothermal energy generating system 100 to occupy a smaller footprint, both underground and the above ground surface area, as compared to other prior art systems. The smaller footprint may lead to reduced capital and operating costs. For example, U.S. Patent Application Publication No. 2011/0048005, has a single horizontal pipeline underground provided with two vertical wells with two wellheads, an injection wellhead and a production wellhead, on the surface. This leads to the injection wellhead and the production wellhead being at significantly larger distances away from each other and hence occupying a larger footprint than the embodiments described below. The larger footprint may lead to inefficiencies in heat transfer and significant construction costs. Furthermore, prior art systems with two vertical wells and two well heads require additional drilling and additional foundation. For example, with a second vertical well and a second well head, a second surface casing may be required to prevent any leakage of working fluid into the environment in proximity to the second well head. The additional drilling and the construction of the additional surface casing is an added capital cost.

Figure 2:
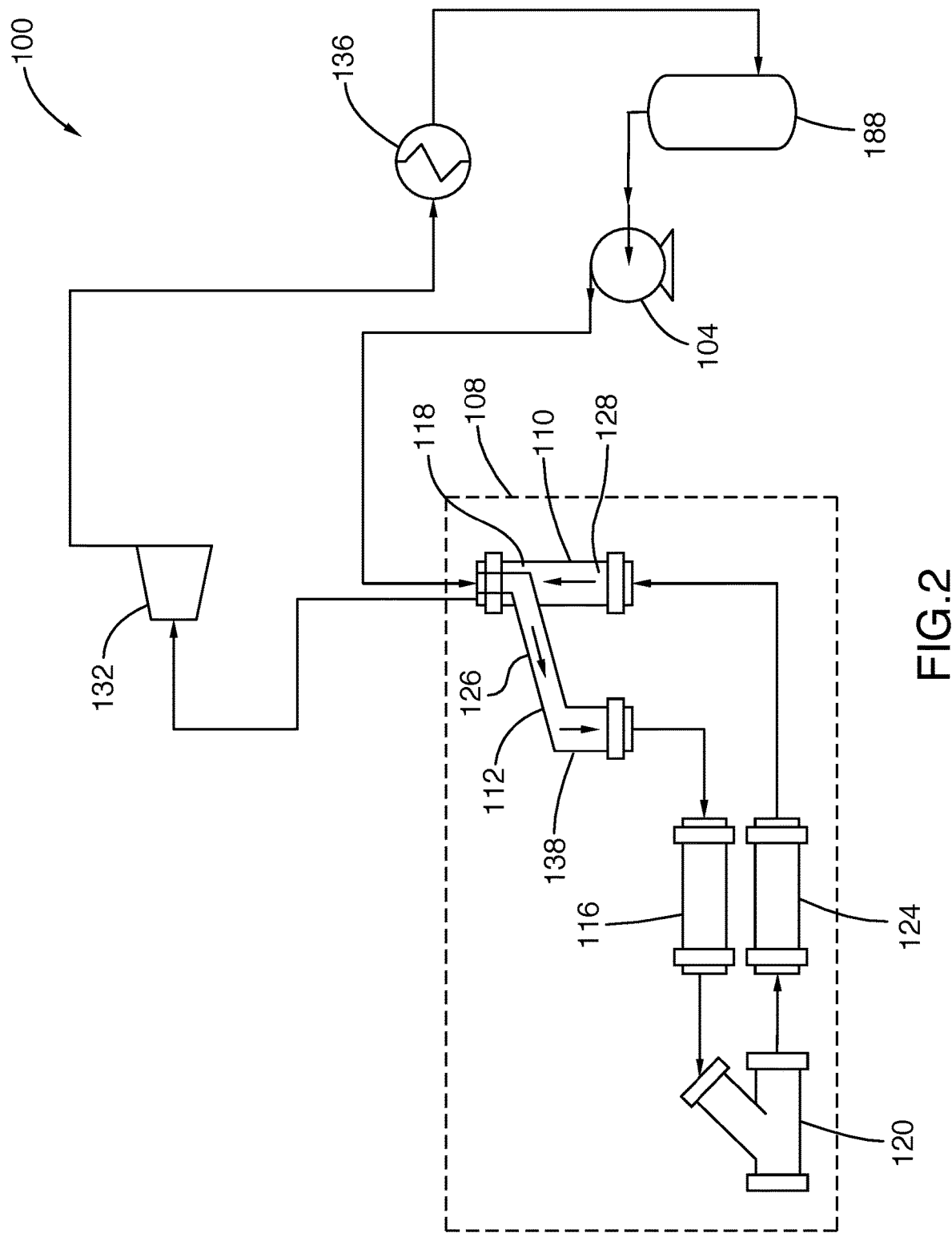
FIG. 2 is a conceptual schematic view of the system for generating energy from geothermal sources shown in FIG. 1.

Referring to FIGS. 1 and 2, there is shown an embodiment of the geothermal energy generating system 100. The main components of the geothermal energy generating system 100 include fully cased downhole well loop 108, more specifically, the common well segment 118, a lower portion 154 of an insulated injection pipe 114, the injection well 112, the first upper lateral section 116, the multilateral connector 120 (also referred to herein as cross connect splitter 120, or multilateral junction 120), the second lower lateral section 124, the production well 128 and the insulated production pipe 166. The geothermal energy generating system 100 further includes the pump 104 and the turbine system 132 fluidly connected to the fully cased downhole well loop 108. More specifically, pump 104 is connected to the upper portion 142 of insulated injection pipe 114 and injection well 112, and turbine system 132 is connected to the common well segment 118 and production well 128. The cooler 136 is fluidly connected between the turbine system 132 and the pump 104 closing the circuit for the single heat exchange loop.

As shown in FIG. 1, an additional wellbore 140 is disposed adjacent the fully cased downhole well loop 108. This wellbore 140 (also referred to herein as connection wellbore 140, access wellbore 140, or sacrificial wellbore 140) is drilled to aid in the construction of fully cased downhole well loop 108, and does not contribute towards the normal operations of the geothermal energy generating system 100. Wellbore 140 will be further described below with regards to the construction of the geothermal energy generating system 100.

As can be seen in FIG. 1, the direction of flow for the liquid working fluid 204 is depicted by the solid lined arrows, and the direction of flow for the gaseous working fluid 208 is depicted by the dashed arrows. The details regarding the operation and phase change of the working fluid 200 will be further described below.

While fully cased downhole well loop 108 is underground in the surrounding rock formations 320, there is an access point to fully cased downhole well loop 108 located on the surface 316—more specifically, an opening 110A located at an upper end 180 of the common well segment 108 of the well assembly 110. The opening 110A is configured to be the entry point and exit point on the surface 316 for the working fluid 204. More specifically, the entry point for the flow of liquid working fluid 204 heading below ground through insulated injection pipe 114 towards injection well 112 and the exit point for the flow of gaseous working fluid 208 heading towards the surface from production well 128, insulated production pipe 166 and common well segment 118 are co-located with each other at opening 110A. The opening 110A is surrounded by a surface casing 144. Surface casing 144 is provided to isolate the upper end 180 of the common well segment 118 from fresh ground water and to prevent the escape or migration of the working fluid 200 into the groundwater and/or environment. Particulars relating to the construction of the surface casing 144 is provided below. It will occur to a person skilled in the art that reference to rock formations 320 is not limited to rocks, but may include any geological formation or combinations of geological formations that are underground.

Common well segment 118 co-locates the flow of liquid working fluid 204 from the surface to injection well 112 through the lower portion 154 of insulated injection pipe 114 with the flow of gaseous working fluid 208 to the surface from production well 128 and insulated production pipe 166. While the gaseous working fluid 208 from the production well surrounds the the lower portion 154 of insulated injection pipe 114 through which the liquid working fluid 204 flows, liquid working fluid 204 and gaseous working fluid 208 do not co-mingle and are fluidly isolated from each other along the length of common well segment 118. By providing a common well segment 118 and a single opening 110A on the surface, geothermal energy generating systems 100 may occupy a smaller footprint on the surface 316 than other systems that are provided with distinct, spaced-apart injection and production wells accessible from the surface. In a preferred embodiment, the size of the footprint of a geothermal energy generating system 100 on the surface would be 30,100 m².

Moreover, savings in labor and construction cost can be achieved using a common well segment 118. In comparison to other systems which have spaced-apart injection and production wells accessible from the surface for each closed loop, only a single well opening needs to be drilled, and furthermore, only a single surface casing needs to be installed. Furthermore, using a common well segment 118 reduces the environmental harm to the area, Specifically, having a common well segment 118 as opposed to an injection well and a production well at the surface, means only a single opening on the surface, minimizing disruption to environment on the surface. In addition, there is a carbon emission reduction to using a common well segment 118.

Having a common well segment 118 may allow for the placement of more fully cased downhole well loops 108 within a specified area than other systems. More specifically, the density of fully cased downhole well loops 108, and accordingly geothermal energy generating systems 100 within a specified area may be greater than that of other systems. When constructing a specified number of geothermal energy generating systems 100, the surface footprint of the multiple geothermal energy generating systems 100 would be less or more compact than that of the construction of a same number of prior art systems. In addition, geothermal energy generating systems using a common well segment tend to employ fewer components above ground in comparison to prior art systems. More specifically, as there is a single opening 110A as opposed to two well heads, an inlet and an outlet, there is one less component above ground. Arrangements and configurations of geothermal energy generating systems 100 and fully cased downhole well loops 108 will be further discussed below.

The entirety of piping, wells and sections of fully cased downhole well loop 108 that are in physical contact with rock formation 320 are lined with cement 152 and cased with steel 156. In the current embodiment, steel pipes are cemented within the wellbore of the common well segment 118, the injection well 112 and the production well 128. In addition, steel pipes are also cemented as part of both the upper and lower lateral sections 116 and 124, as part of the multilateral connector 120 and any connecting pieces between said components.

In the current embodiment, as is depicted in FIG. 1, the insulated injection pipe 114 includes a first upper portion 142 of insulated injection pipe 114 above ground fluidly connected to pump 104, and a second lower portion 154 of insulated injection pipe 114 below ground running parallel to the central axis of the common well segment 118 and is not in physical contact therewith. More specifically, the insulated injection pipe 114 is co-located with common well segment 118, where the insulated injection pipe 114 and the common well segment 118 occupy the same space at the same time. Insulated injection pipe 114 may be is co-located concentrically with the common well segment 118, where a portion of insulated injection pipe 114 runs along the central axis of the common well segment 118. In other embodiments, insulated injection pipe 114 may be eccentrically co-located with the common well segment 118, where the portion of the insulated injection pipe runs parallel to, however not exactly along, the central axis of common well segment 118. A person skilled in the art will recognize the different potential arrangements of the insulated injection pipe 114 being co-located with the common well segment 118. Insulated injection pipe 114 may be a steel pipe 158 that is coated in a thermally non-conductive compound 162. The thermally non-conductive compound 162 (also referred to herein as a thermally non-conductive layer 162) minimizes the amount of thermal transfer between the liquid working fluid 204 flowing towards injection well 112 and the gaseous working fluid returning to the surface 316 from production well 128. Examples of thermally non-conductive compounds 162 surrounding steep pipe 158 include, but at not limited to, insulating spray foam. It will occur to a person skilled in the art that in other embodiments, insulated injection pipe 114 may be made of materials other than steel piping 158. Furthermore, a person skilled in the art will recognize the different available permutations and arrangements of materials for both the material of the insulated injection pipe 114 and the thermally non-conductive layer 162. A person skilled in the art will also recognize that a single material, or a plurality of materials may be used for insulated injection pipe 114 to both physically and thermally isolate liquid working fluid 204 flowing towards injection well 112 from gaseous working fluid 208 returning to the surface from production well 128.

In alternate embodiments (not shown), the lower portion 154 of insulated injection pipe 114 could run along a periphery of common well segment 118. The lower portion 154 of insulated injection pipe 114 may also be in contact with the walls of common well segment 118 when running along the periphery of said common well segment 118. A person skilled in the art will recognize that different configurations and placements of the lower portion 154 of insulated injection pipe 114 within common well segment 118 are possible.

The entire fully cased downhole well loop 108 is pressure tested to ensure that there are no leaks. The pressure test may be defined as a hydraulic pressure test where the continuously joined steel casing 156 is subjected to a minimum downhole pressure associated with the greatest pressure upon which the fully cased downhole well loop 108 may be subjected to. The greatest pressure that fully cased downhole well loop 108 may be subjected to may be a point along fully cased downhole well loop 108 with the greatest depth, and is likely to be along lower lateral section 124. In certain embodiments, to determine the total downhole pressure for pressure testing, the following formula may be used:

Pressure at surface+Hydrostatic pressure

Where the hydrostatic pressure may be calculated as (Greatest depth×Specific gravity of water).

For example if the deepest point along fully cased downhole well loop 108 is along lower lateral section 124 at a 2500 m depth and the pressure applied at the surface is 2 MPa, where the specific gravity of water is 10 KPa/m, the total downhole pressure may be calculated by adding the surface and hydrostatic pressures, specifically in this example 2 MPa+(2500 m×10 KPa/m)=21 MP.

Pressure testing is performed using water, as in the event of any leakage due to the high pressures, the leaking water does not create any pollution to the surrounding environment. The above formula using the hydrostatic pressure of water may be used for working fluids 200 where the specific gravity of water is greater than that of the specific gravity of working fluids 200. For example, the specific gravity of propane is less than that of water, and hence the formula above provides a higher pressure testing than what is required for propane as a working fluid 200, ensuring safe operation of fully cased downhole well loop 108. A person skilled in the art will recognize that if working fluid 200 has a higher specific gravity than water, then the above formula may be compensated by providing the specific gravity of said working fluid 200, and then pressure-testing fully cased downhole well loop 108 accordingly with water. Furthermore, in certain embodiments, the calculated total downhole pressure for pressure testing above may be increased to provide a safety factor, hence testing the fully cased downhole well loop 108 with a higher pressure than the operational limits for safety reasons. The pressures that fully cased downhole well loop 108 are built to and pressure-tested to withstand are pressures that are not seen in prior art systems for the generation of energy from geothermal sources. This is due to the fact that the operational pressures of working fluids in prior art systems tend to be much lower than those of working fluid 200 while flowing through fully cased downhole well loop 108.

The pressure-tested fully cased downhole well loop 108 is able to receive and convey working fluids 200 pressurized between 7 MPa and 31 MPa. In an embodiment where working fluid 200 is a pentane, pressure-tested fully cased downhole well loop 108 may receive and convey working fluid 200 between 7 MPa to 22 MPa. In a preferred embodiment, where the working fluid 200 is propane, pressure-tested fully cased downhole well loop 108 may receive and convey propane working fluid 200 between 7 MPa to 20 MPa.

During its operation, fully cased downhole well loop 108 may be capable of withstanding pressures of at least 7 MPa. In other embodiments, pressure-testing of fully cased downhole well loop 108 may include pressure-testing up to 31 MPa and may be designed to burst or fail at a maximum of 39 MPa.

Cement 152 is used to structurally secure steel 156 casing to the surrounding rock formations 320, however in alternate embodiments, cement 152 may be mixed with other substances, such as the addition of hematite to adjust the thermal conductivity of cement 152. While in the current embodiment, cement 152 and steel 156 are used, it will occur to a person skilled in the art that any other materials may be used as a barrier, as long as they physically isolate the working fluid 200 from the exterior environment/rock formations 320, can undergo the pressure requirements from both the working fluid 200 expanding and contracting while undergoing phase change, and as long as heat may conduct through the material.

Common well segment 118 runs from the opening 110A at the surface 316 downward underground a predetermined depth until connection point 122 where it branches out to the injection well 112 and the production well 128. The predetermined depth may be determined on a site-by-site basis depending on geothermal gradient, rock thermal properties, geology and geological composition of the targeted area. In the current embodiment, common well segment 118 is vertical, leading to the depth and the length of the common well segment being the same. However, in other embodiments, common well segment 118 may be angled. A length of common well segment 118 may hence be determined by the predetermined depth of common well segment 118 and the slope or angle of common well segment 118. Alternatively, the depth or slope of common well segment 118 may be based on a predetermined length, where the length of common well segment 118 may be determined based on the type of working fluid 200, the potential amount of heat transfer between liquid working fluid 204 in the lower portion 154 of insulated injection pipe 114 and gaseous working fluid 208 flowing through the annular cylindrical space surrounding the lower portion 154 of insulated injection pipe 114 along common well segment 118. While having a single well with a single opening 110A to the surface 316 saves construction cost in comparison to other systems provided with multiple wells, it will be appreciate that the greater the length of the common well segment 118, the greater the heat transfer between liquid working fluid 204 and gaseous working fluid 208. In a preferred embodiment, the common well segment 118 is vertical, and the depth and length of common well segment 118 is approximately 650 meters. A person skilled in the art will also recognize that in other embodiments, common well segment 118 may extend at an angle or be a combination of any number of vertical, deviated or horizontal sections, and that in such embodiments, the length, rather than the depth, must also be considered with regards to heat transfer.

Lower portion 154 of insulated injection pipe 114 runs parallel along the central axis of common well segment 118 and is secured parallel along said central axis by virtue of insulated injection pipe 114 being secured between pump 104 above the surface 316 and connecting point 122 (also referred to herein as branching point 122) between injection well 112 and common well segment, allowing for the flow of liquid working fluid 204 between pump 104 on the surface 316 and injection well 112. In the current embodiment, the lower portion 154 of insulated injection pipe 114 connects with injection well 112 at said connecting point 122 with a curved connecting piece 134. The lower portion 154 of insulated injection pipe 114 runs along the entire length of common well segment 118. While insulated injection pipe 114 is not cemented, it undergoes the same pressure testing as the remainder of fully cased downhole well loop 108.

Injection well 122 includes a first angled section 126 and a second vertical section 138. At connecting point 122, injection well 112 branches away from common well segment 118 along the angled section 126, running at a downward sloped angle for a predetermined length. The downward sloped angle of angled section 126 may be between 5 and 20 degrees and a build rate of 6 deg/30 m in relation to the plane of surface 316. The downward sloped angle may be determined based on the flow rate of liquid working fluid 204. It will be appreciated that the steeper the downward sloped angle the faster flow rate of liquid working fluid 204. In a preferred embodiment, angled section 126 is angled at a build/turn rate of 6 deg/30 m downward. The predetermined length of angled section 126 depends on the downward sloped angle of angled section 126 and also the spacing 130 between vertical section 138 and production well 128. Spacing 130 is measured and defined as the closest points along a lateral plane between the central axis of vertical section 138 and production well 128. Spacing 130 is determined by the distance required to ensure thermal separation between vertical section 138 of injection well 112 and production well 128, so as to ensure that thermal interference is minimized between gaseous working fluid 208 in production well 128 and liquid working fluid 204 in the vertical section 138 of injection well 112. Spacing 130 may be affected by the geothermal gradient, rock thermal properties, geology and geological composition of the targeted area or rock formation 320 surrounding injection well 112 and production well 128. In a preferred embodiment, the spacing 130 is 80 m. Furthermore, in a preferred embodiment, angled section 126 has a steel casing 156 with an internal diameter of approximately 139 mm. However, in other embodiments, section 126 may be sized differently. A person skilled in the art will recognize the potential for using different configurations of downward sloped angles, predetermined distance and spacing 130 of angled section 126 based on the aforementioned factors.

The vertical section 138 of injection well 112 runs from the end of the angled section 126 vertically downward a predetermined distance (or depth). The predetermined distance (or depth) may be determined on a site by site basis depending on geothermal gradient, rock thermal properties, geology and geological composition of the targeted area. The geothermal gradient and rock thermal properties are variables to consider to determine the depth and residence time at said depth to induce a phase change on working fluid 200. The depth of the vertical section 138 of injection well 112 is chosen to achieve high rock temperature while minimizing drilling cost which increases with many factors, including the depth and geological composition of rock formations 320. In the current embodiment, at its lower end 196, the vertical section 138 is joined to the upper lateral section 116 by a curved connecting piece 160. However, upper lateral section 116 may be connected to vertical section 138 and extend away from vertical section 138 of injection well 112 at any location along vertical section 138. The vertical section 138 may run a distance of approximately 0 m to 2850 m. More specifically, vertical section 138 may begin at a depth of approximately 650 m and run to a depth of approximately 3500 m. In a preferred embodiment, vertical section 138 may have a production steel casing 156 with an internal diameter of approximately 139 mm based on the preferred working fluid temperature of 140° C. to be achieved. However, the vertical section 138 could be sized differently (i.e. be drilled to a different depth, whether at a greater depth or a shallower depth, and have a different diameter, whether larger or smaller), if required to suit a particular application. In the embodiment depicted in FIG. 1, the first section 138 is shown extending vertically downward into the ground. It will be appreciated that this need not be the case in every embodiment. In some embodiments, the first section could extend downwardly into the ground at an angle from vertical.

In the preferred embodiment, the upper lateral section 116 can be seen to be perpendicular to the vertical section 138 of injection well 112, and extends laterally away therefrom toward the XC connector 120. Moreover, the upper lateral section 116 has a length of approximately 2000 m to 4000 m and production steel casing 156 with an internal diameter of approximately 139 mm. In other embodiments, the upper lateral section 116 need not be disposed laterally relative to the vertical section 138 of injection well 112 and could extend away from the vertical section 138 of injection well 112 at an angle from lateral. It could also be sized differently.

Joining the upper lateral section 116 to the lower lateral section 124 is the multilateral connector 120. Multilateral connector 120 may include an XC splitter or other comparable connection device, which may be connected between upper lateral section 116 and lower lateral section 124 in a manner which ensures fully cased downhole well loop 108 may be pressure tested and may operate under pressure. For instance, the SAGD (Steam Assisted gravity drainage) XC splitter multilateral system manufactured by Baker Hughes Company. The multilateral connector allows for full mechanical and hydraulic isolation support of the junction area with re-entry capabilities. The multilateral connector is designed to accommodate re-entry tie ins on SAGD applications. The multilateral connector 120 is well known within the oil and gas industry, and a person skilled in the art will recognize the various types of multilateral connectors 120 available.

In the current embodiment, the lower lateral section 124 extends laterally away from the multilateral connector 120 to join the lower end 198 of the production well 128 via curved connecting piece 164. However, the lower lateral section 124 may join production well 128 at any location along production well 128. The lower lateral section 124 is disposed perpendicular to the production well 128. Moreover, the lower lateral section 124 has a length of approximately between 2000 m and 4000 m and a production steel casing 156 with an internal diameter of approximately 139 mm. In other embodiments, the lower lateral section 124 need not be disposed laterally relative to the production well 128 and could extend toward the production well 128 at an angle from lateral. It could also be sized differently.

In the embodiments where upper lateral section 116 is disposed laterally relative to the vertical section 138 of injection well 112, and where lower lateral section 124 is disposed laterally relative to the production well 128, both lateral sections 116 and 124 may be on the same vertical plane. However, it will occur to a person skilled in the art that in alternate configurations, lateral sections 116 and 124 may be offset from each other in the vertical plane.

In the current embodiment, the length of the upper lateral section 116 is shorter than that of the lower lateral section 124. The lengths of each of the lower lateral section 116 and upper lateral section 124 are selected based on the amount of time that the working fluid 200 needs to remain underground in contact with the heat-emitting rock formations 320 (i.e. residence time) and the flow rate of the working fluid 200. For example, if the working fluid 200 takes a longer time to heat up to undergo the phase change, whether due to the heat conductive properties of the surrounding rock formations 320, well casing and lining of lateral sections 116 and 124, or due to the properties of the type of working fluid 200 being used, then both lateral sections 116 and 124 may need to be longer to accommodate the time that working fluid 200 needs to be heated to induce a phase change. Flow rate is another variable that needs to be taken into account, as a lower flow rate means that the distance traveled over time is lower, and as such the length of lateral sections 116 and 124 may further be adjusted.

In a preferred embodiment, lower lateral section 124 runs deeper than the upper lateral section 116. Having two lateral sections 116 and 124 at different depths may enhance thermal uptake from surrounding rock formations 320 as there may be less thermal interference between wells 112 and 128. However, fully cased downhole well loop 108 is not limited to this configuration. In alternate embodiments (not shown), the lateral section returning to the production well 128 may be located less deep than the lateral section connected to the injection well 112. In addition, in alternate embodiments (not shown), both lateral sections 116 and 124 may be at the same depth, but may be at an angle from each other, where multilateral connector 120 connects the two lateral sections 116 and 124 from different angles. Alternatively, both lateral sections 116 and 124 may be at the same depth and may run parallel to each other for a substantial portion of the length of lateral sections 116 and 124, where an angled connecting piece (not shown) may accommodate the initial departing angle from multilateral connector 120. In an embodiment where both lateral sections 116 and 124 are running parallel to each other for a substantial length, the spacing between lateral sections 116 and 124 is to be considered to ensure that there is thermal uptake from surrounding rock formations 320, and that there is no thermal interference or heat transfer between lateral sections 116 and 124. A person skilled in the art will recognize the different potential configurations and lengths available for both lateral sections 116 and 124, and also different potential configurations for fully cased downhole well loop 108 overall.

In the embodiment depicted in FIG. 1, production well 128 is vertical and is aligned with the same vertical trajectory of common well segment 118. However, the configuration of production well 128 is not limited to being vertical. Production well 128 may be angled, or production well 128 may be divided into a angled section and a vertical section, similar to that of injection well 112 (not shown). In an embodiment where production well 128 includes an angled section and a vertical section, spacing 130 may be measured between vertical section 138 of injection well 112 and the vertical section of production well 128. A person skilled in the art will recognize the different potential configurations of production well 128.

In the current embodiment, production well 128 is fluidly connected to insulated production pipe 166 that begins along any section of production well 128 and ascends to a depth just above connecting point 122, where it may be fluidly connected to common well segment 118. Insulated production pipe 166 may be held in place by an isolation packer 254 at the lower end along production well 128, and may be held in place with a geothermal isolation junction 170 just above connecting point 122. The addition of the insulated production pipe 166 that is fluidly connected to common well segment 118 above connecting point 122 prevents the gaseous working fluid 208 from leaking into the angled section 126 of injection well 112. The isolation packer 254 along production well 128 further prevents gaseous working fluid 208 from leaking into the space surrounding connecting point 122 from below, and also further directs the gaseous working fluid 208 from the production well 128 into the insulated production pipe 166. The geothermal isolation junction 170 sits above and in proximity to connecting point 122 and includes pass-throughs for insulated injection pipe 114 and insulated production pipe 166. The geothermal isolation junction 170 further creates a seal between the insulated injection pipe 114, insulated production pipe 116 and the walls of common well segment 118, preventing any gaseous working fluid 208 expelled from insulated production pipe 166 into the annular cylindrical space surrounding insulated injection pipe 114 in common well segment 118 from doubling back downwards into the space surrounding connecting point 122. The combination of isolation packer 254, the geothermal isolation junction 170, and the isolation packer 298 at the intersection point between angled section 126 and common well segment 108 effectively create and define a sealed off space surrounding connecting point 122, preventing any liquid working fluid 204 from flowing down production well 128 and any working fluid 208 from flowing down injection well 112. Furthermore, while insulated injection pipe 114, angled section 126, and curved connecting piece 134 are sealed and pressure tested to ensure that there is no leakage of liquid working fluid 204 into the surrounding common well segment 118 or rock formations 320, the addition of the insulated production pipe provides additional precaution against the gaseous working fluid 208 mixing with liquid working fluid 204.

Insulated production pipe 166 may be made of similar materials as insulated injection pipe 114. In the current embodiment, insulated production pipe 166 may be a steel pipe 158 coated in a thermally non-conductive compound 162 to minimize the amount of thermal transfer between the liquid working fluid 204 and the gaseous working fluid 208. However, a person skilled in the art will recognize that similar to insulated injection pipe 114, insulated production pipe 166 may be made of any material or combination or layering of materials that allow insulated production pipe 166 to undergo and withstand the pressures required for fully case downhole well loop 108, and that are thermally non-conductive. In a preferred embodiment, insulated production pipe 166 may run a length of between 0 m to 100 m between the geothermal isolation junction 170 and isolation packer 254. A person skilled in the art will recognize that the length of the insulated production pipe 166 is based on the distance between geothermal isolation junction 170 and isolation packer 254, so as to allow the flow of liquid working fluid 208 to bypass any area with potential access to insulated well 112 and milled window 266. By having insulated production pipe 166 run at least the length between geothermal isolation junction 170 and isolation packer 254, the any potential open hole section is isolated and avoided.

Geothermal isolation junction 170 may also be made out of a thermally non-conductive material, so as to minimize any thermal transfer between insulated injection pipe 114 and insulated injection pipe 166. In another alternate embodiment (not shown), fully cased downhole well loop 108 may not include insulated production pipe 166, isolation packer 254 and geothermal isolation junction 170. Production well 128 may fluidly connect to common well segment 118, allowing gaseous working fluid 208 to flow from production well 128 into the cylindrical annular space surrounding insulated injection pipe 114 along common well segment 118. In this embodiment, isolation packer 298 acts as the seal and prevents gaseous working fluid 208 from mixing with liquid working fluid 204. Isolation packer 298 further prevents gaseous working fluid 208 from flowing into angled branch 126 of injection well 112.

In still another alternate embodiment (not shown), the common well segment 118 may include the lower portion 154 of insulated injection pipe 114 running along the length of the common well segment 118 for the flow of liquid working fluid 204 downwards into injection well 112, and also the lower portion of another insulated pipe running along the length of the common well segment 118 for the flow of gaseous working fluid 208 upwards towards the surface from production well 128. The lower portion 154 of insulated injection pipe 114 and the lower portion of the insulated pipe connected to the production well may run parallel to each other, and may be spaced apart, allowing said spacing to act as a further insulator to prevent heat transfer.

A person skilled in the art will now recognize that the insulated production pipe may run from anywhere along the production well 128 to the surface. Furthermore, a person skilled in the art will also recognize that with the placement of an insulated production pipe, an insulated injection pipe 114 may not be needed, and that the liquid working fluid 204 may flow in the cylindrical annular area surrounding the lower portion of an insulated production pipe in common well segment 118 towards injection well 112. In addition, a person skilled in the art will recognize the different combinations and variations of arrangements of insulated pipes and the flow of working fluid 200 within common well segment 118 while ensuring that the flow of liquid working fluid 204 and the flow of gaseous working fluid 208 is both thermally and physically isolated from each other.

In another alternate embodiment (not shown), the flow of working fluid 200 may be different in fully cased downhole well loop 108. Specifically, in this embodiment, injection well 112 may be fluidly connected to common well segment 118, and production well 128 may be connected to turbine system 132 through an insulated pipe, where the lower portion of said insulated pipe runs along the length of common well segment 118. Liquid working fluid 204 may flow from pump 104 downwards along common well segment 108 in the space surrounding the lower portion of said insulated pipe, through lower lateral section 124, through the multilateral connector 120, and then subsequently through upper lateral section 116. While flowing through upper lateral section 116, liquid working fluid 204 may undergo a phase change into a gaseous working fluid 208. The gaseous working fluid 208 may flow through the remainder of upper lateral section 116, and then up to the surface through a vertical section and angled section of production well 128, and then subsequently through an insulated pipe to turbine system 132, where the insulated pipe is similar in material and structure to insulated injection pipe 114 of the embodiment depicted in FIG. 1.

Furthermore, in yet another alternate embodiment (not shown), injection well 112 may also be a single vertical well and may lack angled section 126 and vertical section 138. It will hence occur to a person skilled in the art that there are at least four possible configurations for injection well 112 and production well 128 where a common well segment 118 is present. Specifically, in order to maintain spacing 130 to ensure no heat transfer between injection well 112 and production well 128, injection well 112 may include angled section 126 and vertical section 138, and production well 128 may be vertical and lack an angled section and vertical section. Alternatively, injection well 112 may be vertical and lack angled section 126 and vertical section 138, and production well 128 may include an angled section and vertical section. Alternatively, each of the injection well 112 and production well 128 could also include its own angled section and vertical section. Alternatively, both injection well 112 and production well 128 may both be angled or sloped for their entire lengths and exclude any angled sections or vertical sections, ensuring at least a minimum spacing 130 for a majority portion of distance for both injection well 112 and production well 128. A person skilled in the art will now recognize the different configurations possible for injection well 112 and production well 128.

Returning to the embodiment depicted in FIG. 1, as lower lateral section 124 runs as a greater depth than upper lateral section 116, production well 128 extends deeper into the ground than the vertical section 128 of injection well 112. In a preferred embodiment, the production well 128 begins at a depth of 650 m at connecting point 122 and ends at a depth of approximately 3500 m. However, the connecting point 122 may be at any depth, and as such, the production well 128 may begin at any depth and end at any depth that may be reasonable considering the properties of rock formation 320. The production well could be sized differently (i.e. be drilled to a different depth, whether at a greater depth or a shallower depth, and have a different diameter, whether larger or smaller), if required to suit a particular application. As will be evident to a person skilled in the art, in the current embodiment where production well 128 is aligned with the same vertical trajectory of common well segment 118, the diameter of production well 128 will be the same as that of common well segment 118. However, in other embodiments where production well 128 is not aligned with common well segment 118, or where production well 128 may include an angled section and a vertical section, production well 128 may be of different diameter than that of common well segment 118.

As shown in FIGS. 1 and 2, located on the surface 316, the pump 104 is fluidly connected to the insulated injection pipe 114. The pump 104 is operable to circulate the working fluid 200 through fully cased downhole well loop 108 via the upper portion 142 of insulated injection pipe 114 and proceeding underground into the lower portion 154 of insulated injection pipe 114 and into the injection well 112.

Pump 104 is also configured to keep liquid working fluid 204 flowing through the entire single heat exchange loop by maintaining an appropriate flow rate of the working fluid 200. Flow rate (and accordingly residence time) is determined by underground well loop to conduct enough heat energy to convert working fluid from a liquid to a gas of sufficient temperature. In the current embodiment, the liquid working fluid 204 received by pump 104 may be in the pressure range of 500 kPag to 2000 kPag, and in the temperature range of 10° C. to 40° C. Pump 104 is configured to increase pressure from a range of 700 kPag to 3000 kPag, and maintain a flow rate of 15 kg per second to 25 kg per second. In a preferred embodiment, pump 104 is able to provide a liquid working fluid 204 to the insulated injection pipe 114 of injection well 112 at approximately 1300 kPag in pressure and at a temperature of approximately 30° C. A preferred embodiment of pump 104 is the use of a liquid pump for thermodynamic efficiency. A liquid pump keeps parasitic energy losses of the system to a minimum compared to the use of mechanical gas compressors.

In other prior art geothermal systems, where the working fluid 200 comes into contact with rock formations 320 due to the lack of casing, or where the working fluid 200 may pickup debris underground, pumps may need to be substantially more robust, and may need to handle abrasive materials during operation. Furthermore, in prior art systems where working fluid 200 is water, pumps may need to handle water chemistries with scale forming characteristics during operation. In contrast, in the current embodiment, as fully cased downhole well loop 108 is fully sealed, cased and pressure tested, the working fluid 200 does not come into contact with any rock formations 320, and is physically isolated from the environment. As such, the working fluid 200 does not pick up any debris, and remains as a clean homogenous fluid. This allows pump 104 to have a long service life with minimal maintenance hence saving on procurement and operation costs and potentially allowing use of less robust or standard pump designs.

In a preferred embodiment, pump 104 may be a positive displacement type pump with a variable speed drive controller. Positive displacement pump types typically have high overall thermal efficiency and are able to maintain desired outlet head when paired with a variable speed drive. Positive displacement pump types include plunger, gear or rotary vane type pumps. However, as will be evident to a person skilled in the art, pump 104 may also be any type of pump that can handle the abovementioned pressures and temperatures. This may include, but is not limited to centrifugal pumps or diaphragm pumps. A person skilled in the art will recognize the different potential pumps that may be used based on the aforementioned pressure, flow rate and temperature specifications as well as purchase and maintenance costs.

Also above ground is the turbine system 132 which is fluidly connected to the opening 110A of common well segment 118. The turbine system 132 may include a turbine (not shown) with an output shaft connected to an electrical power generator (not shown).

In the current embodiment, turbine system 132 is located in close proximity to opening 110A to prevent loss of heat from the gaseous working fluid 208 as it travels along insulated pipes between opening 110A and turbine system 132. In other embodiments turbine system 132 may be located further away form opening 110A, but this tends not to be preferred. While the exterior surface pipes carrying the gaseous working fluid 208 to the turbine system may be insulated, heat and pressure may still be lost, and as such travel distance and time is an important consideration. A person skilled in the art will be familiar with the structure, configuration and operation of turbine system 132 and the associated electric power generator such that they need not be described herein.

In operation, the turbine system 132 receives the gaseous working fluid 208 from the opening 110A of the common well segment 118, and the gaseous working fluid 208 drives the turbine connected to the shaft. The mechanical energy generated by the rotation of the turbine is transferred to the electric power generator, which can convert the mechanical energy into commercially saleable electrical power. The electrical power may then be routed to a utility owned power grid for further distribution. In the current embodiment, turbine system 132 may generate between 0.5 MW to 2 MW in power. In a preferred embodiment, turbine system 132 may generate approximately 1 MW in power.

Alternatively, if the power is not needed by the power grid, it may be routed towards batteries, other local loads, or may just be wasted for short periods of time through an electrical resistive load bank. The use of a load bank to waste power allows equipment to be operated without live connection to a power transmission line. This may be done for equipment testing and short periods of operational upsets (not shown).

In other embodiments, turbine system 132 may include either a turbine expander, a piston expander, or a scroll expander. In a preferred embodiment a turbine expander(s) is used, where the turbine expander(s) may be radial or axial, where the radial turbine expander is connected to one end of a shaft, and an electrical power generator connected to the other end of the shaft. The expander output power shaft may connect directly or via a speed reduction gear box to the electrical power generator. The speed reduction gearbox may match the high speed (rpm) turbine wheel to the desired operating speed of the power generator. The type of expander and power generator will dictate if a gear box and type of gear box is required. In alternative embodiments, turbine expanders may also be volumetric type machines such as scroll, screw and vane expanders could also be used. The preferred output of the geothermal energy generating system 100 is targeted to be over 1 MW produced by each expander which makes high speed and compact turbo expanders a preferred embodiment as volumetric type expanders become large and expensive for the targeted power output amount.

In another embodiment, multiple expanders may be used to maximize power generated. Use of multiple expanders is beneficial when trying to limit the size of an expander for constructability or turn down efficiencies or to allow certain working fluids 200 to expand (flash) in stages, where the $1^{st}$ stage flash occurs in the primary expander, but energy exists in the working fluid that can be flashed again to a lower pressure or in parallel to the first stage flash, Where a turbo expander is included, the gaseous working fluid 208 may be expanded as it passes through the conically contained radial turbine, hence reducing the pressure and the temperature of the gaseous working fluid 208, while driving the turbine. Similar to that of the previous embodiment of turbine system 132, the rotation of the radial turbine creates mechanical energy which is transferred to the electric power generator, where it is converted into commercially saleable electrical power. The voltage from the power generators can be increased with a power step up transformer to match requirements of third party electrical power transmission lines for power sales to desired markets.

A low pressure gaseous working fluid 208 is output from the turbine system 132. In alternate embodiments, depending on the properties of the working fluid 200 being used, the turbine system 132 may induce the received input gaseous working fluid 208 to partially change states into a mixture of gas and liquid.

The cooler 136 (also referred to as condenser 136) is disposed between, and fluidly connected to, the turbine system 132 and the pump 104. The cooler 136 is configured to receive the low pressure gaseous working fluid 208 that is output from the turbine system 132, and to cool and condense the low pressure gaseous working fluid 208 into a liquid working fluid 204 through the use of a heat exchanger cooled by forced draft air or through a mechanical chiller (not shown). In an embodiment where working fluid 200 leaving from turbine system 132 and received by cooler 136 is in a mixed state of both gas and liquid, the amount of energy used by cooler 136 may be reduced, as less work may be required to cool working fluid 200 to a liquid state. Alternatively, the residence time of working fluid 200 within cooler 136 may also be reduced. A person skilled in the art will recognize that the specifications of cooler 136 used may depend on the specifications of working fluid 200, the type of turbine system 132, and also the targeted final temperature and pressure of liquid working fluid 204 after exiting cooler 136.

As cooler 136 is fluidly connected to pump 104, the resultant liquid working fluid 204 that is output from cooler 136 is returned to pump 104 to be sent through fully cased downhole well loop 108 again. Preferably, the cooler 136 is a finned tubed type with forced draft ambient air used as the coolant. This style of condenser cooler 136 is effective and relatively inexpensive. However other embodiments could be used, such as brazed aluminum plate style, tube style or other heat exchanger with working fluid cooled by a segregated coolant.

Connecting pieces 168, 172, and 176 serve as additional pieces to complete the portion of single heat exchange loop above the surface 316. Specifically, connecting piece 168 serves as a connector to fluidly connect the opening 110A of common well segment 118 to the inlet of turbine system 132. Similarly, connecting piece 172 fluidly connects the outlet of turbine system 132 to the inlet of cooler 136. In addition, connecting piece 176 serves as a connector to fluidly connect the outlet of cooler 136 with the inlet of pump 104.

As indicated above, fully cased downhole well loop 108 is fully lined and cased to physically isolate working fluid 200 from the rock formations 320 and environment. In the current embodiment, connecting pieces 168, 172, and 176 may be steel pipes, however in alternate embodiments, connecting pieces 168, 172 and 176 may be constructed of other materials that do not leak, and can withstand the pressure and temperature changes above ground. In a preferred embodiment, connecting piece 168 between the outlet of opening 110A and turbine system 132 may also be insulated to prevent heat loss prior to gaseous working fluid 208 reaching turbine system 132. However, in alternate embodiments, all surface connecting pieces 168, 172 and 176 may also be insulated to reduce loss of heat, which may lead to parasitic loss. Furthermore, the single heat exchange loop of the geothermal energy generating system 100, which may include connecting pieces 168, 172 and 176 will be pressure tested to ensure that they do not leak when transporting the working fluid 200 while the working fluid 200 undergoes pressure changes. It will occur to a person skilled in the art that in connecting pieces 168, 172, and 176 may be of any shape or size depending on the locations and the specifications of the working fluid 200, opening 110A, turbine system 132, cooler 136, and pump 104. It will also occur to a person skilled in the art that in embodiments where components are combined into a single unit, such as cooler 136 and pump 104, that certain connecting pieces may not be needed and could be omitted.

As shown in FIG. 2 the geothermal energy generating system 100 may also include a storage vessel 188 (also referred to herein as storage tank 188) to hold excess liquid working fluid 204 and to provide sufficient and consistent mass flow to pump 104. While not shown, other components, such as valves, heat exchangers, and other instruments may be used to optimize the geothermal energy generating system 100. In alternate embodiments, filters or a filter separator may also be added to the opening 110A upstream of turbine system 132, however, in the current embodiment, filters are not essential if all piping is sufficiently clean to remove manufacturing lubricants, mill scale, dirt and other contaminants prior to commissioning of the turbine system 132, as with a single working fluid 200 in a single heat exchange loop, there is little to no debris or foreign particles expected during normal operation.

Figure 3:
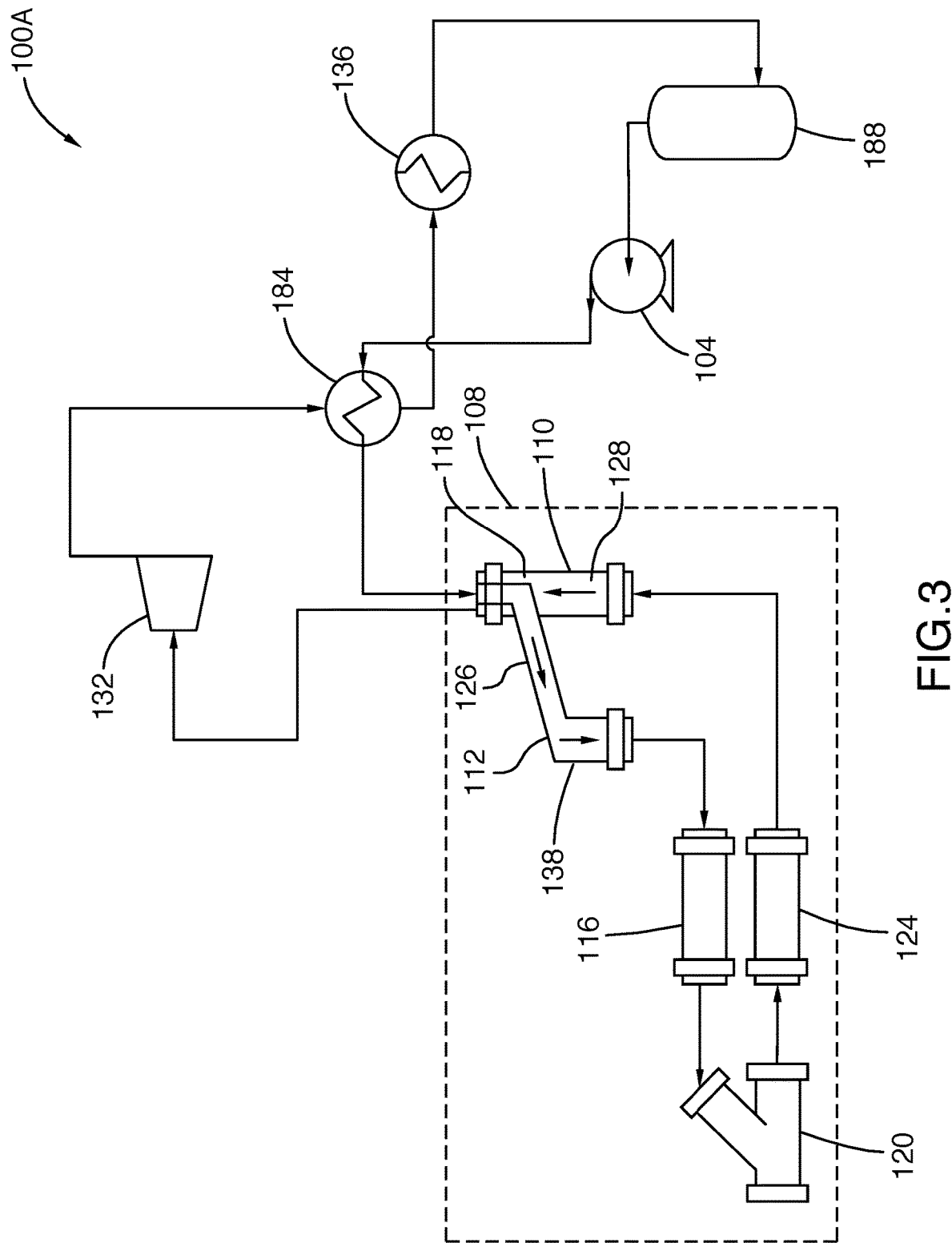
FIG. 3 is another conceptual schematic view of a system for generating energy from geothermal sources in accordance with an alternate embodiment to that shown in FIG. 2.

FIG. 3 depicts a geothermal energy generating system 100A which is an alternate embodiment to that shown in FIGS. 1 and 2. For convenience, like elements or structures shown in FIGS. 2 and 3, are identified with the same reference numerals. System 100A is similar in all material respects to the system 100 except that in geothermal energy generating system 100A, a recuperator 184 (also referred to herein as heat exchanger 184) is provided. The recuperator 184 is disposed between, and connected to the turbine system 132 and the cooler 136, and is also arranged between, and connected to, the pump 104 and the insulated injection pipe 114. The recuperator 184 is configured to minimize cooling load on the cooler 136 and preheat the liquid working fluid 204 before entering the insulated injection pipe 114 by cross exchanging heat from the warm low pressure turbine system 132 outlet gaseous working fluid 208 with the cold liquid working fluid 204 from the outlet of pump 104. As warm low pressure gaseous working fluid 208 leaves turbine system 132 and travels through recuperator 184, it may transfer its heat to the cold liquid working fluid 204 that is also going through recuperator 184 from the outlet of pump 104 to the insulated injection pipe 114. By providing heat from the low pressure gaseous working fluid 208 leaving the turbine system 132, to the cold liquid working fluid 204 heading towards insulated injection pipe 114, heat energy is being saved and reused. The low pressure gaseous working fluid 208 leaving turbine system 132 is headed towards cooler 136 to condense and induce a phase change, and as such, transferring heat energy from low pressure gaseous working fluid 208 prior to cooler 136 reduces the time and energy needed for cooler 136 to condense the gaseous working fluid 208 into a liquid. Furthermore, the liquid working fluid 204 headed through insulated injection pipe 114 is flowing underground to be heated, and as such, pre-emptively heating the liquid working fluid 204 may reduce the underground residence time required, hence potentially allowing for shorter lateral sections 116 and 124, or for lateral sections 116 and 124 to be at a shallower depth. A person skilled in the art will recognize the potential of a recuperator 184 and the potential configurations of a geothermal energy generating system with a recuperator 184.

In alternate embodiments, geothermal energy generating system 100 may be used for other purposes other than to generate electricity. For example, the work generated from the geothermal energy generating system 100 may be used to effect other mechanical work. Alternatively, the work generated from the geothermal energy generating system 100 may be used for hydrogen generation.

Figure 4:
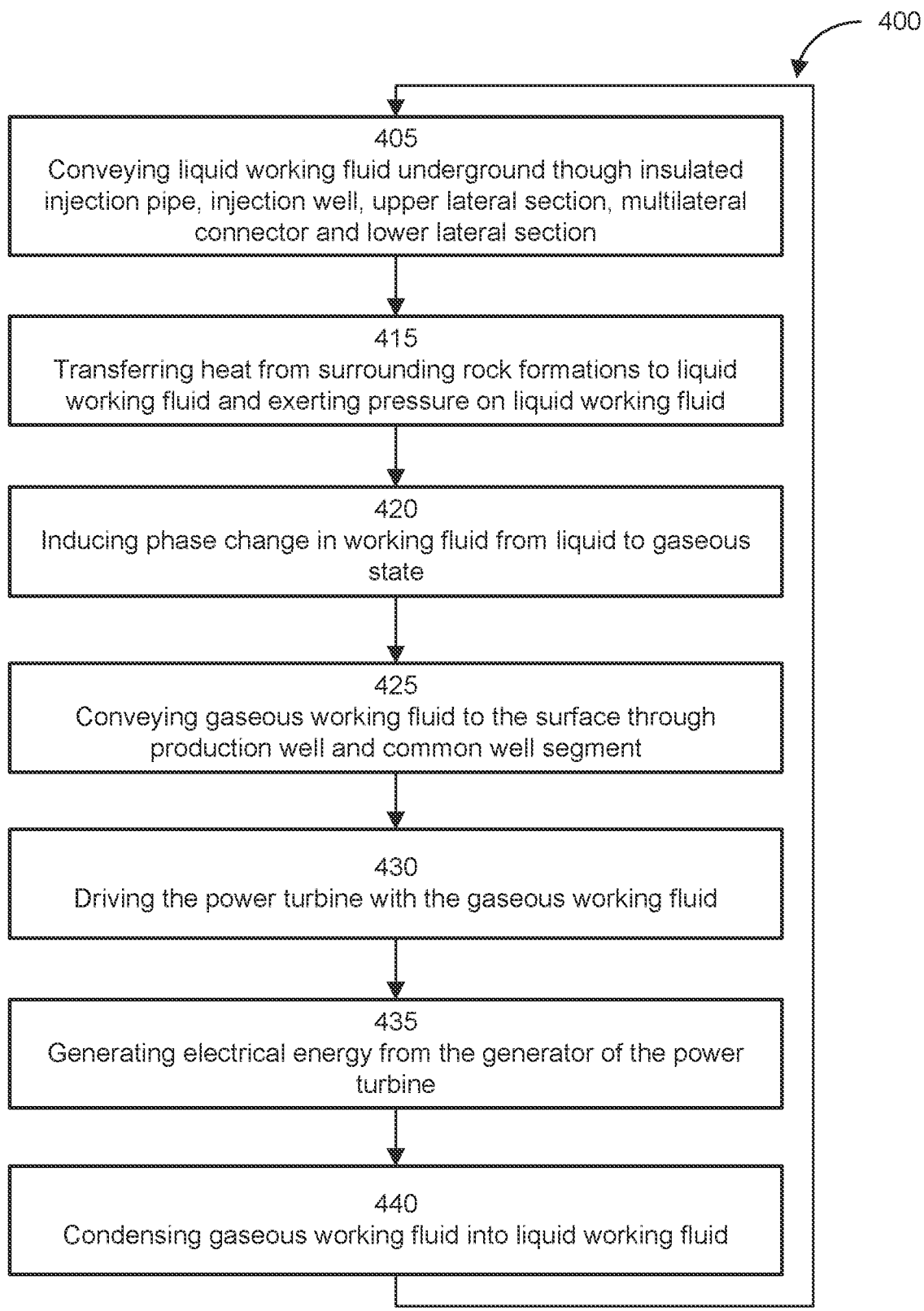
FIG. 4 is a flow chart setting out the steps of a method of generating energy from geothermal sources in accordance with the embodiment shown in FIG. 2.

Referring to FIG. 4, there is shown a flowchart setting out the steps of a method 400 of operating the geothermal energy generating system 100 in accordance with an embodiment of the invention. The operation of geothermal energy generating system 100 occurs after the system has been primed and initiated, and follows a Rankine cycle (preferably an organic Rankine cycle where an organic carbon-based working fluid is used). An example of priming the geothermal energy generating system 100 includes slowly circulating working fluid 200 through insulated injection pipe 114 and injection well 112, and allowing any residual liquid or gas (from either the construction process or from the previous operation of the geothermal energy generating system 100) to exit into a storage vessel to be collected. Once all residual liquid or gas has been removed, the working fluid 200 may continue circulating through the geothermal energy generating system 100 as part of its normal operation. As can be seen, method 400 is a loop. For ease of understanding, the process may be described as being started at step 405 and ending at step 440 before starting the process again at step 405.

As previously described, geothermal energy generating system 100 is a single heat exchange loop with fully cased downhole well loop 108. As fully cased downhole well loop 108 is fully cased and pressure tested, working fluid 200 may be a variety of liquids, gases or plasmas. In alternate embodiments, working fluid 200 may be a carbon-based commercially available and environmentally friendly refrigerant or mix of refrigerants, such as 90% propane with 10% mole fraction ethane. Alternatively, working fluid 200 may be either a composition (a heterogenous working fluid 200) or a singular substance (a homogeneous working fluid 200) of hydrocarbon, carbon dioxide, or ammonia. In a preferred embodiment where the geothermal energy generating system 100 is an organic Rankine cycle, working fluid 200 may be propane. With propane, at a depth of 2000 m and a rock formation 320 temperature of about 160° C., a maximum temperature achieved by propane working fluid 200 is about 140° C. Furthermore, propane working fluid 200 may be condensed into a liquid state working fluid 208 on a hot summer day without substantial cooling using ambient air forced across a fin tube cooler 136. Although propane is the working fluid 200 of choice, other organic (carbon-based), such as a hydrocarbon, or hydrocarbon blends my be used. Hydrocarbon blends may be used to maximize working fluid 200 return pressures. Hydrocarbon blends allow the working fluid 200 to be tailored to specific depth and temperature conditions. For example, the addition of ethane to a majority propane working fluid 200 would allow for earlier wellbore flashing at a specific rock formation 320 temperature. The early flashing would allow for an increased working fluid 200 flow rate and therefore an increase in power generation. Another example is to blend hydrocarbon with butane to increase the heat carrying capacity of the working fluid. By blending heavier hydrocarbons, the flash point/vaporization point along fully cased downhole well loop 108 may be adjusted depending on the temperature of the surrounding rock formations 320. For example, the vaporization point may be adjusted based on the temperature of the surrounding rock formations 320 to be along the upper lateral section 124 or the production well 128, to maximize velocity of the working fluid 200, and minimize the friction of the working fluid 200 along the remainder of the pipe before exiting fully cased downhole well loop 108. A person skilled in the art will recognize the potential combinations of rock formation 320 temperature and different variations of hydrocarbon blends to adjust the location of the vaporization point along fully cased downhole well loop 108. While working fluid 200 may also be water, it is preferably one of the abovementioned fluids, as the abovementioned substances have lower boiling points than water, requiring less residence time underground. Furthermore, the abovementioned fluids may have advantageous thermal capacities, and different phase transition points, allowing for a more efficient system, and requiring less residence time underground in fully cased downhole well loop 108.

The below steps depict an embodiment where working liquid 200 is propane. At step 405, the propane liquid working fluid 204 is conveyed underground by flowing down insulated injection pipe 114, through injection well 112, along upper lateral section 116, multilateral connector 120 and lower lateral section 124. In order to reach insulated injection pipe 114 and injection well 112, liquid working fluid 204 is pumped using pump 104. In fact, working fluid 200 is circulated through the fully cased single heat exchange loop using pump 104. To ensure proper circulation, pump 104 will increase the pressure of liquid working fluid 204 from 1080 kPag to 1300 kPag to be received by insulated injection pipe 114. In the current embodiment, where the working fluid 200 is propane after departing pump 104 and prior to being received by insulated injection pipe 114, liquid working fluid 204 may have an approximate temperature range of about 10° C. to about 40° C., with a preferred temperature of about 20° C. and an approximate pressure range of about 1000 kPag to about 2000 kPag, with a preferred pressure of about 1300 kPag. Once the liquid working fluid 204 has departed pump 104, it flows downwards through insulated injection pipe 114 and subsequently along injection well 112.

When liquid working fluid 204 reaches the curved connecting piece 160, the direction of flow of liquid working fluid 204 transitions from vertical to lateral and then continues along the upper lateral section 116. Liquid working fluid 204 then reaches multilateral connector 120, where it will change direction to flow into the lower lateral section 124 and continue flowing until the curved connection piece 164 adjacent to the lower end 198 of production well 128.

Towards the lower end 196 of injection well 112 and at the depths that upper lateral section 116, multilateral connector 120 and lower lateral section 124 are located, the surrounding environment and rock formations 320 naturally conduct heat from the surrounding rock formations 320. As the liquid working fluid 204 flows downwards along injection well 112, when liquid working fluid 204 reaches a certain depth where the rock formations 320 temperature exceeds the liquid working fluid 204 temperature, heat is transferred from the surrounding environment or rock formations 320 to liquid working fluid 204 (at step 405). The heat transfer may occur while liquid working fluid 204 is still flowing downwards through injection well 112, and will continue to occur while liquid working fluid 204 is flowing through connecting piece 160 and upper lateral section 116. This heat may be conductively transferred from the surrounding environment to liquid working fluid 204 through the cement lining 152 and steel casing 156. The depth threshold that the liquid working liquid 204 begins to receive heat, and hence increases the temperature of liquid working fluid 204 is where the temperature of the surrounding environment is greater than that of liquid working fluid 204. This depth threshold depends on the geothermal gradient at the site and working fluid re-injection temperature. The heat will continue to transfer to liquid working fluid 204 as the liquid working fluid 204 flows through multilateral connector 120 and lower lateral section 124, thereby raising the temperature of liquid working fluid 204 as it flows through said components.

Furthermore, as liquid working fluid 204 flows downwards in injection well 112, the pressure exerted on the liquid working fluid 204 increases, as a consequence of the hydrostatic head (at step 415). As liquid working fluid 204 reaches connecting piece 160 and upper lateral section 116, the pressure of liquid working fluid 204 will continue to increase as the fluid absorbs heat energy. There may be a slight reduction in pressure due to flow rate frictional losses in the wellbore, however liquid working fluid 204 will have a net increase in pressure. The approximate pressure of the liquid working fluid 204 upon reaching the lower end 196 of injection well 112/connecting piece 160 is approximately 10,000 kPag, at the approximate depth of 2000 m as is provided in the current embodiment. While the increase in pressure occurs during a change in depth, the rate of the transfer of heat and consequently the rate of temperature increase of liquid working fluid 204 is dependent on depth, rock thermal conductivity, residence time and rock formation 320 temperature. As such, the increase in temperature will continue while liquid working fluid 204 flows both downwards in injection well 112, flows laterally along upper lateral section 116 and flows through multilateral connector 120. Both the transfer of heat and the increase in exertion of pressure is depicted by step 415.

At step 420, at some point while liquid working fluid 204 is flowing through upper lateral section 116, connecting piece 160, multilateral connector 120, connecting piece 164 and lower lateral section 124, liquid working fluid 204 will undergo a phase change from a liquid to a gaseous state due to the liquid working fluid 204 reaching a boiling point from the heat and from the increased pressure (at step 415). More specifically, the rate of temperature increases until the liquid working fluid 204 begins to vaporize, at which time the temperature will hold constant until all liquid working fluid 204 transforms to a gaseous state (gaseous working fluid 208), then the temperature will increase again as the vapor or gaseous working fluid 208 superheats. It will occur to a person skilled in the art that the temperature and pressure required to vaporize the liquid working fluid 204 will change depending on the specifications of the working fluid 200. In the current embodiment where the working fluid 200 is propane it is vaporized at an approximate temperature of 140° C., and at an approximate pressure of 6250 kPag. In a preferred embodiment the phase change will occur within the lower lateral section 124 or the production well 128 to minimize the amount of friction between working fluid 200 and the remaining length of casing before working fluid 200 exits the fully cased downhole well loop 108, hence maximizing velocity of working fluid 200, however it will occur to a person's skilled in the art that the phase change to the working fluid 200 may occur anywhere underground within fully cased downhole well loop 108. It will occur to a person skilled in the art that the location along the flow path of the working liquid in fully cased downhole well loop 108 will change depending on the configuration of fully cased downhole well loop 108, the lengths and depths of components within fully cased downhole well loop 108, the flow rate of working liquid 200, and the boiling point of the working fluid 200 as well as rock formation 320 temperature, conduction rate from rock through the steel casing 156 and cement 152 into the working fluid 200.

At step 425, the gaseous working fluid 208 rises to the surface 316 through production well 128, insulated production pipe 166 and common well segment 118, and exits fully cased downhole well loop 108 at opening 110A. As the gaseous working fluid 208 rises to the surface 316, there will be a slight loss in pressure and temperature due to the change in depth, however the temperature of the working fluid 200 will be high enough to maintain the gaseous state of the working fluid 208. The approximate temperature and pressure of gaseous working fluid 208 at the outlet of opening 110A is between about 90° C. and about 110° C., with a preferred temperature of about 106° C., and between about 3000 kPag and about 4000 kPag, with a preferred pressure of 3500 kPag. The gaseous working fluid 208 is then conveyed towards turbine system 132 along connector piece 168.

As such, in the current embodiment, as the temperature of liquid working fluid 204 is approximately 30° C. and about 1080 kPag at the inlet of opening 110A, and the temperature of gaseous working fluid 208 is approximately 106° C. and about 3500 kPag at the outlet of opening 110A, the trip through fully cased downhole well loop 108 by working fluid 200 increased its temperature by approximately 76° C. and increased the pressure of working fluid 200 by approximately 2170 kPag. In addition, in the current embodiment, the residence time of working fluid 200 between entering the inlet of opening 110A and exiting the outlet of opening 110A is approximately 30 minutes. A person skilled in the art will recognize that the temperature difference and the residence time is affected by multiple factors, including, but not limited to the configuration, depth and lengths of components of fully cased downhole well loop 108, as well as rock formation 320 temperature, rock thermal conductivity, conduction rate from rock through casing 156 and cement 152 into the working fluid 200, and flow rate of working fluid 200.

In the current embodiment, where working fluid 200 is propane, the temperature of the propane may range from an approximate temperature of the ambient surroundings/environment (ambient temperature) when entering fully cased downhole well loop 108 at the inlet of the opening 110A to 185° C. when exiting fully cased downhole well loop 108 at the outlet of opening 110A. The ambient temperature may vary depending on the environment that the geothermal energy generating system 100 is located in and may range between −43° C. to 45° C.

In the current embodiment, turbine system 132 is a turbo expander. At step 430, turbine system 132 receives the gaseous working fluid 208, where the gaseous working fluid 208 will drive the turbine (also referred to herein as turbine wheel) thereby generating mechanical energy. As the turbine wheel is connected to the shaft, which is connected to electrical generator, the mechanical energy is transferred to the electrical generator, which in turn, at step 435, converts the mechanical energy into electrical energy. In the embodiment the gaseous working fluid 208 is expanded by virtue of the shape of the expander/valve and the pressure and temperature of gaseous working fluid 208 is also lowered while spinning the radial turbine connecter to the shaft. The approximate pressure and temperature of the propane gaseous working fluid 208 leaving turbine system 132 is be within the range of about 1500 kPag and about 63° C. and about 700 kPag and about 16° C. In preferred embodiments, the approximate pressure and temperature of gaseous working fluid 208 may be easily condensed from gaseous working fluid 208 to liquid working fluid 204 from the ambient air temperature through cooler 136. The electrical energy generated by the electrical generator at step 435 is approximately 1 MW and may fluctuate depending on cooler condensing pressure at ambient conditions. As such a reduction on the load required for cooler 136 to condense gaseous working fluid 208 will increase the net electrical energy generated by the electrical generator. A person skilled in the art will recognize that any reduction on the parasitic loads, for example, the need to use energy for cooling gaseous working fluid 200, will increase the amount of electrical energy generated, and increase the efficiency of the geothermal energy generating system 100. It will occur to a person skilled in the art that in certain embodiments, depending on the efficiency of turbine system 132 and the specifications of the working fluid 200, the working fluid 200 departing from turbine system 132 may be in a mixed state of both gas and liquid.

At step 440, the gaseous working fluid 208 departing from turbine system 132 may travel along connecting piece 172, and be received by cooler 136. Cooler 136 may condense the gaseous working fluid 208 into a liquid state. At the exit of cooler 136 the temperature and pressure of propane liquid working fluid 204 may be 30° C. and 1080 kPag, but may fluctuate depending on ambient air temperature and pressure.

Upon departure of cooler 136, liquid working fluid 204 may return to pump 104 via connecting piece 176, where the liquid working fluid 204 is once again circulated as can be seen by step 405.

Figure 5:
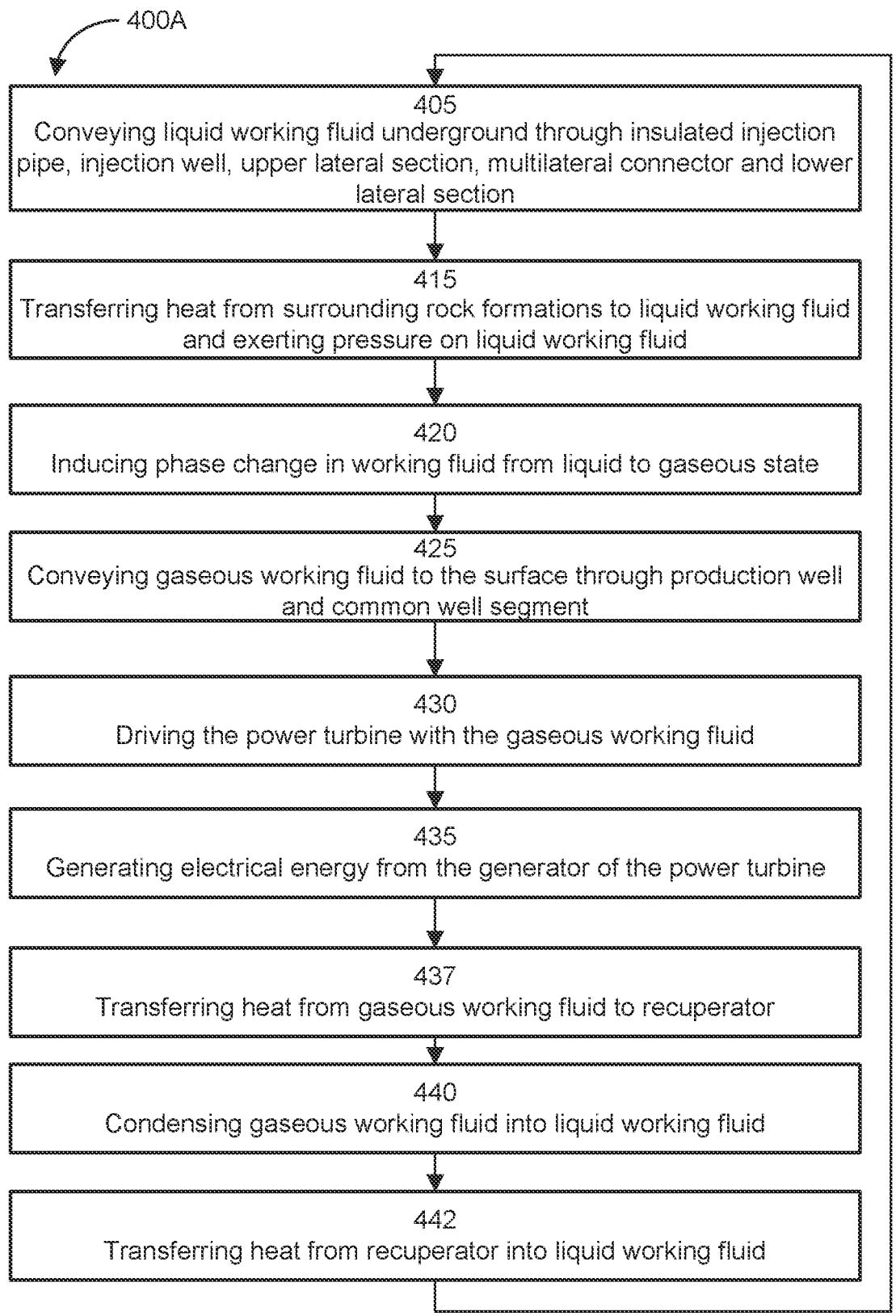
FIG. 5 is a flow chart setting out the steps of an alternate method of generating energy from geothermal sources in accordance with the embodiment shown in FIG. 3.

Referring to FIG. 5, there is shown a flowchart setting out the steps of a method 400A for operating the geothermal energy generating system 100A in accordance with an embodiment of the invention. For convenience, like reference numerals are used in FIGS. 4 and 5 to depict like steps.

Method 400A is similar in all material respects to method 400 except that there are additional steps 437 and 432 with relate to the recuperator 184.

Steps 405, 415, 420, 425, 430 and 435 are performed as described above in the context of method 400 shown in FIG. 4. Step 437 occurs after step 435, where the gaseous working fluid 208 transfers heat to a parallel pipe containing liquid working fluid 204 (which is received by liquid working fluid 204 as detailed below at step 442). By transferring heat via recuperator 184, the temperature of the gaseous working fluid 208 drops and hence cooler 136 may require less energy to condense gaseous working fluid 208 in subsequent step 440. The temperature of the gaseous working fluid 208 after departure of recuperator 184 and prior to being received at cooler 136 is a decrease in temperature by approximately 15° C.

Thereafter, step 440 is performed as described above in the context of method 400 shown in FIG. 4, that is, the gaseous working fluid is condensed into liquid working fluid. Following step 440, the liquid working fluid 204 enters recuperator 184 and receives heat therefrom, at step 442. More specifically, recuperator 184 interacts with working fluid 200 at two locations along the single heat exchange loop, specifically after turbine system 132 as gaseous working fluid 208, and after pump 104 as liquid working fluid 204. The two pipes carrying working fluid 200 are in close proximity while in recuperator 184, allowing the transfer of heat from the gaseous working fluid 208 to the liquid working fluid 204. As such, at step 442, the liquid working fluid 204 receives heat from the gaseous working fluid 208 (which is transferred from gaseous working fluid 208 at step 437), thereby raising the temperature of liquid working fluid 204 before continuing onwards to insulated injection pipe 114. In this embodiment, the temperature of the liquid working fluid 204 after leaving recuperator 184, and prior to arriving insulated injection pipe 114 can be increased by as much as 10° C.

It will occur to a person skilled in the art that the approximate temperature ranges and approximate pressure ranges provided above may change depending on the configuration of the geothermal energy generating system 100 or 100A, and may also change depending on the specifications of the working fluid 200 being used and the ambient air temperature. A person skilled in the art will also recognize that despite being provided approximate temperature ranges and pressure ranges in the aforementioned embodiment where the preferred working fluid 200 is a carbon-based commercially available and environmentally friendly refrigerant, geothermal energy generating system 100 will continue to operate despite the preferred working fluid 200 being outside the approximate temperature ranges and pressure ranges.

Figure 6A:
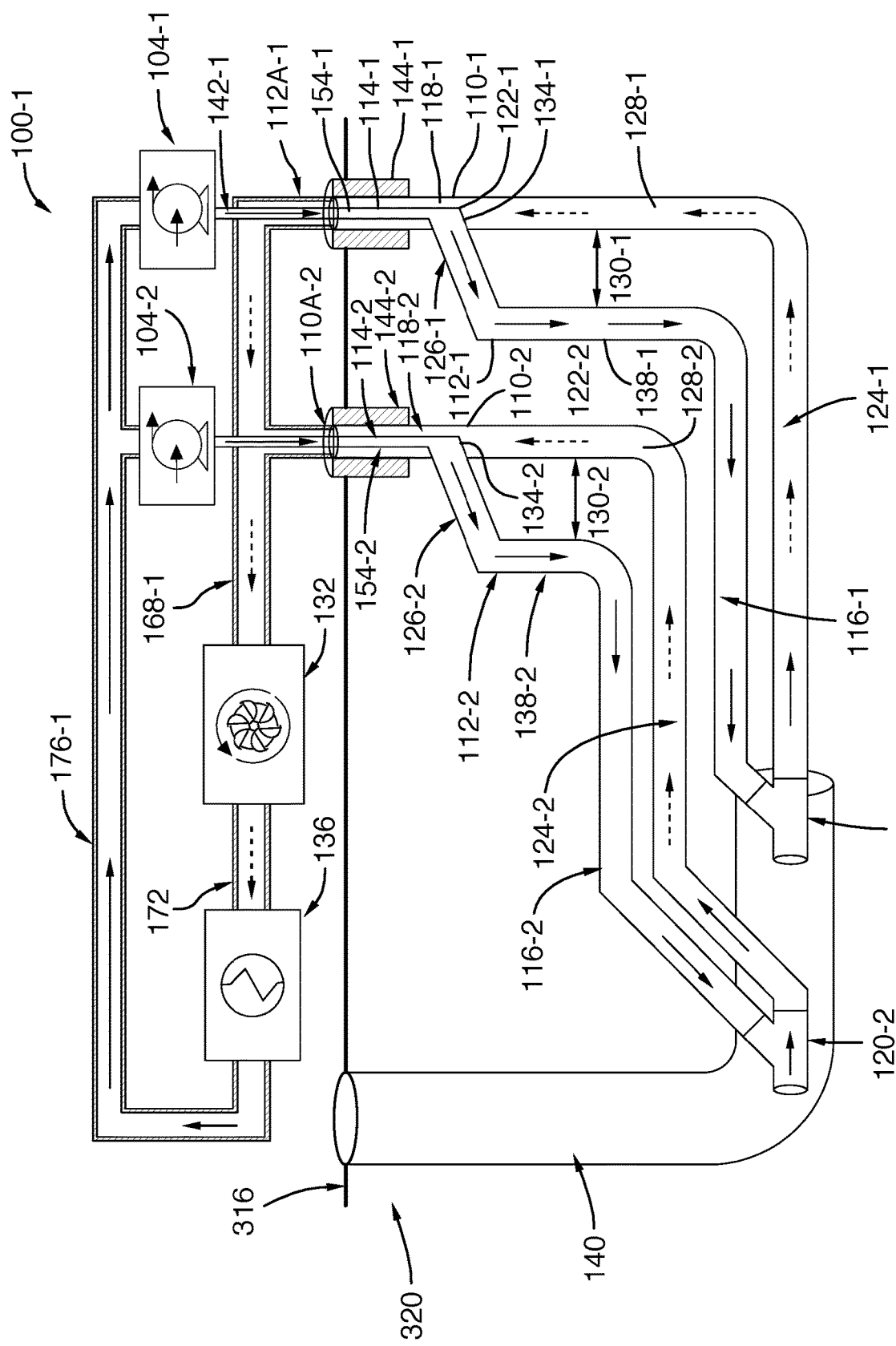
FIG. 6A is a schematic cross-sectional view showing an alternate embodiment of a system for generating energy from geothermal sources with two fully cased downhole well loops connected to a single access well in accordance with an embodiment.

Referring to FIG. 6A, an embodiment of the geothermal energy generating system 100-1 is shown, which includes two fully cased downhole well loops, 108A and 108-2, where both two fully cased downhole well loops 108-1 and 108-2 are connected to a single connection wellbore 140. As will be described further below, this facilities the construction as only a single connection wellbore 140 needs to be drilled. Furthermore, by using a single connection wellbore 140, the footprint of the geothermal energy generating system is further minimized. A person skilled in the art will recognize that the geothermal energy generating system 100-1 is not limited to two fully cased downhole well loops, but may any number of fully cased downhole well loops.

In the embodiment of geothermal energy generating system 100-1, the two fully case downhole well loops 108-1 and 108-2 each have their own multilateral connector 120-1 and 120-2 respectively. As can be seen from the placement of multilateral connectors 120-1 and 120-2, the extension of a lateral section off of connection well 140 allows for the further placement of additional multilateral connectors 120. Said lateral section off of connection well 140 may be further extended to increase the number of multilateral connector 120 placed, and assuming there is space, allows for the placement of additional fully case downhole well loops 108. In alternate embodiments, additional multilateral connectors 120 may be placed at differing depths along connection well 140, or even at laterals that may be at differing depths. Furthermore, additional multilateral connectors 120 may also be placed at differing locations along the circumference of connection wellbore 140, or at laterals that branch off from connection wellbore 140 at different locations along the circumference of connection wellbore 140. A person skilled in the art will recognize the different potential configurations and arrangements of the placements of a plurality of multilateral connectors 120 in relation to connection well 140.

Figure 6B:
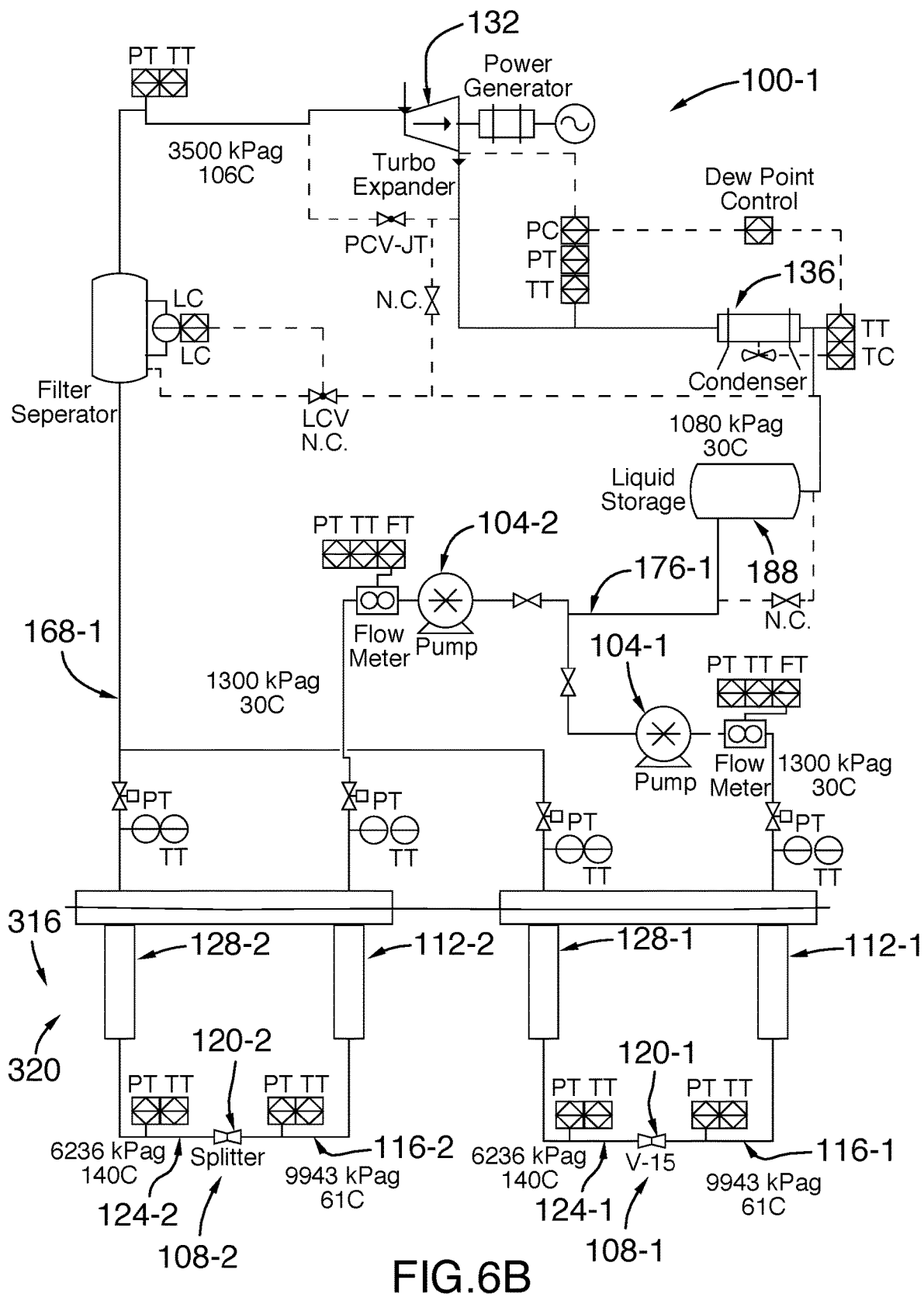
FIG. 6B is a conceptual schematic view of the embodiment of the system for generating energy from geothermal sources of FIG. 6A, where two fully cased downhole well loops are fluidly connected to a single turbine system and single cooler, and where the working fluid is propane.

Referring to FIG. 6B, the components of the two fully cased downhole well loops 108-1 and 108-2 can be seen. The two fully cased downhole well loops 108-1 and 108-2 have similar components to those of previously referenced fully cased downhole well loop 108 in FIGS. 1, 2, and 3. As such, components within each of these two fully cased downhole well loops 108-1 and 108-2 are similarly numbered to those of fully cased downhole well loop 108 and appended with either an -1 or -2 suffix to indicate the first or the second fully cased downhole well loop 108-1 or 108-2. Given that the components are similar, the components will not be described further.

In the embodiment 100-1, the two fully cased downhole well loops 108-1 and 108-2 operate in the same manner as previously referenced embodiment of fully cased downhole well loop 108, however, after leaving the respective openings 110A-1 and 110A-2, the two streams of gaseous working fluid 208 may be merged into a single stream to be received by a single turbine system 132. As such, merging connecting piece 168-1 may be configured to allow for said merging of two streams of gaseous working fluid 208. Furthermore, a single cooler 136 may receive the gaseous working fluid 208 exiting turbine system 132 to condense the gaseous working fluid 208 into liquid working fluid 204. The liquid working fluid 204 may then be split into two streams using splitter connecting piece 176-1 to be received by pump 104-1 and pump 104-2, where pump 104-1 may increase the pressure of liquid working fluid 204 to be injected into insulated injection pipe 114-1 pump 104-2 may increase the pressure of liquid working fluid 204 to be injected into insulated injection pipe 114-2.

In using embodiment 100-1, the amount of components or equipment required may be minimized as turbine system 132 and cooler 136 may be shared across fully cased downhole loops 108-1 and 108-2. This leads to further minimizing cost. Furthermore, the footprint and above ground surface area is minimized as there is only a single turbine system 132 and cooler 136 above ground, as opposed to a turbine system 132 and a cooler 136 for each fully cased downhole well loop 108-1 and 108-2. In the current embodiment, the surface area above ground may be approximately 30,100 m². In addition, scalability and economics of scale are inherent in the design of embodiment 100-1 as will be discussed below.

A person skilled in the art will recognize the modularity of turbine system 132, cooler 136 and pump 104. Specifically, a person skilled in the art will recognize that any number of fully cased downhole well loops 108 may be connected to a single turbine system 132, a single cooler 136 and a single pump 104. Alternatively, any number of fully cased downhole well loops may be connected to multiple turbine systems 132, a single cooler 136, and a single pump 104. Likewise, any number of fully cased downhole well loops may be connected as a single turbine system 132, multiple coolers 136 and a single pump 104. Or as can be seen from embodiment 100-1, multiple pumps 104 may be used. As such, a person skilled in the art will recognize the different combinations and variations of fully cased downhole well loops 108, turbine systems 132, coolers 136 and pumps 104.

Furthermore, as previously indicated, geothermal energy generation system 100-1 may be of any number of fully cased well loops 108 connected to a single connection wellbore 140. It will occur to a persons skilled in the art that the are multiple different possible arrangements of any number of fully cased well loops 108 associated with a single connection wellbore, where some arrangements may allow for a smaller footprint of surface area used. FIG. 6C provides an example arrangement of five fully cased well loops (each provided as reference numerals 108-1, 108-2, 108-3, 108-4 and 108-5) connected to a single connection wellbore 140. A lateral section 140A extends away from connection well 140, providing areas to place multilateral connectors 120 for each of the five fully cased downhole well loops. In a preferred embodiment, between each multilateral connector 120 may be an isolation packer 330, isolating each multilateral connector 120 for each fully cased downhole well loop 108 from each other. As can be seen, in FIG. 6C, each of the five fully cased downhole well loops includes a first and second lateral segment extending from the co-located well. In the current depicted embodiment, the five fully case downhole well loops are equidistant from one another, however, this may be changed depending on the surrounding rock formations. The trajectory of lateral section 140A is not limited and may vary. Furthermore, lateral section 140A is not limited to being straight, but may include a combination of angled and straight sections. Lateral section 140A is also not limited to having five fully cased downhole well loops 108, and may have additional or fewer fully cased downholwe well loops 108 in each lateral section 140A. In addition, there may be more than one lateral section 140A extending away from connection well 140. For example (not shown), there may be two lateral sections 140A extending away from connection well 140 in opposing directions, providing ten fully cased downhole well loops. A person skilled in the art will now recognize the different potential layouts, arrangements and configurations of fully cased downhole well loops 108 associated with connection well 140.

During commercial operation when numerous well loops are producing and selling power through a sales meter into an electrical power transmission line there is desire to control power generated. For example, where 25 MW needs to be delivered to an electrical grid, twenty-five (25) fully cased downhole well loops 108 may be used. An on/off power control scheme is used to export the optimal amount of power into the electrical grid on an hourly basis. The system may electronically monitor grid capacity and power demand then provide feedback to the facility process logic controller (PLC). In an embodiment where there is a single turbine system 132 connected to the twenty-five (25) fully cased downhole well loops 108, the PLC will then automatically turn off pumps 104 and other rotating equipment and close electronically actuated well head valves to quickly "turn off" individual geothermal well loops. This on/off control system allows the facility to change power output between 0 MW to 25 MW in 1 MW increments. Alternatively, in an embodiment where there are twenty-five (25) turbine systems 132 connected to twenty-five (25) fully cased downhole well loops 108, the PLC may then turn off pumps 104 for each fully cased downhole well loops 108 and turn off turbine systems 132, allowing for the facility to provide power output between 0 MW to 25 MW in 1 MW increments.

This control scheme can also be used on a predetermined schedule. The advantages of the on/off control system is that is relatively simple to design and operate and provides good power output control. This control scheme can be used because the single closed loop system as shown in FIG. 6B where the working fluid only interacts with the underground reservoir through conduction. No reservoir fluids enter the geothermal loop and no well working fluid 200 enters the reservoir. All well heating occurs through conductive heat transfer. For this reason, power production can be rapidly changed by isolating working fluid 200 flow rate into the insulated injection pipes 114 and injection wells 112 which halts that well's electric power generation. Also, when a well is turned off it allows the underground rock to "recharge" through conductive heating and the fully cased downhole well loop 108 will be able to produce increased power (compared to steady state operation) when it is turned back on. A person skilled in the art will recognize the ability of the control scheme described above to control any number of fully cased downhole loops 108 and turbine systems 132.

Figure 7A:
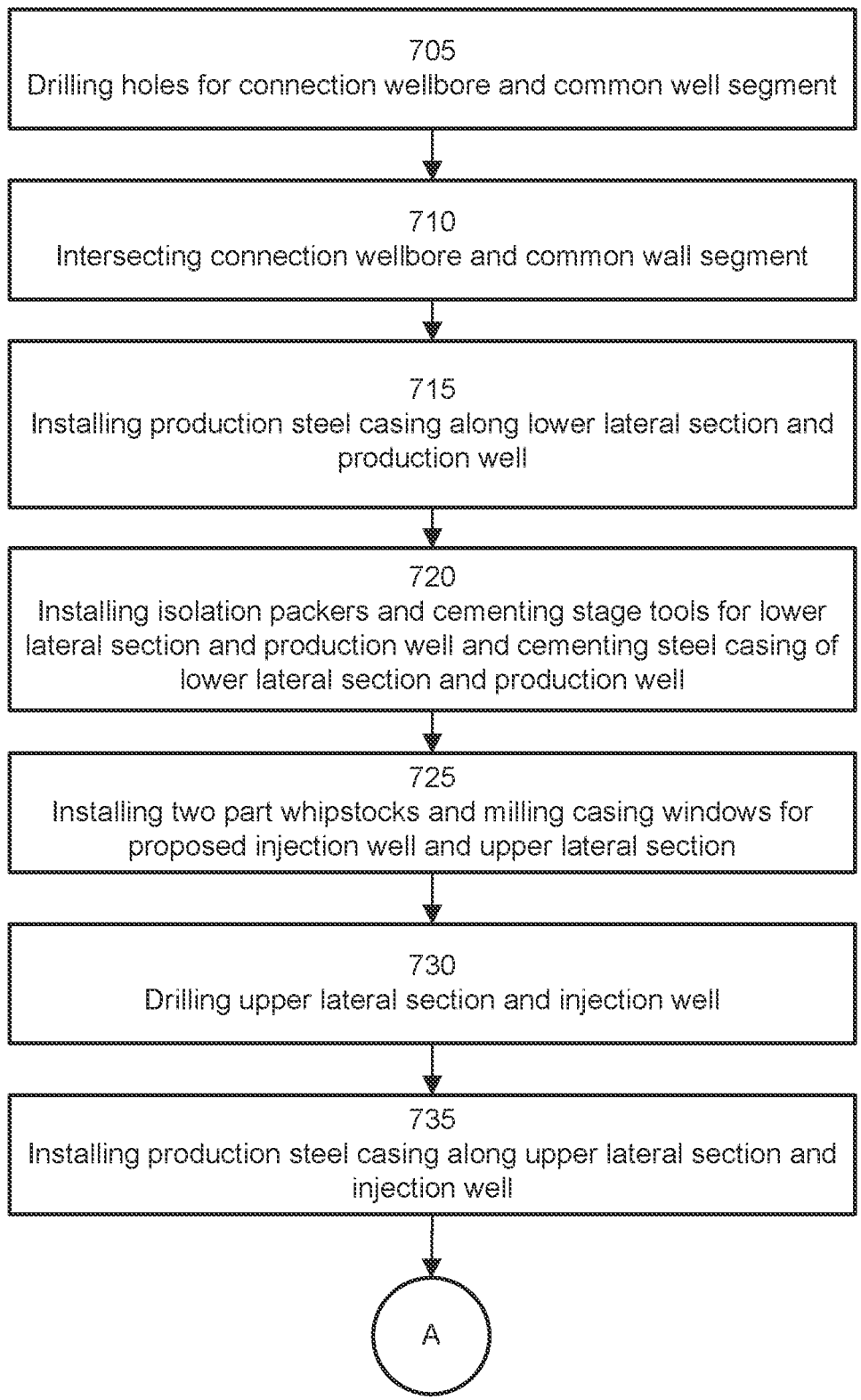
FIG. 7A is a first flow chart setting out the steps of a method of constructing the system for generating energy from geothermal sources shown in FIG. 1 in accordance with an embodiment of the invention.
Figure 7B:
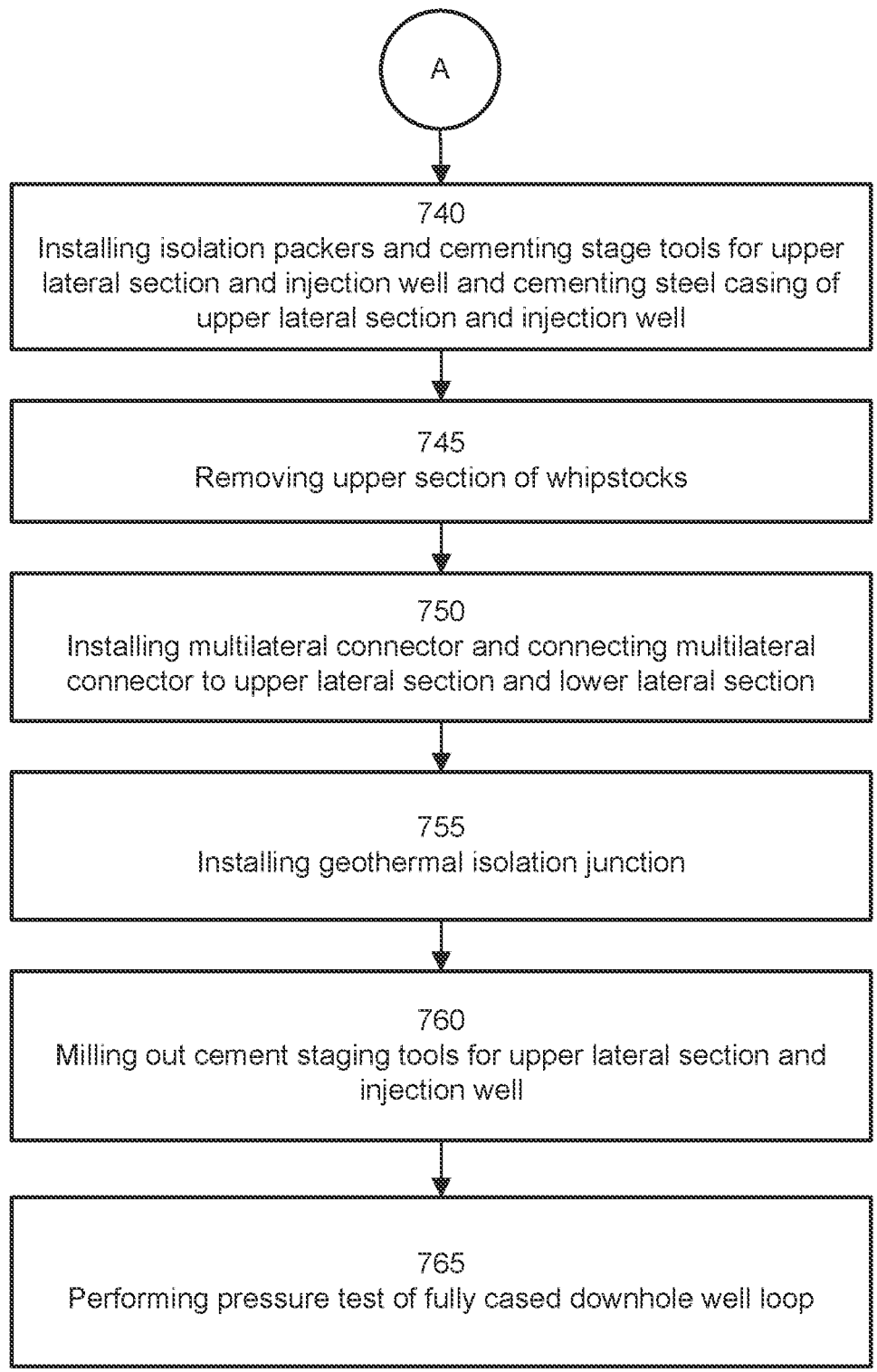
FIG. 7B is a second flow chart continuing the steps of the method of constructing the system for generating energy from geothermal sources of FIG. 7A.

Referring to FIG. 7, there is shown a flowchart setting out the steps of a method 700 of constructing the fully cased downhole well loop 108 of the geothermal energy generating system 100 in accordance with an embodiment of the invention. More specifically, the steps of method 700 are in accordance with the embodiment of system 100 depicted in FIG. 1. The construction of the fully cased downhole well loop 108 uses drilling rigs to drill and connect the connection wellbore 140 and the wellbore 174 comprising the common well segment 118 and production well 128, and to further drill the injection well 112 as a branch off of the common well segment 118 at connecting point 122. As will become evident in method 700, the initial drilling of connecting wellbore 140 and common well segment 118 of a wellbore 174 may require at least one larger drilling rig to land heavy intermediate casings. Alternatively, two larger drilling rigs may be used, one for drilling connecting wellbore 140 and landing heavy intermediate casings in connecting wellbore 140, and a second for drilling common well segment 118 of wellbore 174 and landing heavy intermediate casings in wellbore 174.

Step 705 includes drilling the connection wellbore 140, and common well segment 118. In the current embodiment described below, the connection wellbore 140 may be drilled first, however it will occur to a person skilled in the art that the common well segment 118 may also be drilled first, or that connection wellbore 140 and common well segment 118 may be drilled concurrently. It will also occur to a person skilled in the art that connection wellbore 140 may be an existing well that is repurposed to be used as connection wellbore 140. For example, connection wellbore 140 may be a pre-existing well used for oil drilling, or may be a pre-existing well with an already previously set surface casing or intermediate casing.

Figure 8:
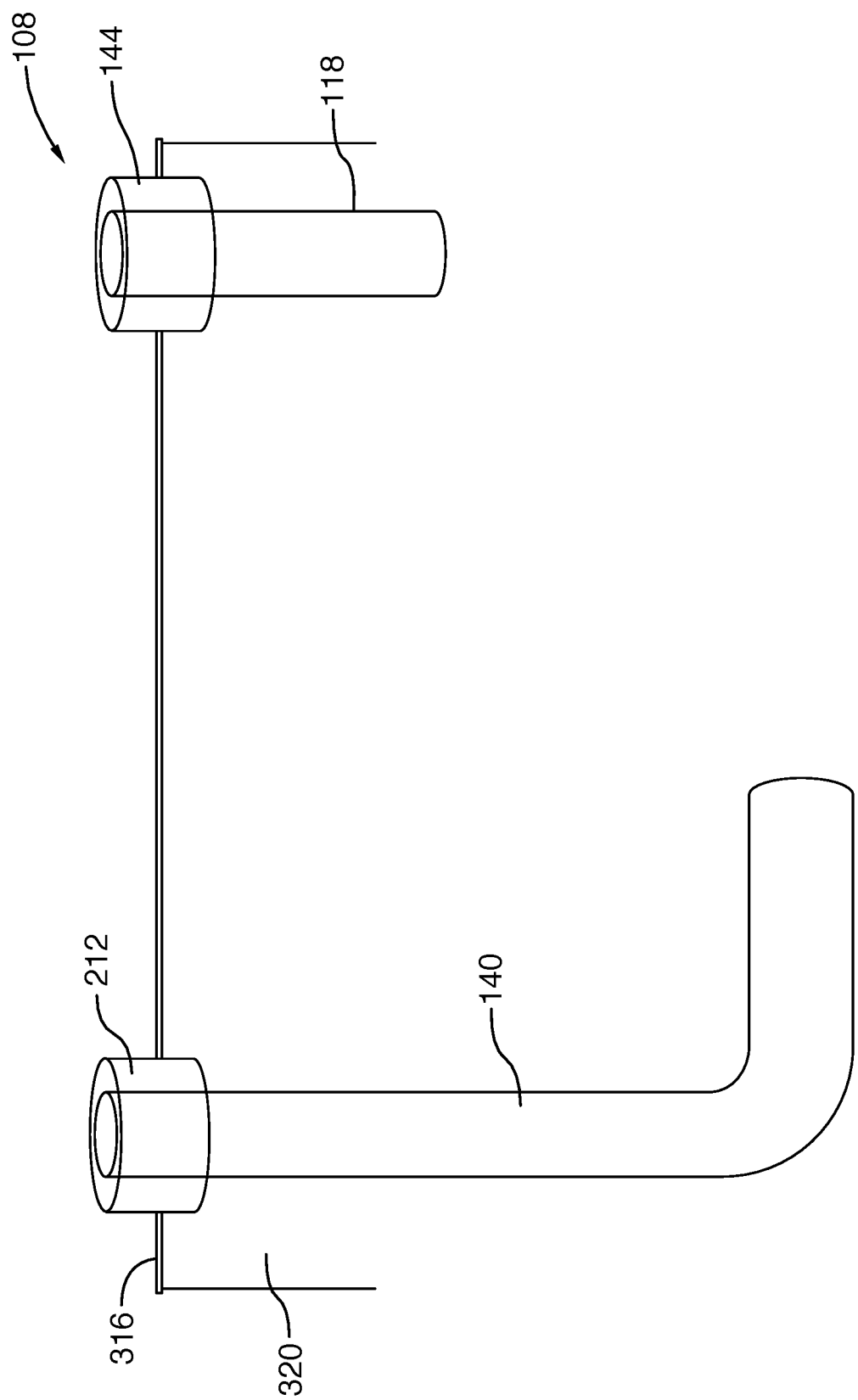
FIG. 8 is a schematic cross-sectional view depicting an initial step of constructing the system for generating energy from geothermal sources shown in FIG. 1, showing the drilling of the connection well, and the common well segment.

Returning to the current embodiment, where both connection wellbore 140 and common well segment 118 are to be drilled, two drilling rigs may be moved to and secured at separate surface locations. Referring to FIG. 8, this would be positions 304 and 308. Positions 304 and 308 are at a pre-determined distance apart of at least the length of the lateral sections 116 and 124 (as depicted in FIG. 1) and at any offset distance required for the building angle in the well trajectory. It will be evident to a person skilled in the art that the positioning of the two drilling rigs in this case is based on the embodiment of fully cased downhole well loop 108 where common well segment 118, the injection well 112, the production well 128, the lateral sections 116 and 124, and the multilateral connector 120 being along the same vertical plane, and that the positioning of the two drilling rigs may be adjusted based on the location and configuration of the components of fully cased downhole well loop 108.

The first drilling rig located at position 304 above the planned connection wellbore 140 may drill hole with a diameter of between 7⅞" and 12¼", and a depth of between 650 m and 2000 m. In a preferred embodiment, a hole with a diameter of 440 mm (17¼") and a depth of approximately 650 m is drilled. The drilling mud/drilling fluid used may be an environmentally friendly freshwater gel system. Examples of the drilling mud include, but are not limited to, a bentonite clay as the gel, along with additives such as barium sulfate (Barite), calcium carbonate (chalk) or hematite. A person skilled in the art will recognize the different drilling muds that may be used in association with the drilling rigs.

After the hole is drilled, surface casing 212 may be set in place. Surface casing 212 may be set in place, and a depth that matches the hole that was drilled. In a preferred embodiment, surface casing 212 is set in place with a diameter of 340 mm (13⅜") and will be run to a depth of approximately 650 m. The full length and circumference of surface casing 212 will be cemented to surface 316. Surface casing 212 is important to ensure the securing of planned connection wellbore 140 in place, prevent shallow formations from sloughing into the wellbore, and to provide a base for the class 5 blowout preventer described below.

The second rig located at position 308 at planned wellbore 174 and common well segment 118 may drill a second hole for surface casing 144. The hole drilled may have a diameter of between 12¼" and 17½" and a depth of between 300 m and 650 m. In a preferred embodiment, the hole drilled may have a diameter of 12¼" and 17½" and a depth of approximately 650 m. Similar to the drilling by the first rig located at position 304, the drilling mud of the second rig may be an environmentally friendly freshwater gel system.

After the second hole is drilled, surface casing 144 may be set in place. Surface casing 144 may be set in place with a diameter between 9⅝" and 13⅜", and with a depth of between 300 m and 650 m. In a preferred embodiment, surface casing 144 is set in place with a diameter of 9⅝" and 13⅜", and will be run to a depth of approximately 650 m. The full length and circumference of surface casing 144 will be cemented to the surface 316. Similar to surface casing 212, the purpose of surface casing 144 is to ensure the securing of planned injection well 112 in place, prevent shallow formations from sloughing into the wellbore, and to provide a base for the class 5 blowout preventer described below. In addition, surface casing 144 is to ensure no leakage of any working fluids 200 into the surrounding environment.

The cement casings used for both surface casing 144 and 212 will preferably have a total calculated hole volume plus 50% excess of thermal blend cement at 1860 kg/m³ (approximately 80 t total mass of the cement). The cement casing may then undergo a first preflush of 2.5 m³ fresh water. The cement casing may then undergo a second preflush of 5 m³ viscosified water weighted to 1200 kg/m³. An example of viscosified water includes Optiflush™. A person skilled in the art will recognize other forms or variations of viscosified water. The cement plug may then be dropped and displaced with fresh water.

Class 5 blowout preventers (not shown) may be installed in on or in proximity to surface casings 144 and 212. The class 5 blowout preventers are used to seal, control and monitor wellbore 174 and connection wellbore 140 to prevent blowouts. In the current embodiment, the class 5 blowout preventers are pressure tested to a low pressure of 1,400 kPa and a high pressure of 35,000 kPA, where each pressure is tested over a duration of at least ten (10) minutes. Class 5 blowout preventers may also be pressure tested depending on formation pressures and any relevant regulatory requirements. A person skilled in the art will recognize the different pressures and durations that class 5 blowout preventers may be tested to.

Drilling of holes for common well segment 118 and connection wellbore 140 will be directionally controlled with a directionally controlled drilling assembly with measure while drilling ("MWD") surveys to maintain target accuracy. Specifically, the first drilling rig at position 304 will drill a hole with a diameter of between 7⅞" to 12¼" through the surface casing 212 to a predetermined depth. In a preferred embodiment, first drilling rig will drill a 311 mm (12¼") diameter intermediate hole (not shown), through surface casing, to the predetermined depth. Initially, the connection wellbore 140 will be drilled vertically, and then directionally drilled to achieve a 90-degree inclination at landing point 228 in proximity to lower end 216 of connection wellbore 140. This landing point 228 will be in the geothermal target formation, which is located at a depth with the targeted temperature. In the current embodiment, connection wellbore 140 is drilled with an oil-based mud system to minimize washout and protect wellbore integrity. However, the drilling mud system used may be dependent on the area and historical drilling problems of the area. A person skilled in the art will recognize the different potential drilling mud systems that may be used.

Subsequently, an intermediate thermal casing 236 will be run the total depth of connection wellbore 140, and the intermediate thermal casing 236 may be cemented to the surfaces of the surrounding rock formations 320. In a preferred embodiment, intermediate casing 236 has a diameter of 244 mm (9⅝"), however in other embodiments, intermediate casing 236 may have a diameter of 7" to 9⅝". The intermediate thermal casing 236 may then undergo a first preflush of 5 m³ viscosified water, where the viscosified water is weighted to provide greater wellbore pressure/hydrostatic pressure than that of the formation pressure to maintain an overbalanced wellbore. The intermediate thermal casing 236 may then undergo a second preflush of 5 m³ scavenger weighted to 1450 kg/m³, or higher to maintain an overbalanced wellbore. An overbalanced wellbore will prevent the formation of gas or fluid from entering the wellbore and rising to the surface. The cement is then filled/provided into intermediate thermal casing 236 with a thermolite cement at total calculated hole volume plus 20% excess (approximately 75 t). The tail cement is then provided with a gastight cement at 20% (approximately 45 t). The inner diameter of the cement is then displaced with fresh water to create the hollow wellbore, leaving the outer diameter cemented to the rock formations 320.

The volumes and blends of the cement may be adjusted depending on historical well data, formation pressures and regional regulatory isolation requirements for certain formations to prevent crossflow contaminations.

Intermediate thermal casing 236 may be secured at wellhead/inlet 232 utilizing a speed head or an additional wellhead section to set slips. Slips (also referred to herein as anchors) may be set with intermediate thermal casing 236 in full tension to hold the intermediate thermal casing 236 inside surface casing 212. In certain embodiments, the class 5 blowout preventer on surface casing 212 may have to be disassembled for the installation of the slips. Once reassembled, the class 5 blowout preventer may be pressure tested again to the same pressures and specifications to confirm integrity of the class 5 blowout preventer after re-assembly, however with intermediate thermal casing 236 present in connecting well 140. The class 5 blowout preventers may also be pressure tested again to expected rock formation 320 pressures and/or regulatory requirements.

A gyroscopic wireline survey tool may be deployed in connecting wellbore 140. The gyroscopic wireline survey tool will allow continuous surveying from vertical to horizontal and point of refusal. The gyroscopic wireline survey tool provides well geometry with an extremely high level of accuracy, and gives exact coordinates of connecting wellbore 140 to assist in intersecting with wellbore 174 or other future intersections.

With respect to common well segment 118, the second rig, at position 308, will drill a hole (also referred to herein as intermediate hole), through surface casing 144, to a predetermined depth. The intermediate hole may have a diameter between 7⅞" and 12¼". In a preferred embodiment, the intermediate hole will have a diameter of 222 mm (8¾'). The predetermined depth may vary depending on the preferred temperature or geothermal target formation. In a preferred embodiment, the predetermined depth is between 1000 m and 3500 m. Similar to the first drill rig drilling the main hole of connection wellbore 140, the drilling of the main hole of common well segment 118 may be drilled with an oil-based mud system. The drilling assembly may then be removed from well. The gyroscopic wireline survey tool may then be deployed in common well segment 118 to provide the coordinates of common well segment 118 to assist in intersection with connection well 140. A new directionally controlled drilling assembly, complete with magnetic tool (as previously described Lodestone™ package) will be lowered into wellbore.

Subsequently, a second intermediate thermal casing 238 will be run the total depth of common well segment 118, and the intermediate thermal casing 238 may be cemented to the surfaces of the surrounding rock formations 320. In a preferred embodiment, intermediate casing 238 has a diameter of 9⅝", however in other embodiments, intermediate casing 238 may have a diameter of 7" to 9⅝". Similar to the intermediate thermal casing 236 of connection well 140, the intermediate thermal casing 238 may then undergo a first preflush of 5 m³ viscosified water, where the viscosified water is weighted to provide greater wellbore pressure/hydrostatic pressure than that of the formation pressure to maintain an overbalanced wellbore. The intermediate thermal casing 238 may then undergo a second preflush of 5 m³ scavenger weighted to 1450 kg/m³, or higher to maintain an overbalanced wellbore. An overbalanced wellbore will prevent the formation of gas or fluid from entering the wellbore and rising to the surface. The cement is then filled/provided into intermediate thermal casing 238 with a thermolite cement at total calculated hole volume plus 20% excess (approximately 75 t). The tail cement is then provided with a gastight cement at 20% (approximately 45 t). The inner diameter of the cement is then displaced with fresh water to create the hollow wellbore, leaving the outer diameter cemented to the rock formations 320.

Similar to intermediate thermal casing 236, the volumes and blends of the cement filled into intermediate thermal casing 238 may be adjusted depending on historical well data, formation pressures and regional regulatory isolation requirements for certain formations to prevent crossflow contaminations.

Intermediate thermal casing 238 may be secured at opening 110A utilizing a speed head or an additional wellhead section to set slips. Slips (also referred to herein as anchors) may be set with intermediate thermal casing 238 in full tension to hold the intermediate thermal casing 238 inside surface casing 144. In certain embodiments, the class 5 blowout preventer on surface casing 144 may have to be disassembled for the installation of the slips. Once reassembled, the class 5 blowout preventer may be pressure tested again to the same pressures and specifications to confirm integrity of the class 5 blowout preventer after re-assembly, however with intermediate thermal casing 238 present in common well segment 118. The class 5 blowout preventers may also be pressure tested again to expected rock formation 320 pressures and/or regulatory requirements.

Step 710 includes drilling out both intermediate thermal casings 236 and 238 and intersecting the two holes using ranging technology. Step 710 will use at least two drilling rigs, and the first drilling rig at position 304 and the second drilling rig at position 308 may be relocated to be used in step 710. Alternatively, depending on the size of the lateral segments, connection well 140 and common well segment 118, a drilling rig of a smaller size in comparison to those initially at positions 304 and 308 may be used. Using smaller drilling rigs may allow for additional savings in cost and/or capital. A person skilled in the art will recognize the different circumstances surrounding the use of drilling rigs of different sizes.

The first drilling rig may be positioned within connection wellbore 140 and will drill laterally from drilling position 282 in proximity of landing point 228 through intermediate casing 236 of connection wellbore 140 to begin the construction of lower lateral 124. The lateral may be drilled with an oil-based mud system to minimize washout and protect wellbore integrity. However, the drilling mud system used may be dependent on the area and historical drilling problems of the area. A person skilled in the art will recognize the different potential drilling mud systems that may be used.

After the lateral hole has been drilled, the directionally controlled drilling assembly may be removed from the well. A magnetic tool will then be lowered into wellbore to the end of the lateral hole. An example of the magnetic tool is the Lodestone™ provided by Scientific Drilling. The magnetic tool is an active ranging system built for intentional wellbore intersections. It can be used in conjunction with all MWD systems. The sensor of the magnetic tool may be deployed in connection wellbore 140 and magnetic sub may be deployed on directionally controlled drilling assembly in common well segment 118. The resulting magnetic field provides accurate ranging for the intersection between the connection wellbore 140 side and the wellbore 174 side, and also planning for a planned intersection point 240. In a preferred embodiment, potential landing point 224, where the proposed lower lateral section 116 and the bottom of production well 128 may be the planned intersection point

240. A person skilled in the art will recognize that planned intersection point 240 may be at any location along lower lateral section 116 and production well 128, however for the purposes of the below method of construction, the embodiment where the planned intersection point 240 is landing point 224 is described.

Concurrently, the second drilling rig may be positioned within wellbore 174 and will drill laterally from drilling position 286 in proximity to landing point 224 to intersect with the first drilling rig also drilling laterally along the same lower lateral 124. Similar to that of the first drilling rig drilling laterally from connection wellbore 140, the lateral may be drilled with an oil-based mud system to minimize washout and protect wellbore integrity. In addition, the drilling mud system used may be dependent on the area and historical drilling problems of the area. A person skilled in the art will recognize the different potential drilling mud systems that may be used.

Figure 9:
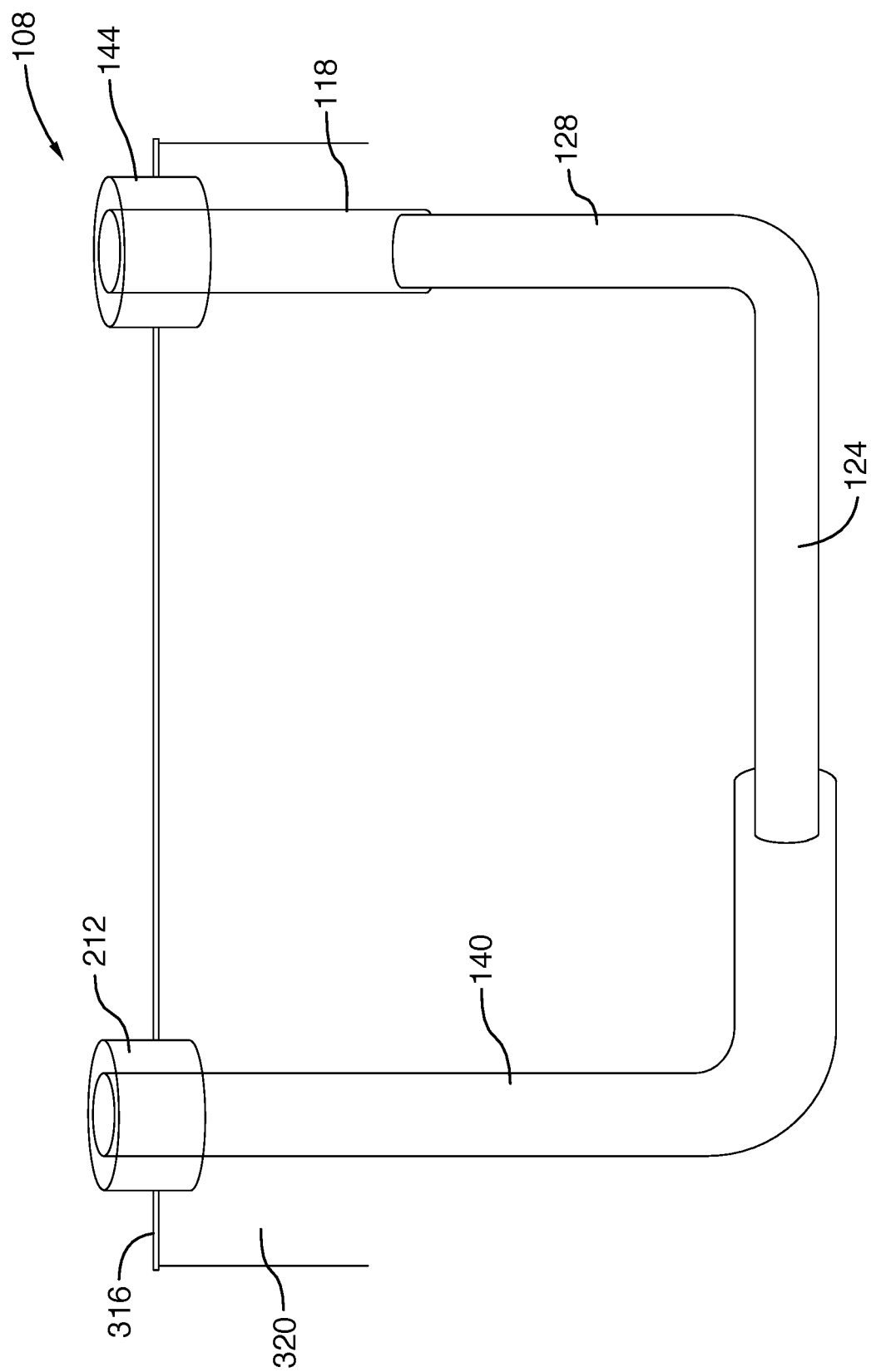
FIG. 9 is a schematic cross-sectional view depicting a second step of constructing the system for generating energy from geothermal sources shown in FIG. 1, showing the drilling of the production well and the first lateral section, where the production well and the first lateral section intersect.

The drilling assembly, which includes the magnetic sensor, such as the one part of the Lodestone™ package, may be lowered into common well segment 118 to drill downwards towards proposed landing point 224 to meet with the lower lateral 124 from connection wellbore 140. More specifically, the second drilling rig with the drilling assembly will drill downwards towards landing point 224 while the first drilling rig is also drilling laterally towards the landing point 224. The magnetic tool and magnetic sensor will help facilitate the intersection of the holes being drilled at landing point 224. Once both the lower lateral section 124 and production well 128 have intersected, both directionally drilling assemblies may be removed from the laterals. FIG. 9 depicts once both laterals have intersected.

While step 710 describes the step of intersecting the production well 128 and the lower lateral section 124, a person skilled in the art will recognize that if production well 128 is not drilled along the same downwards axis as that of common well segment 118, that drilling of production well 128 may still occur, and the drilling assemblies with magnetic tools and magnetic sensors will be able to facilitate a different intersection point 240, depending on the intended path and trajectory of the wells that may be subject to specifications of the rock formations 320.

Figure 10:
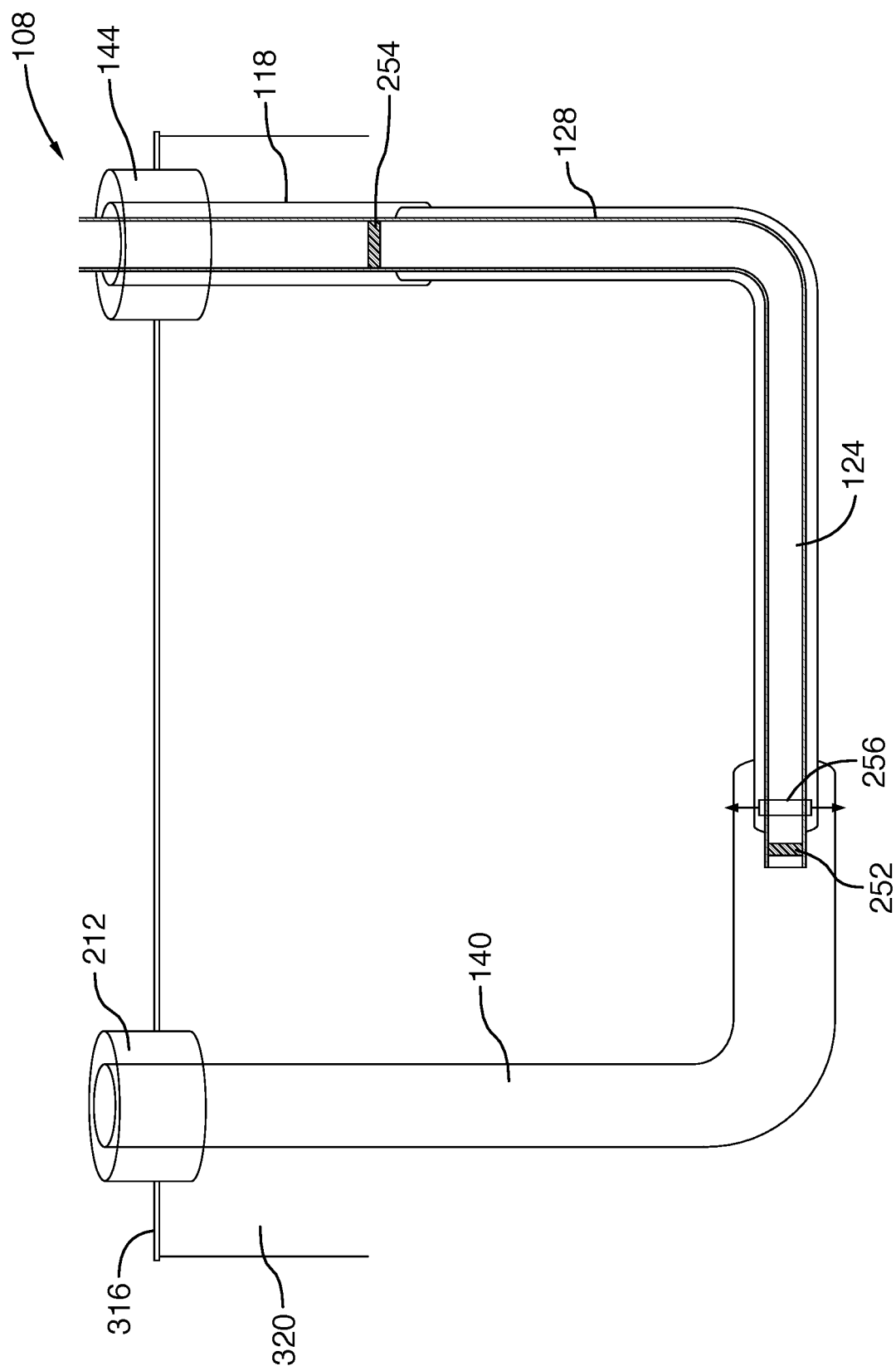
FIG. 10 is a schematic cross-sectional view depicting a third step of constructing the system for generating energy from geothermal sources shown in FIG. 1, showing the casing being installed along the production well and through part of the first lateral section, and also showing a first isolation packer and a first cementing stage tool being installed along the first lateral section in proximity to the construction well, and a second isolation packer being installed along the well between the common well segment and the production well, the cement being poured between the casing and the walls of the production well and part of the first lateral section.

At step 715 (shown in FIG. 7), production steel casing 156 is installed in the lower lateral section 124 between drilling positions 282 and 286 of the connection wellbore 140 and common well segment 118. Referring to FIG. 10, the production steel casing 156 (also referred to herein as production liner 156) will cover the open hole section at drilling positions 282 and 286 leading into common well segment 118 and connection wellbore 140 and extend into the inside diameter of both intermedia casings 236 and 238. The production steel casing 156 installed along lower lateral 124 may have a diameter between 4½" and 7". In a preferred embodiment, production steel casing 156 may have a diameter of 5½". Each end of production steel casing 156 will have a connection and/or seal assembly. The connection/seal assembly may be used to make a pressure tested connection with the multilateral connector 120 and geothermal isolation junction 170. In a preferred embodiment, the connection/seal assembly may be a polished bore receptacle. The polished bore receptacle will be completed with a Baker centralized/reversed sealbore extension and anchor seal assembly latch profile (not shown).

Custom built steel centralizers (not shown) may also be attached to exterior of casing 156, prior to cementing. Centralizers are typically designed to lift casing 156 from the bottom of lower lateral section 124, thus allowing the cement to encircle casing 156 completely. The custom built elongated centralizers may also be used to provide increased conductivity (as they are made of steel) between formation heat and steel body of casing 156 directly through the cement 152. As previously stated, hematite additions may be also added to cement 152 to optimize conductivity.

At step 720 (shown in FIG. 7), production steel casing 156 is cemented into place. An isolation packer 252 and a cementing stage tool 256 are installed in proximity to drilling position 282. The calculated amount of thermal cement may be pumped and displaced. A second isolation packer 254 may be installed in proximity to drilling position 286. The common well segment 118 well be separated from production steel casing 156. Excess thermal cement will be circulated to surface 316 along wellbore 174 and discarded.

The isolation packers 252 and 254 is a rubber element, which can be expanded to create an impermeable seal between the outer diameter of the production steel casing 156 and the inner diameter of the intermediate thermal casing 236. This will prevent cement from entering remaining intermediate casing and causing a blockage in either connection well 140 or common well segment 118. In a preferred embodiment, two isolation packers 252 and 254 at each drilling position 282 and 286 may be used to increase the integrity of seal packers (not shown).

The cementing stage tool 256 will be opened (which also creates an inner diameter plug at the end of the production steel casing 156 to prevent cement from entering connection well 140. Production steel casing 156 may then be cemented in place. Cementing production steel casing 156 includes first circulating the lower lateral 124 and production well 128 between drilling positions 282 and 286 clean of all drill cuttings. A first dart may then be placed in lower lateral 124 and production well 128 to inflate the isolation packers 252 and 254 and to open cementing stage tool 256 to allow cement to be circulated around the outer diameter of production steel casing 156. The lower lateral section 124 and production well then undergo a first preflush of 5 m$^3$ viscosified water, where similar to previous flushings the viscosified water is weighted to maintain an overbalanced wellbore. Lower lateral section 124 and production well 128 then undergo a second preflush of 5 m$^3$ scavenger, the scavenger weighted to 1450 kg/m$^3$ to maintain the overbalance within lower lateral section 124. The cement is then filled/provided into intermediate thermal casing 236 with a thermolite cement at total calculated hole volume plus 20% excess (approximately 62 t). The tail cement is then provided with a gastight cement at 20% excess (approximately 98 t). The cement is then displaced with fresh water. A person skilled in the art will recognize that similar to the abovementioned drilling procedures for connecting well 140, that volumes, blends and intervals of cement and preflushing may be adjusted based on historical data of the geographical locations and formations, formation pressures and regional regulatory isolation requirements for certain formations to prevent crossflow contaminations. A second dart is also placed into lower lateral section 124 and production well 128 and will land in cementing stage tool 256 (which acts as a check valve), which will close cementing ports, effectively blocking cement from flowing back up either connection well 140 or common well segment 118.

Production steel casing 156 will be set in tension with automatic slips in a casing bowl, where the casing bowl allows the production steel casing 156 to be bolted to the class 5 blowout preventer.

Figure 11:
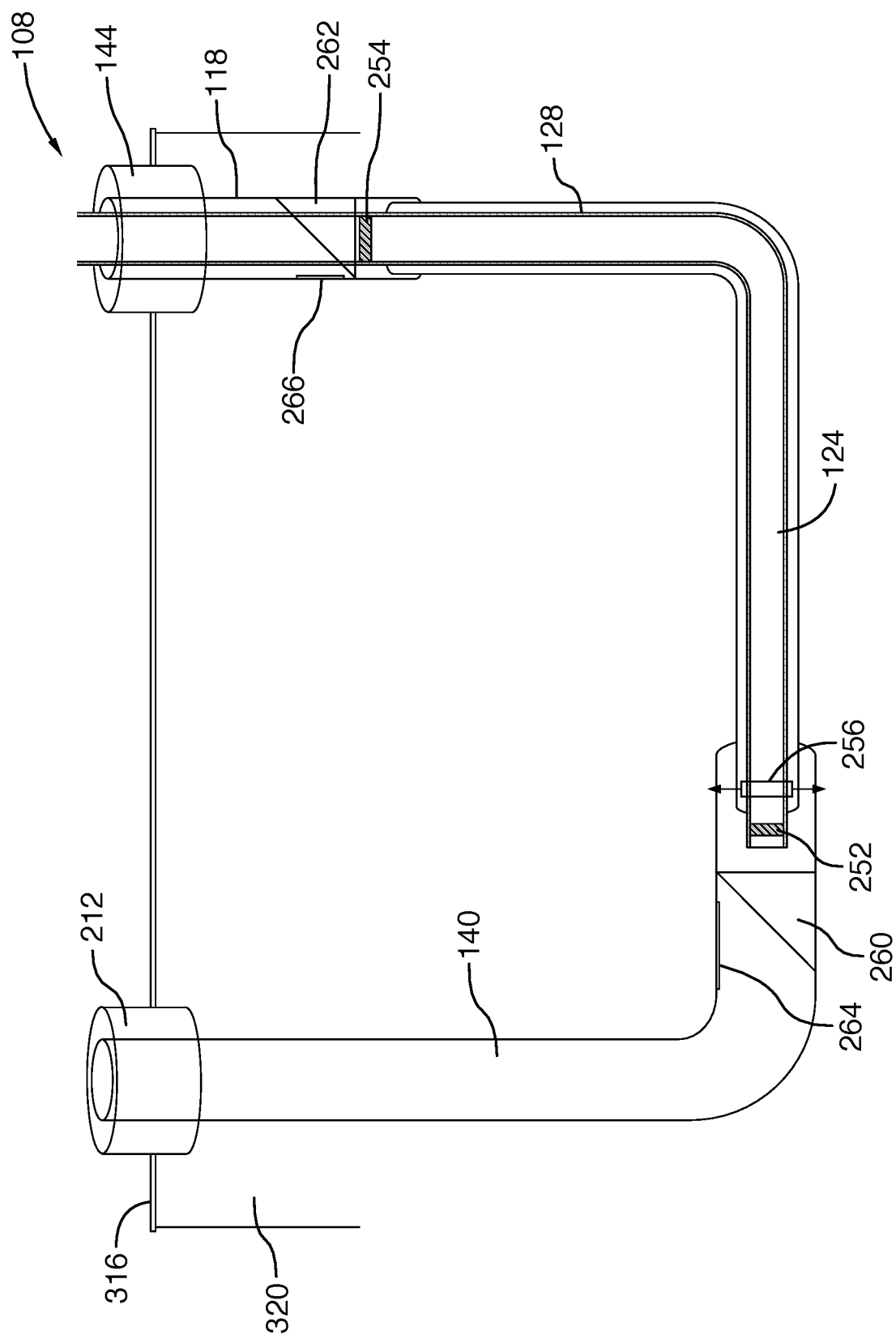
FIG. 11 is a schematic cross-sectional view depicting a fourth step of constructing the system for generating energy from geothermal sources shown in FIG. 1, showing a first two-part whipstock being installed in proximity to the first isolation packer, a first open hole of the first casing window in proximity to the first two-part whipstock, a second two-part whipstock being installed in proximity to the second isolation packer, and second open hole of the second casing window in proximity to the second two-part whipstock.

At step 725 (shown in FIG. 7), two-part whipstocks 260 and 262 are installed, and casing windows 264 and 266 are milled. Referring to FIG. 11, the two-part whipstock 260 (also referred to herein as whipstock 260) is installed within lower lateral section 124 in proximity to isolation packer 252, between the landing point 228 and the isolation packer 252. The whipstock 260 includes an upper section (spoon), which forces the pineapple mill (not shown) to cut a diamond shaped window 264 (also referred to herein as milled window 264 and bridging hole 264) through intermediate casing A second two-part whipstock 262 is installed approximately 700 m below the surface 316 along wellbore 174 at the connecting point 122 between common well segment 118 and production well 128. The whipstock 262 may also include an upper section (spoon) which forces the pineapple mill (not shown) to cut a window 266 along a vertical section of wellbore 174. In a preferred embodiment, whipstocks 260 and 262 are installed concurrently, and casing windows 264 and 266 are also milled concurrently. However, it will occur to a person skilled in the art that whipstock 260 may be installed first, or whipstock 262 may be installed first. Similarly, casing window 264 may be milled first, or casing window 266 may be milled first. A person skilled in the art will recognize the different potential sequences upon which whipstocks 260 and 262 may be installed, and casing windows 264 and 266 may be milled.

Whipstocks 260 and 262 also include a lower section (not shown) which includes a guide and anchor (not shown) which may be set permanently in intermediate casing. The guide allows drilling and completion assemblies to be forced out through the window, in addition to a smaller diameter hole through the center of the guide. This allows completion assemblies to be diverted through to lower section of wellbore. A person skilled in the art will recognize the use of whipstocks and their uses in creating wellbore junctions.

Whipstocks 262 and milled window 266 will also allow the angled section 126 and the vertical section 138 of injection well 112 to be drilled. Furthermore, whipstock 260 and milled window 264 will allow the upper lateral section 116 to connect to a future installed multilateral connector 120.

Figure 12:
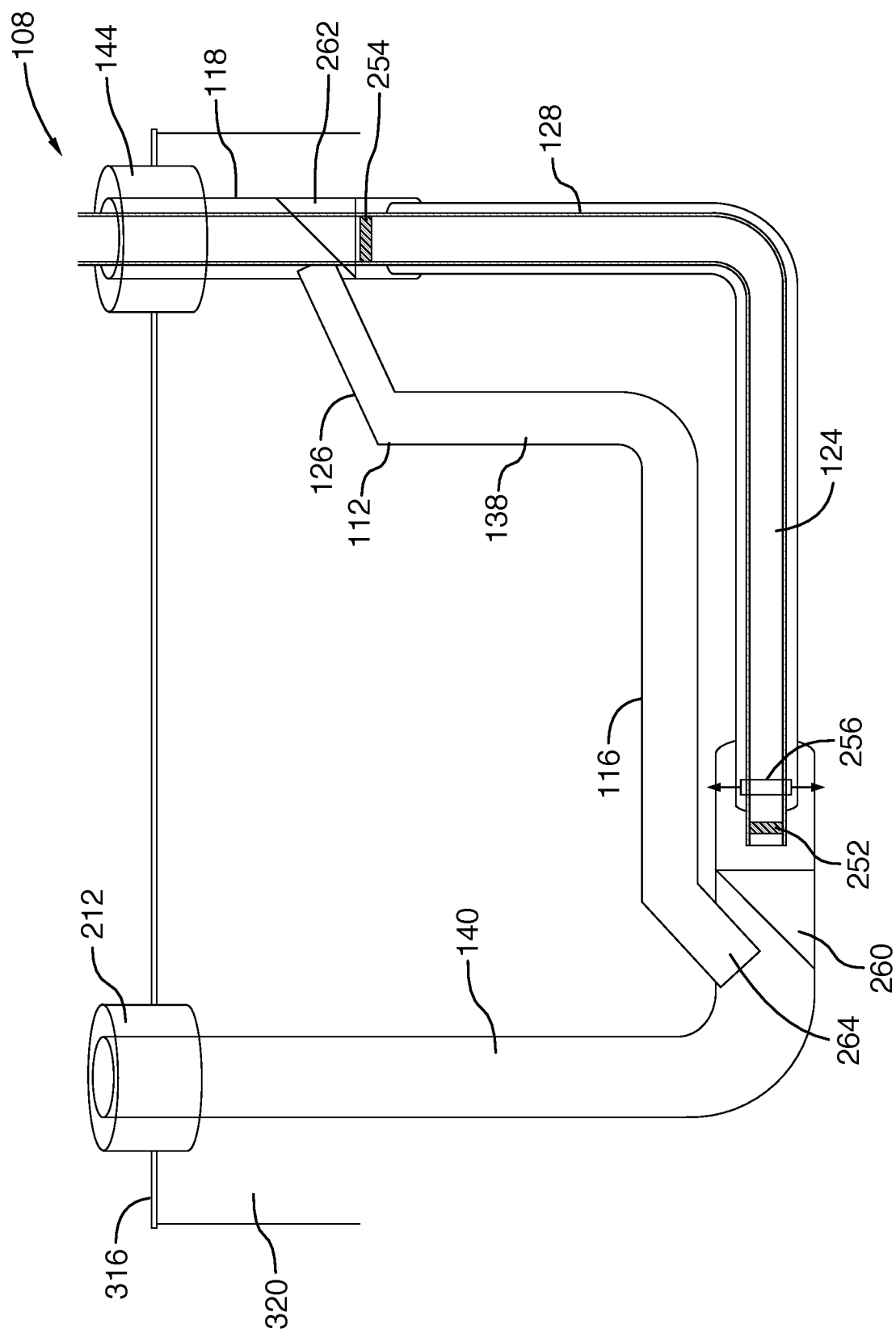
FIG. 12 is a schematic cross-sectional view depicting a fifth step of constructing the system for generating energy from geothermal sources shown in FIG. 1, showing the drilling of the injection well and the second lateral section.

At step 730 (shown in FIG. 7), the upper lateral section 116 and injection well 112 are drilled, linking milled windows 264 and 266. Referring to FIG. 12, the first drilling rig may drill upper lateral section 116 starting from milled window 264, drilling towards wellbore 174. In a preferred embodiment, upper lateral section 116 is drilled with an oil-based mud system to minimize washout and protect wellbore integrity. However, the drilling mud system used may be dependent on the area and historical drilling problems of the area. A person skilled in the art will recognize the different potential drilling mud systems that may be used.

Similar to the drilling of lower lateral 124, the direction drilling assembly may be removed from the well. A magnetic tool will then be lowered into connection wellbore 140 to casing window 264. The magnetic tool may be an active ranging system that may be used in conjunction with MWD systems. More specifically, the magnetic sensor may be deployed in upper lateral 116, and the magnetic sub, may be deployed in injection well 112, which will be further discussed below. The magnetic sensor and the magnetic sub allows for accurate ranging for the intersection of the upper lateral 116 and the injection well 112.

Concurrently, the second drilling rig may drill injection well 112 starting from milled window 266. Specifically, angled section 126 may be drilled by second drilling rig at milled window 266. After drilling angled section 126 for the predetermined length, vertical section 138 may be drilled.

Angled section 126 and vertical section 138 of injection well 112 may be drilled with an oil-based must system to minimize washout and protect wellbore integrity. However, the drilling mud system used may be dependent on the area and historical drilling problems of the area. A person skilled in the art will recognize the different potential drilling mud systems that may be used.

A drilling assembly may be used for drilling the angled section 126 and the vertical section 138. In a preferred embodiment, the drilling assembly may include a magnetic sensor. The magnetic sensor may be part of the Lodestone™ package. The drill assembly may be lowered through common well segment 118 for access to drill injection well 112. The drill assembly with the magnetic sensor and the magnetic tool in the upper lateral section 116 facilitates the intersection of the two wellbores. Specifically, the drilling assembly facilities the intersection of the vertical section 138 of the injection well 112 and the upper lateral section 116. In a preferred embodiment, the injection well 112 and upper lateral section 116 intersect at intersection point 290. However, a person skilled in the art will recognize that the intersection point 290 may be along any point of upper lateral section 116 or at any point along injection well 112. Once injection well 112 and upper lateral section 116 have intersected, both drilling assemblies from the first and the second drilling rig may be removed.

Figure 13:
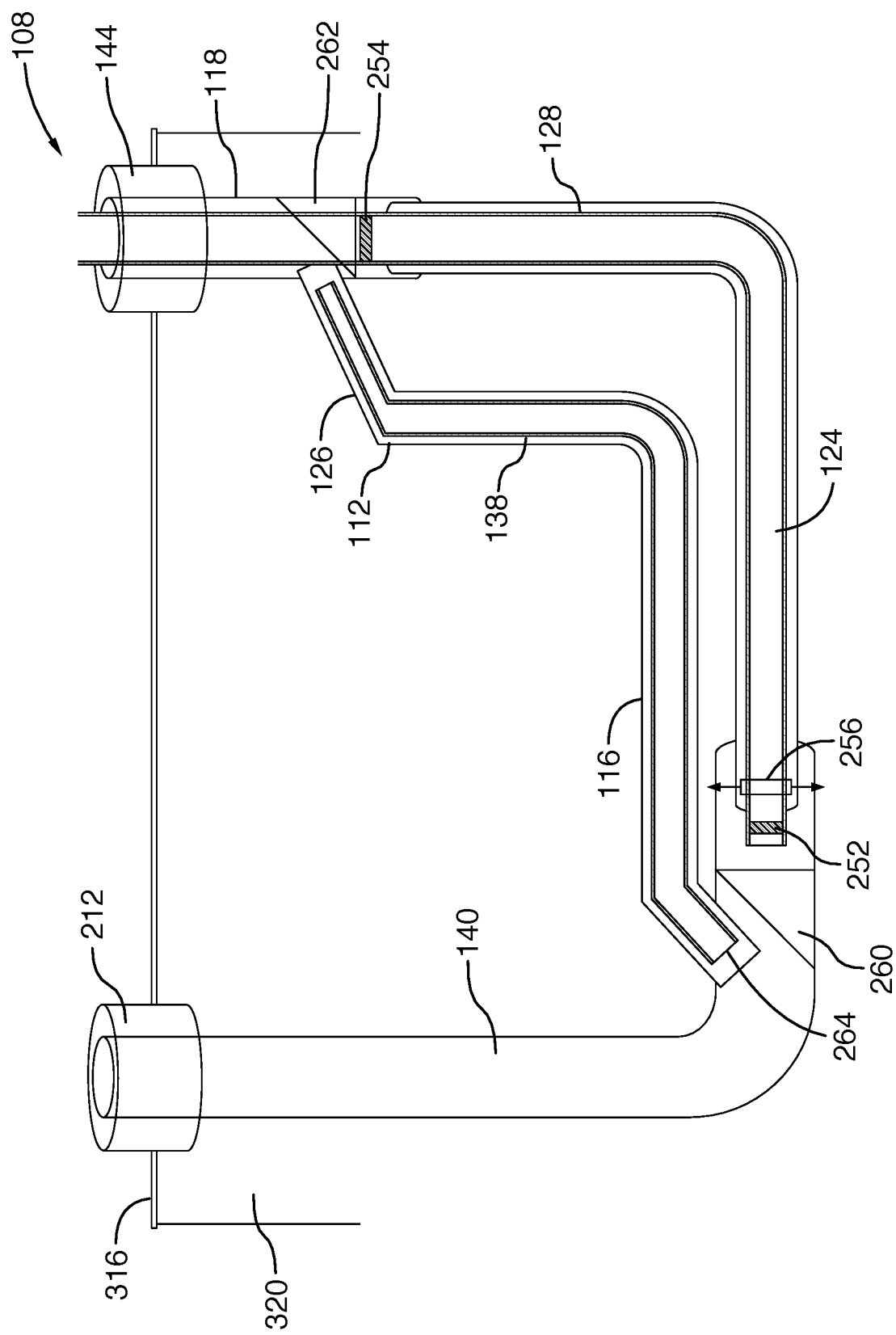
FIG. 13 is a schematic cross-sectional view depicting a sixth step of constructing the system for generating energy from geothermal sources shown in FIG. 1, showing the casing being installed along the injection well and through the second lateral section.

At step 735 (shown in FIG. 7), production steel casing 156 is installed in upper lateral section 116 and injection well 112. As can be seen in FIG. 13, the production steel casing 156 will run the length of upper lateral section 116 and injection well 112, but will not enter the casing windows 264 and 266. Specifically, production steel casing 156 may be installed up to within 50 feet of the casing window 264 and 266. Production steel casing 156 further covers the open holes/access to upper lateral section 116 from lower lateral section 124 and from wellbore 174. Each end production steel casing 156, specifically, at casing window 264 and at casing window 266 a connection/seal assembly is installed. In a preferred embodiment, the connection/seal assembly is a polished bore receptacle. The polished bore receptacle will be completed with a Baker centralized/reversed sealbore extension and anchor seal assembly latch profile (not shown). The polished bore receptacle facing the lower lateral section 124 is also prepared to be connected to multilateral connector 120. This will be further discussed below.

Figure 14:
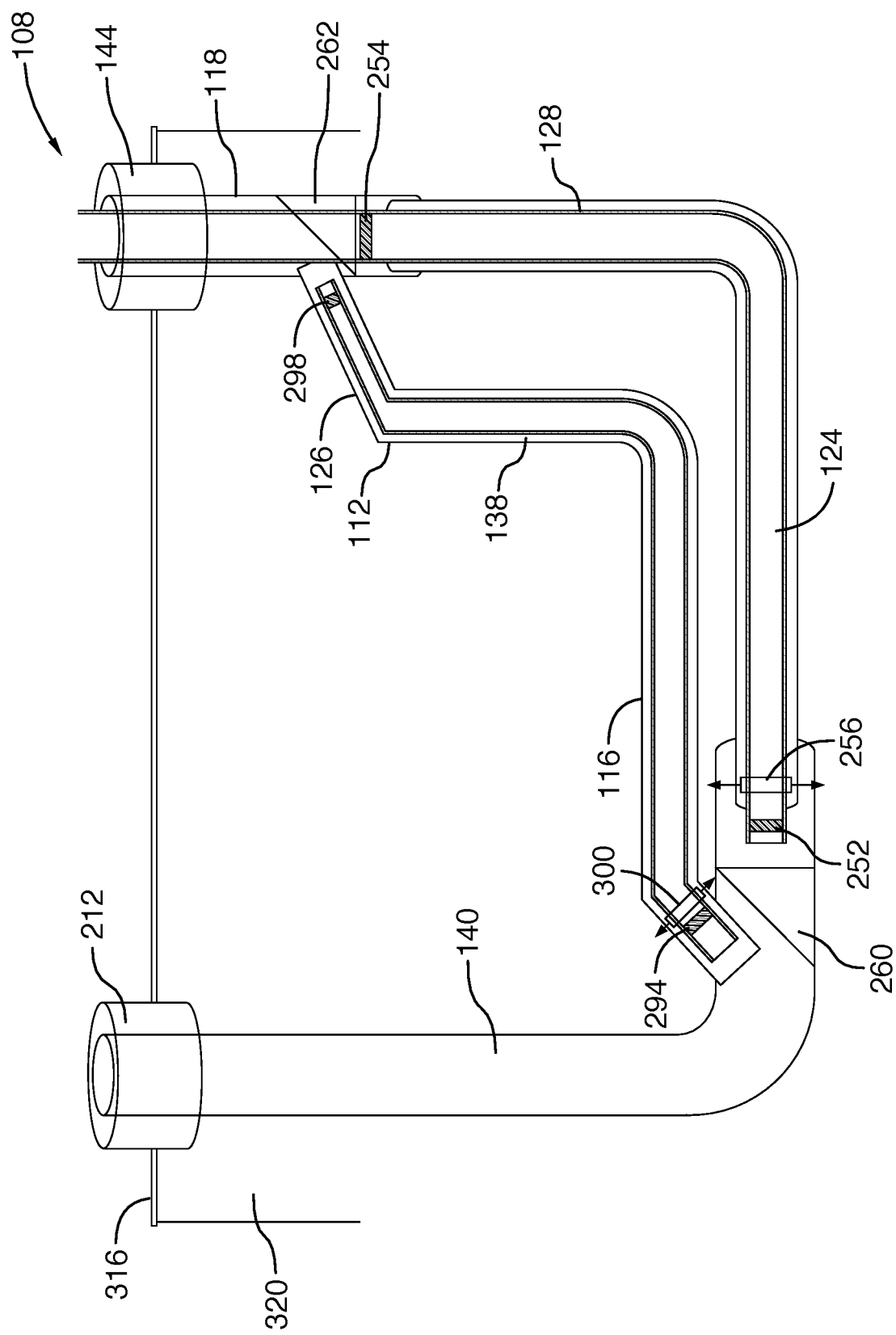
FIG. 14 is a schematic cross-sectional view depicting a seventh step of constructing the system for generating energy from geothermal sources shown in FIG. 1, showing a third isolation packer and a second cementing stage tool being installed in along the second lateral section in proximity to the construction well, and a fourth isolation packer being installed along the injection well in proximity to the common well segment, the cement being poured between the casing and the walls of the injection well and the second lateral section.

At step 740 (shown in FIG. 7), isolation packers 294 and 298 are installed and inflated. Cementing stage tool 300 is also installed and opened. As can be seen in FIG. 14, once the isolation packers 294 and 298 are inflated, and the cementing stage tool 300 is open, the calculated amount of thermal cement can be pumped in The drill pipe will be separated from production steel casing 156. Excess thermal cement may be circulated to the surface through common well segment 118.

Figure 15:
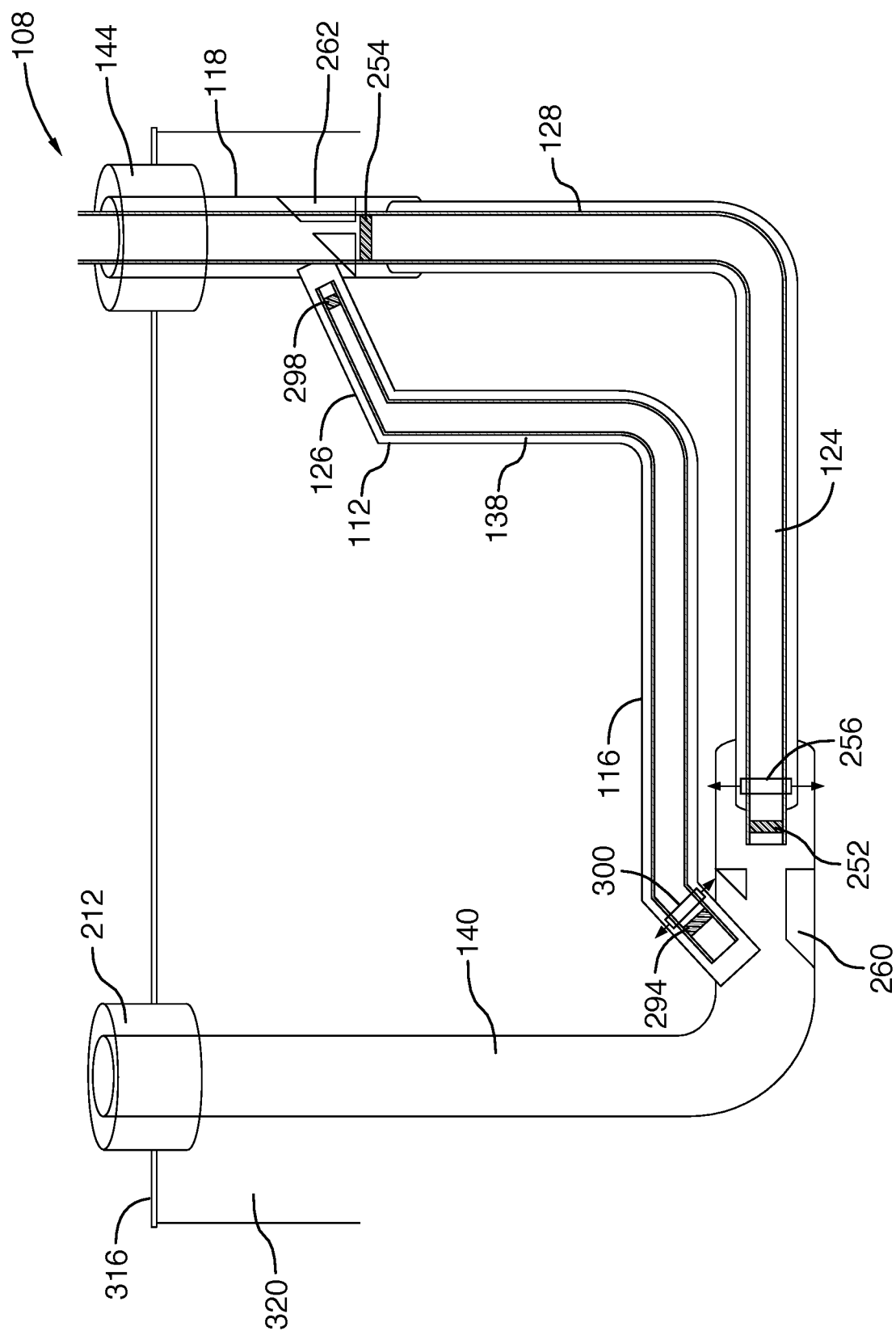
FIG. 15 is a schematic cross-sectional view depicting an eighth step of constructing the system for generating energy from geothermal sources shown in FIG. 1, showing the removal of the core of the first and second two-part whipstocks, leaving a first window guide installed between the two lateral connecting sections, and a second window guide installed between the common well segment and the production well.

At step 745 (shown in FIG. 7), on both wells, the upper section of whipstocks 260 and 262 are removed, leaving lower sections of whipstocks 260 and 262 inside intermediate thermal casing 236. This can be seen in FIG. 15. The lower section of whipstock 260 and 262 includes the guide and anchor, and allows casing or drilling assemblies to be diverted out the window guides of the whipstocks 260 and 262 into the lower lateral section 124. In addition, the window guides have a predetermined hole through the center of whipstocks 260 and 262 that allows access to the production steel casing 156 below the whipstock hole. Specifically, the whipstock hole allows tools or splitters with outer diameters that are smaller than the diameter of the predetermined hole to be lowered beneath the whipstocks 260 and 262 to connect with production steel casing 156. Outer diameters of completion assemblies, or any tools run inside production steel casing 156 after drilling has been completed, can be adjusted to ensure proper assemblies enter the correct wellbore.

Figure 16:
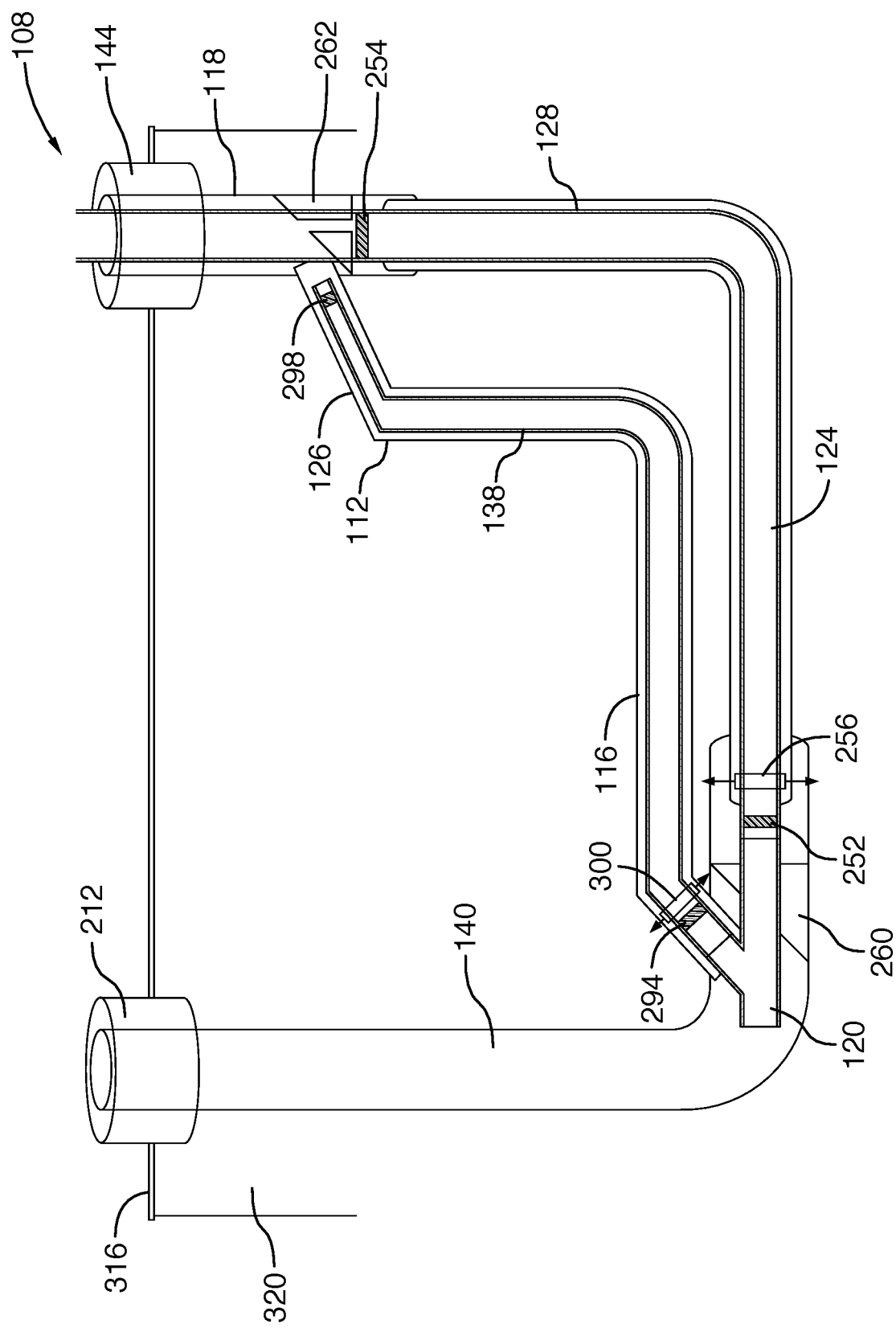
FIG. 16 is a schematic cross-sectional view depicting a ninth step of constructing the system for generating energy from geothermal sources shown in FIG. 1, showing the installation of a multilateral connector along the first window guide between the two lateral sections, and the connection of the injection well and the production well through the two lateral connecting sections and the multilateral connector.

At step 750 (shown in FIG. 7), multilateral connector 120 is installed and connected between upper lateral section 116 and lower lateral section 124. Fully cased downhole well loop 108 is then pressure tested. Referring to FIG. 16, two dummy trips into both wellbore 174 and connection wellbore 140 are conducted. The first trip is conducted with a polished bore locator seal assembly, where there is no latch, with an outer diameter greater than the whipstock guide of whipstock 260 and 262, to tag a receptacle in the lower lateral section 124 to verify exact depth for spacing. The second trip is conducted with a polished bore locator seal assembly, where there is no latch, with an outer diameter less than the whipstock guide of whipstock 260 and 262 to tag receptacle in the upper lateral section 116 to verify exact depth for spacing. This process allows for the exact depth measurements and distances between the access well 140, the lower lateral section 124 and the upper lateral section 116. Multilateral connector 120 may then be constructed with appropriate spacing to connect the lower lateral section 124 and the upper lateral section 116. Concurrently, the geothermal isolation junction 170 may also be constructed with appropriate spacing to connect both laterals concurrently, as will be further explained below.

Multilateral connector 120 may be lowered into connecting well 140, (utilizing drill pipe for landing operation) to connect upper lateral section 116 and lower lateral section 124. The multilateral connector 120 will be made up of two different "legs", with each leg designed to ensure and facilitate entry into a specific well (either upper lateral section 116 or lower lateral section 124), and create a pressure tested connection with the production steel casing 156 in each of upper lateral section 116 and lower lateral section 124. One leg 292 will include a polished bore locator seal assembly with centralized shear type protective shroud, with an outer diameter less than the whipstock guide of whipstock 260. This will allow polished bore location seal assembly to be lowered through window guide and connect with polished bore receptacle of production steel casing on the lower lateral section 124. The second leg 296 of multilateral connector 120 is of the same design except the outer diameter will be greater than the whipstock guide of whipstock 260, forcing the polished bore locator seal assembly with centralized shear type protective shroud out the casing window 264 and connecting it with production steel casing 156 via polished bore receptacle on the upper lateral section 116. The second leg 296 may also include a pin/shear activated sleeve to protect seals from friction damage through window 280 and open hole section.

The multilateral connector 120 offers full mechanical and hydraulic isolation support of the junction area with re-entry capabilities. The multilateral connector 120 is designed to accommodate re-entry tie-ins on steam-assisted gravity drainage applications. It is typically run with a full-length liner on one attachment, with the second attachment providing a pressure tested seal with existing lateral. The multilateral connector 120 serves to provide the junction point of upper lateral section 116 and lower lateral section 124 utilizing the connecting wellbore 140 as the entry and/or access point.

Figure 17:
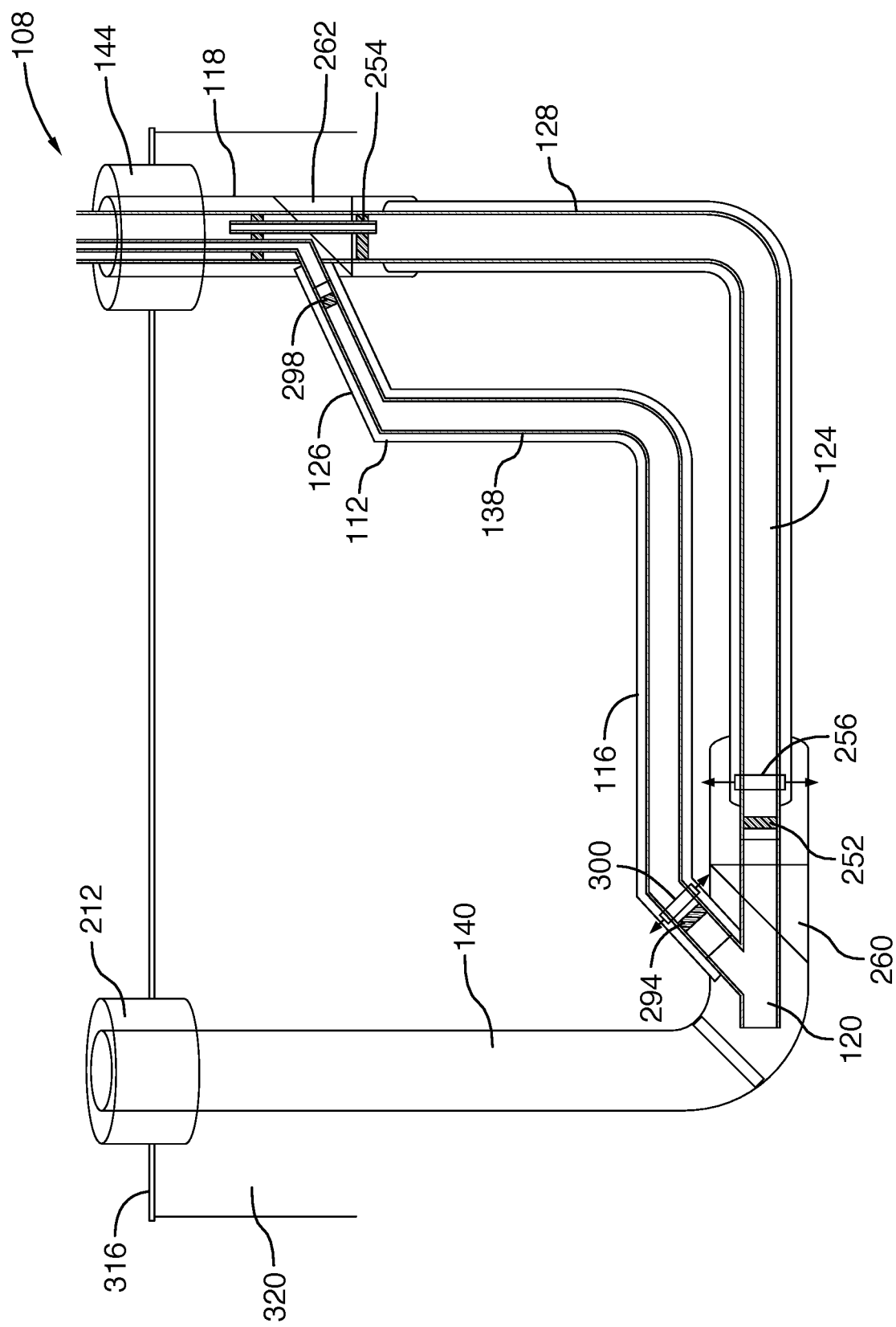
FIG. 17 is a schematic cross-sectional view depicting a tenth step of constructing the system for generating energy from geothermal sources shown in FIG. 1, showing the installation of a geothermal isolation junction along the second window guide with a first leg of the geothermal isolation junction connecting the common well segment with the production well, and a second leg of the geothermal isolation junction connecting the surface with the injection well through an isolated injection pipe, the installation of the geothermal isolation junction to provide a circulatory flow for the working fluid for a closed loop fully cased downhole well loop.

At step 755 (shown in FIG. 7), the geothermal isolation junction 170 may be installed. As is depicted in FIG. 17, the geothermal isolation junction 170 may be lowered through wellbore 174 and connected to angled section 126 of injection well 112, and also production well 128. The geothermal isolation junction 170 includes a first leg 306, and a second leg 310. First leg 306 includes a polished bore locator seal assembly with a centralized shear type protective shroud with an outer diameter that is less than the whipstock guide of whipstock 262. Having an outer diameter that is less than the whipstock guide of whipstock 262 allows the polished bore locator seal assembly to be lowered through the window guide of whipstock 262 and connect with the polished bore receptacle of production well 128. Second leg 310 (also known as insulated production pipe 166) is of the same design and also includes a polished bore locator seal assembly with a centralized shear type protective shroud. However, the polished bore locator seal assembly includes an outer diameter that is greater than the whipstock guide of whipstock 262, forcing the polished bore locator seal assembly with centralized shear type protective shroud out of the casing window 266 and to connect with the production steel casing 156 of the angled section 126 of injection well 112. Second leg 310 may also include a pin or shear activated sleeve to protect seals from friction damage through casing window 266 and the open hole section between angled section 126 of injection well 112 and wellbore 174. The geothermal isolation junction 170 also acts as a junction point for both the injection well 112 and the production well 128, allowing for the isolated input and output flow paths.

At step 760 (shown in FIG. 7), cement stage tool 300 may be milled out using a drilling rig. In an alternate embodiment a jointed drill pipe or a coiled tubing unit may be used to mill out the cement stage tool 300. Any debris from the milling cement stage tool 300 may also be cleaned out.

At step 765 (shown in FIG. 7), pressure testing may be performed. Once milling of cement stage tool 300 has been completed, a flow path for the entire loop of fully cased downhole well loop 108. With the circulation able to be established, a pressure test (known to those skilled in the art) may be performed on the entire fully cased downhole well loop 108.

Once testing has been successfully performed, the geothermal energy generating system 100 is ready to be operated in accordance with the method steps set out in FIGS. 4 and 5.

The construction of the geothermal energy generating system 100 leverages known technologies and methods in wellbore construction in the field of oil and gas, but applies said technologies and methods in a novel and inventive manner for the generation and production of energy from geothermal sources.

Although the foregoing description and accompanying drawings to specific preferred embodiments of the present invention as presently contemplated by the inventor, it will be understood that various changes, modifications and adaptations, may be made without departing from the spirit of the invention.

The embodiments for which an exclusive privilege or property is claimed are as follows:

1. A system for generating energy from geothermal sources, the system comprising:
   a common well segment extending underground into a rock formation, the common well segment having an upper end and a lower end;
   an insulated injection pipe extending underground into the rock formation, a portion of the insulated injection pipe being co-located with the common well segment, the insulated injection pipe fluidly isolated from the common well segment;
an injection well extending further underground from the lower end of the common well segment, the injection well having an upper end and a lower end, the upper end of the injection well fluidly connected to the insulated injection pipe;
a production well extending further underground from the lower end of the common well segment, the production well having an upper end and a lower end, the upper end of the production well fluidly connected to the common well segment;
a first lateral section connected to and extending away from a location along the injection well;
a second lateral section connected to and extending away from a location along the production well;
a multilateral connector joining the first lateral section and the second lateral section;
each of the common well segment, the injection well, the production well, the first and second lateral sections being cased in steel and cemented in place within the rock formation;
the insulated injection pipe, the injection well, the first lateral section, the multilateral connector, the second lateral section, the production well and the common well segment cooperating with each other to define a pressure-tested downhole well loop within the rock formation and in a heat transfer arrangement therewith, the pressure-tested downhole well loop being configured to receive a working fluid capable of undergoing phase change between liquid and gas within the pressure-tested downhole well loop as a result of heat transferred from the rock formation;
a pump fluidly connected to the insulated injection pipe, the pump being configured to circulate the working fluid through the pressure-tested downhole well loop;
a turbine system fluidly connected to the common well segment, the turbine system being operable to convert mechanical energy generated from the flow of working fluid, into electricity; and
a cooler fluidly connected between the pump and the turbine system for cooling the working fluid.

2. The system of claim 1 further comprising a surface casing surrounding an opening of the common well segment, the surface casing partially above the surface and being configured to prevent the escape of the working fluid into the rock formation.

3. The system of claim 1 further comprising, wherein the system has an above ground surface area of 30,100 m².

4. The system of claim 1, wherein the working fluid is a homogenous working fluid.

5. The system of claim 1 wherein the working fluid is a heterogenous working fluid.

6. The system of claim 1, wherein the common well segment has a depth of approximately 650 m.

7. The system of claim 1, wherein the first lateral section extends away from the injection well at a depth of between 1000 m and 3500 m.

8. The system of claim 1, wherein the second lateral section extends away from the production well at a depth of between 1000 m and 3500 m.

9. The system of claim 1, wherein the first lateral section has a length of between 2000 m to 4000 m.

10. The system of claim 1, wherein the second lateral section has a length of between 2000 m to 4000 m.

11. The system of claim 1, wherein the first lateral section is at a lower depth than that of the second lateral section.

12. The system of claim 1, wherein the second lateral section is a lower depth than that of the first lateral section.

13. The system of claim 1, wherein the first lateral section is at the same depth as the second lateral section, the first lateral section having a spacing from the second lateral section.

14. The system of claim 1, wherein in operation the pressure-tested downhole well loop being configured to receive fluids pressurized between 7 MPa and 31 MPa.

15. The system of claim 1, wherein the pressure-tested downhole well loop is capable to withstand pressures of at least 7 MPa.

16. The system of claim 1, wherein the pump is a positive displacement type pump with a variable speed drive controller.

17. The system of claim 16, wherein the positive displacement type pump is selected from the group consisting of plunger type pumps, gear type pumps and rotary vane type pumps.

18. The system of claim 1, wherein the turbine system includes a turbine expander.

19. The system of claim 1, wherein the turbine system is capable of generating between 0.5 to 2 MW of output power.

20. The system of claim 1, wherein the cooler is using ambient air as a coolant.

21. The system of claim 1 further comprising a storage tank, the storage tank connected between the cooler and the pump, and being configured to hold the excess working fluid.

22. The system of claim 1, wherein the working fluid is selected from the group consisting of a refrigerant, a hydrocarbon-based fluid, ammonia, carbon dioxide, and water.

23. The system of claim 22, wherein the hydrocarbon-based working fluid is selected from the group consisting of propane, ethane, pentane, butane, and hydrocarbon blend.

24. The system of claim 1, wherein the working fluid is propane.

25. The system of claim 1 further comprising a recuperator with a first flow through connected between the turbine system and the cooler, and a second flow through connected between the pump and the insulated injection pipe, the recuperator being configured to transfer heat from the first flow through to the second flow through.

26. The system of claim 1, wherein the insulated injection pipe is a steel pipe with a thermally insulated compound coating the steel pipe.

27. The system of claim 1, wherein the portion of the insulated injection pipe runs along the central axis of the common well segment.

28. The system of claim 1, wherein the upper end of the injection well includes a downward angled section and the lower end of the injection well includes a vertical section.

29. The system of claim 1, wherein a majority portion of the injection well is spaced apart from the production well.

30. The system of claim 29, wherein the majority portion of the injection well is spaced apart from the production well at a lateral distance of at least 80 m.

31. The system of claim 1 further comprising:
a geothermal isolation junction located along the lower portion of the common well segment, the insulated injection pipe fluidly connected to the injection well through the geothermal isolation junction;
an isolation packer located along the upper portion of the production well; and an insulated production pipe fluidly connecting the production well and the common well segment, a portion of the insulated production pipe running between the isolation packer and the geothermal isolation junction; and wherein the geothermal isolation junction isolates the working fluid in the insulated injection pipe from the working fluid in the insulated production pipe.

32. The system of claim 1, wherein the portion of the insulated injection pipe being concentrically co-located with the common well segment.

33. The system of claim 1, wherein the portion of the insulated injection pipe being eccentrically co-located with the common well segment.

34. The system of claim 1 further comprising an access well having a lateral segment, wherein the multilateral connector is positioned within the lateral segment of the access well.

35. The system of claim 34 further comprising:
wherein the common well segment is a first common well segment, the insulated injection pipe is a first insulated injection pipe, the injection well is a first injection well, the production well is a first production well, the multilateral connector is a first multilateral connector, the pressure-tested downhole well loop is a first pressure-tested downhole well loop and the pump is a first pump;
a second common well segment extending underground into the rock formation, the second common well segment having an upper end and a lower end;
a second insulated injection pipe extending underground into the rock formation, a portion of the second insulated injection pipe being co-located with the second common well segment, the second insulated injection pipe fluidly isolated from the second common well segment;
a second injection well extending further underground from the lower end of the second common well segment, the second injection well having an upper end and a lower end, the upper end of the second injection well fluidly connected to the second insulated injection pipe;
a second production well extending further underground from the lower end of the second common well segment, the second production well having an upper end and a lower end, the upper end of the second production well fluidly connected to the common well segment;
a third lateral section connected to and extending away from a location along the second injection well;
a fourth lateral section connected to and extending away from a location along the second production well;
a second multilateral connector joining the third lateral section and the fourth lateral section;
each of the second common well segment, the second injection well, the second production well, the third and fourth lateral sections being cased in steel and cemented in place within the rock formation;
the second insulated injection pipe, the second injection well, the third lateral section, the second multilateral connector, the fourth lateral section, the second production well and the second common well segment cooperating with each other to define a second pressure-tested downhole well loop within the rock formation and in a heat transfer arrangement therewith, the second pressure-tested downhole well loop being configured to receive the working fluid capable of undergoing phase change between liquid and gas within the second pressure-tested downhole well loop as a result of heat transferred from the rock formation;
a second pump fluidly connected to the second insulated injection pipe, the second pump being configured to circulate the working fluid through the pressure-tested downhole well loop;
the second common well segment fluidly connected to the turbine system, the turbine system being configured to receive the working fluid from the first production well of the first pressure-tested downhole well loop and the second production well of the second pressure-tested downhole well loop; and
the cooler fluidly connected to both the first pump connected to the first insulated injection pipe, and the second pump connected to the second insulated injection pipe.

36. The system of claim 35, wherein the second multilateral connector of the second pressure-tested downhole well loop being positioned within the lateral segment of the access well at a location spaced apart from the first multilateral connector.

37. The system of claim 35, wherein the lateral segment of the access well is a first lateral segment, the second multi-lateral connector of the second pressure-tested downhole well loop being positioned within a second lateral segment of the access well, the second lateral segment of the access well being spaced apart from the first lateral segment of the access well.

38. The system of claim 37, wherein the first lateral segment is at a different depth than the second lateral segment.

39. The system of claim 35, wherein the system has an above ground surface area of 30,100 m$^2$.

40. A system for generating energy from geothermal sources, the system comprising:
a common well segment extending underground into a rock formation, the common well segment having an upper end and a lower end;
an insulated production pipe extending underground into the rock formation, a portion of the insulated production pipe being co-located with the common well segment, the insulated production pipe fluidly isolated from the common well segment;
an injection well extending further underground from the lower end of the common well segment, the injection well having an upper end and a lower end, the upper end of the injection well fluidly connected to the common well segment;
a production well extending further underground from the lower end of the common well segment, the production well having an upper end and a lower end, the upper end of the production well fluidly connected to the insulated production pipe;
a first lateral section connected to and extending away from a location along the injection well;
a second lateral section connected to and extending away from a location along the production well;
a multilateral connector joining the first lateral section and the second lateral section;
each of the common well segment, the injection well, the production well, the first and second lateral sections being cased in steel and cemented in place within the rock formation;
the common well segment, the injection well, the first lateral section, the multilateral connector, the second lateral section, the production well and the insulated production pipe cooperating with each other to define a pressure-tested downhole well loop within the rock formation and in a heat transfer arrangement therewith, the pressure-tested downhole well loop being configured to receive a working fluid capable of undergoing phase change between liquid and gas within the pressure-tested downhole well loop as a result of heat transferred from the rock formation;

a pump fluidly connected to the common well segment, the pump being configured to circulate the working fluid through the pressure-tested downhole well loop;

a turbine system fluidly connected to the insulated production pipe, the turbine system being operable to convert mechanical energy generated from the flow of working fluid, into electricity; and a cooler fluidly connected between the pump and the turbine system for cooling the working fluid.

41. A method of generating energy from geothermal sources comprising:

providing a pressure-tested downhole well loop extending underground into a rock formation, the pressure-tested downhole well loop including:

an insulated injection pipe, an injection well, a production well, a first lateral section connected to the injection well, a second lateral section connected to the production well, a multilateral connector connecting the first lateral section and the second lateral section, and a common well segment, a portion of the insulated injection pipe being co-located with the common well segment;

each of the injection well, the production well, the first and second lateral sections and the common well segment being cased in steel and cemented in place within the rock formation;

conveying a working fluid through the pressure-tested downhole well loop, the working fluid being received by the insulated injection pipe in a liquid state;

while conveying the working fluid through the pressure-tested downhole well loop, transferring heat from the surrounding rock formations to the liquid working fluid and exerting pressure on the liquid working fluid;

inducing a phase change in the working fluid from a liquid state to a gaseous state, the working fluid exiting the common well segment in a gaseous state;

converting the mechanical energy generated from the flow of the gaseous working fluid, into electricity;

cooling the working fluid and inducing a phase change in the working fluid to a liquid state; and returning the working fluid to the insulated injection pipe.

42. The method of claim 41, wherein conveying the working fluid through the pressure-tested downhole well loop includes pumping the working fluid.

43. The method of claim 41, wherein exerting pressure on the liquid working fluid includes exerting between 7 MPa and 31 MPa on the liquid working fluid.

44. The method of claim 41, wherein the step of converting the mechanical energy generated from the flow of the gaseous working fluid into electricity generates between 0.5 to 2 MW of output power.

45. The method of claim 41, wherein the step of cooling the working fluid and inducing a phase change in the working fluid is cooled using a cooler.

46. The method of claim 41 further comprising storing excess working fluid in a storage tank.

47. The method of claim 41, wherein the working fluid is a homogenous working fluid.

48. The method of claim 41, wherein the working fluid is a heterogenous working fluid.

49. The method of claim 41, wherein the working fluid is selected from the group consisting of a refrigerant, a hydrocarbon-based fluid, ammonia, carbon dioxide, and water.

50. The method of claim 49, wherein the hydrocarbon-based working fluid is selected from the group consisting of propane, ethane, pentane, butane, and hydrocarbon blend.

51. The method of claim 41, wherein the working fluid is propane.

52. The method of claim 51, wherein the propane being received by the insulated injection pipe having a temperature of between 10° C. and 40° C. and a pressure of between 1000 kPag and 2000 kPag.

53. The method of claim 52, wherein the propane being received by the insulated injection pipe having a temperature of 20° C. and a pressure of 1300 kPag.

54. The method of claim 51, wherein inducing a phase change in the propane from a liquid state to a gaseous state occurs when the propane reaches a temperature of 140° C. and a pressure of 6250 kPag.

55. The method of claim 54, wherein inducing a phase change in the propane from a liquid state to a gaseous state occurs in one of the second lateral section, the production well and the common well segment.

56. The method of claim 51, wherein the propane exiting the common well segment in a gaseous state having a temperature of between 90° C. and 110° C. and a pressure of between 3000 kPag and 4000 kPag.

57. The method of claim 56, wherein the propane exiting the common well segment in a gaseous state having a temperature of 106° C. and a pressure of 3500 kPag.

58. The method of claim 51, wherein while conveying the working fluid through the pressure-tested downhole well loop, the temperature of the propane increases by 76° C. and the pressure of the propane increases by 2170 kPag.

59. The method of claim 51, wherein after converting the mechanical energy generated from the flow of the gaseous working fluid into electricity, the propane having a temperature of between 16° C. and 63° C. and a pressure of between 700 kPag and 1500 kPag.

60. The method of claim 51, wherein cooling the working fluid cools the propane to a temperature of 30° C. and a pressure of 1080 kPag.

61. The method of claim 51 further comprising transferring heat from the working fluid in a first region to the working fluid in a second region using a recuperator, the working fluid in the first region occurring between the steps of converting the mechanical energy generated from the flow of the gaseous working fluid and cooling the working fluid, the working fluid in the second region occurring between the steps of conveying the working fluid through the pressure-tested downhole well loop and the working fluid being received by the insulated injection pipe in the liquid state.

62. A system for generating energy from geothermal sources, the system comprising:

a first common well segment and a second common well segment extending underground into a rock formation, each of the first and second common well segments having an upper end and a lower end;

a first insulated injection pipe and a second insulated injection pipe extending underground into a rock formation, a portion of the first insulated injection pipe being co-located with the first common well segment, a portion of the second insulated injection pipe being co-located with the second common well segment, each of the first and second insulated injection pipe having an upper end and a lower end;

a first injection well extending further underground from the lower end of the first common well segment, a second injection well extending further underground from the lower end of the second common well segment, each of the first and second injection well having an upper and and a lower end, the upper end of the first injection well fluidly connected to the first insulated injection pipe, the upper end of the second injection well fluidly connected to the second insulated injection pipe;

a first production well extending further underground from the lower end of the first common well segment, a second production well extending further underground from the lower end of the second common well segment, each of the first and second production well having an upper end and a lower end, the upper end of the first production well fluidly connected to the first common well segment, the upper end of the second production well fluidly connected to the second common well segment;

a first lateral section connected to and extending away from a location along the first injection well;

a second lateral section connected to and extending away from a location along the first production well;

a third lateral section connected and extending away from a location along the second injection well;

a fourth lateral section connected to and extending away from a location along the second production well;

a first multilateral connector joining the first lateral section and the second lateral section;

a second multilateral connector joining the third lateral section and the fourth lateral section;

each of the first and second common well segments, the first and second injection wells, the first and second production wells, the first, second, third and fourth lateral sections being cased in steel and cemented in place within the rock formation;

the first insulated injection pipe, the first injection well, the first lateral section, the first multilateral connector, the second lateral section, the first production well and the first common well segment cooperating with each other to define a first pressure-tested downhole well loop within the rock formation, the second insulated injection pipe, the second injection well, the third lateral section, the second multilateral connector, the fourth lateral section, the second production well, and the second common well segment cooperating with each other to define a second pressure-tested downhole well loop within the rock formation, being in a heat transfer arrangement with the rock formation each of the first and the second pressure-tested downhole well loop being configured to receive a working fluid capable of undergoing phase change between liquid and gas as a result of heat transferred from the rock formation;

a first pump fluidly connected to the first insulated injection pipe, the first pump being configured to circulate the working fluid through the first pressure-tested downhole well loop;

a second pump fluidly connected to the second insulated injection pipe, the second pump being configured to circulate the working fluid through the second pressure-tested downhole well loop;

a turbine system fluidly connected to the first and second common well segments, the turbine system being operable to convert mechanical energy generated from the flow of working fluid, into electricity;

a cooler fluidly connected between the first and second pumps and the turbine system, the cooler being operable to cool the working fluid received from the turbine system and to provide the cooled working fluid to both the first and second pumps; and the first and second pressure-tested downhole well loop located in proximity to each other.

63. A system for generating energy from geothermal sources, the system comprising:

a common well segment extending underground into a rock formation, the common well segment having an upper end and a lower end;

an insulated injection pipe extending underground into the rock formation, a portion of the insulated injection pipe being co-located with the common well segment, the insulated injection pipe fluidly isolated from the common well segment;

an injection well extending further underground from the lower end of the common well segment, the injection well having an upper end and a lower end, the upper end of the injection well fluidly connected to the insulated injection pipe;

a production well extending further underground from the lower end of the common well segment, the production well having an upper end and lower end, the upper end of the production well fluidly connected to the common well segment;

a first lateral section connected to and extending away from a location along the injection well;

a second lateral section connected to and extending away from a location along the production well; and a multilateral connector joining the first lateral section and the second lateral section;

each of the common well segment, the injection well, the production well, the first and second lateral sections being cased in steel and cemented in place within the rock formation;

the insulated injection pipe, the injection well, the first lateral section, the multilateral connector, the second lateral section, the production well and the common well segment cooperating with each other to define a pressure-tested downhole well loop within the rock formation and in a heat transfer arrangement therewith, the pressure-tested downhole well loop being configured to withstand a pressure of at least 7 MPa and receive a working fluid capable of undergoing phase change between liquid and gas within the pressure-tested downhole well loop as a result of heat transferred from the rock formation, the working fluid being selected from at least one member of the group consisting of a refrigerant, a hydrocarbon-based fluid, ammonia, carbon dioxide, and water;

a pump fluidly connected to the insulated injection pipe, the pump being configured to circulate the working fluid through the pressure-tested downhole well loop;

a turbine system fluidly connected to the common well segment, the turbine system being operable to convert mechanical energy generated from the flow of working fluid, into electricity; and a cooler fluidly connected between the pump and the turbine system for cooling the working fluid.

* * * * *